US008145563B2

(12) United States Patent
Misraje et al.

(10) Patent No.: US 8,145,563 B2
(45) Date of Patent: *Mar. 27, 2012

(54) COMPUTER SYSTEM AND METHOD FOR NETWORKED INTERCHANGE OF DATA AND INFORMATION FOR MEMBERS OF THE REAL ESTATE FINANCIAL AND RELATED TRANSACTIONAL SERVICES INDUSTRY

(75) Inventors: Jack Misraje, Studio City, CA (US); Glenn Alex Dickman, Studio City, CA (US)

(73) Assignee: Industry Access Incorporated, Los Angeles, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/765,597

(22) Filed: Apr. 22, 2010

(65) Prior Publication Data

US 2010/0205084 A1     Aug. 12, 2010

Related U.S. Application Data

(63) Continuation of application No. 09/566,694, filed on May 8, 2000, now Pat. No. 7,769,681.

(60) Provisional application No. 60/133,257, filed on May 8, 1999.

(51) Int. Cl.
  *G06Q 40/00* (2012.01)
(52) U.S. Cl. ........................................... 705/38; 705/35
(58) Field of Classification Search ..................... 705/38
  See application file for complete search history.

(56) References Cited

U.S. PATENT DOCUMENTS 5,107,443 A     4/1992 Smith et al.
5,584,025 A     12/1996 Keithley et al.
(Continued)

OTHER PUBLICATIONS

Edmonson, R.G. "EDS Introduces Service to Cut Mortgage Paperwork" Credit Union News; May 2, 1997, 17,9; ProQuest Central, p. 12-13.

(Continued)

*Primary Examiner* — Rajesh Khattar
*Assistant Examiner* — Arunava Chakravarti
(74) *Attorney, Agent, or Firm* — Ganz Law, PC

(57) ABSTRACT

An Interchange Party Computer System ("IPCS") comprising: a plurality of units of allocated resources, configured for a lender party, broker party, transaction party and/or investor party, each unit of allocated resources including one or more administrator user interfaces that allow a participating party to manage its allocated resources and define which of its users and which other participating parties may access its allocated resources and use elements thereof, wherein at least one of the allocated resources include database allocated resources that are managed by the participating party assigned the resources, the allocated resources for the database being accessible and usable by a participating party on terms defined by the participating party responsible for managing the database allocated resources wherein at least one of the allocated resources include at one or more modules selected from the group of: a Rate and Loan Program Module that includes means to define loan programs or search defined loan programs in a database, an Automated Underwriting Module, a Mortgage Pools Module; a File Status and Transaction Party Module, which includes means to do two or more of: assign tasks, present task status, control viewing of task status, assign viewing privileges, monitor satisfaction of lender conditions, and upload loan documentation that are managed by the participating party assigned the resources; the allocated resources for the selected modules being accessible and usable by a participating party on terms defined by the participating party responsible for managing the selected modules allocated resources.

56 Claims, 83 Drawing Sheets

U.S. PATENT DOCUMENTS

| | | | |
|---|---|---|---|
| 5,611,052 | A | 3/1997 | Dykstra et al. |
| 5,699,527 | A | 12/1997 | Davidson |
| 5,870,721 | A | 2/1999 | Norris |
| 5,940,812 | A * | 8/1999 | Tengel et al. .................. 705/38 |
| 5,966,699 | A | 10/1999 | Zandi |
| 5,966,700 | A | 10/1999 | Gould et al. |
| 5,970,478 | A | 10/1999 | Walker et al. |
| 5,995,947 | A * | 11/1999 | Fraser et al. .................. 705/38 |
| 6,029,149 | A | 2/2000 | Dykstra et al. |
| 6,138,119 | A | 10/2000 | Hall et al. |
| 6,199,164 | B1 | 3/2001 | Nishimoto et al. |
| 6,233,566 | B1 * | 5/2001 | Levine et al. .............. 705/36 R |
| 6,263,352 | B1 | 7/2001 | Cohen |
| 6,275,224 | B1 | 8/2001 | Carter |
| 6,438,526 | B1 * | 8/2002 | Dykes et al. .................. 705/38 |
| 6,603,487 | B1 | 8/2003 | Bennett et al. |
| 6,658,568 | B1 | 12/2003 | Ginter et al. |
| 6,711,554 | B1 | 3/2004 | Salzmann et al. |
| 6,898,574 | B1 | 5/2005 | Regan |
| 7,165,174 | B1 | 1/2007 | Ginter et al. |
| 7,315,841 | B1 * | 1/2008 | McDonald et al. ............ 705/38 |
| 7,444,302 | B2 | 10/2008 | Hu et al. |
| 7,472,089 | B2 | 12/2008 | Hu et al. |
| 7,769,681 | B2 | 8/2010 | Misraje |

OTHER PUBLICATIONS

Gerlach, Lara "EDS Promotes Paperless Loan Closing Concept" Real Estate Finance Today, Mar. 31, 1997; 14;7; ProQuest Central, p. 1 and 9.

Calyx Software, Point for Windows Version 3.x Interface Marketing Guide, Copyright 1999, Revised Dec. 8, 1999; 5 pages.

Calyx Software, Point for Windows Version 3.x Interface Development Guide, Copyright 1999, Revised Nov. 29, 1999; 21 pages.

EDS Electronic Mortgage Services Data Sheet, Oct. 1997.

Jonathan Hornblass, "Lenders trying to lure builders with products that lock in rates", American Banker, Feb. 22, 1994.

Dian Hymer, "Locking in Loan Rate May Save", Nov. 26, 1993, Chicago Sun-Times.

PR Newswire, "Fannie Mae Early Rate Lock MBD/DUS Option Lets Multifamily Mortgage Borrowers Lock in Interest Rate and Avoid Interest Rate Risk: Gives Lenders Efficient Secondary Market Execution", PR Newswire Feb. 10, 1997.

*BDM Partners* vs. *Buchheim*, LASC Case No. BC 177 245; First Amended Complaint; filed Nov. 12, 1997.

*BDM Partners* vs. *Buchheim*, LASC Case No. BC 177 245; Answer to Verified First Amended Complaint; filed Feb. 3, 1998.

US Office Action dated Jul. 22, 2011 which was received in related U.S. Appl. No. 12/765,565.(29 pages).

Revised transmittal sheet and Request for Ex Parte Reexamination filed on Nov. 18, 2011 with the United States Patent and Trademark Office for related US patent No. 7765681, issued on Aug. 3, 2010 including Exhibits A-P (1152 pages).

*Industry Access Incorporated d/b/a Vobre, Plaintiff,* v. *Corelogic, Inc.; and Ellie Mae, Inc.*, Civil Action No. SACV11-00473 JST (FFMx); Defendant Corelogic, Inc.'s Answer to Complaint; Counterclaims, filed in U.S. District Court Central District of California, Santa Ana, CA on Jun. 23, 2011.

*BDM Partners* vs. *Buchheim*, LASC Case No. BC 177 245; Settlement Agreement; dated May 14, 1998.

* cited by examiner

Fig. 5.0

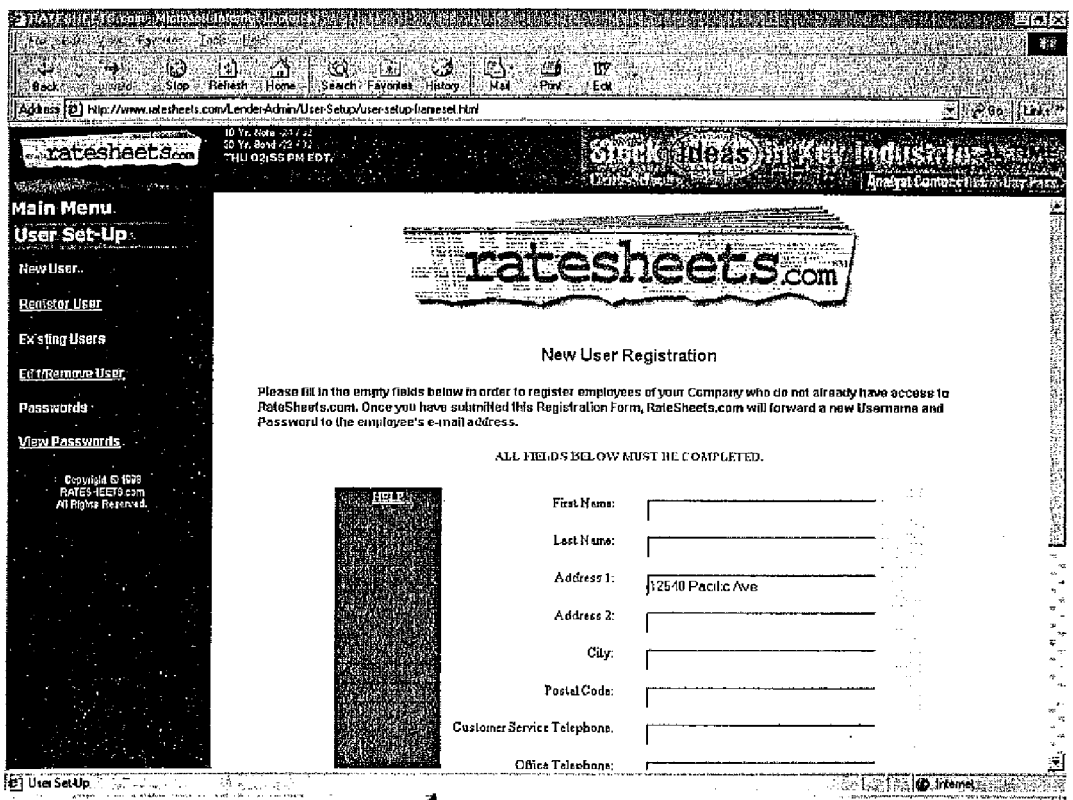
Fig. 5.1

Fig. 5.2

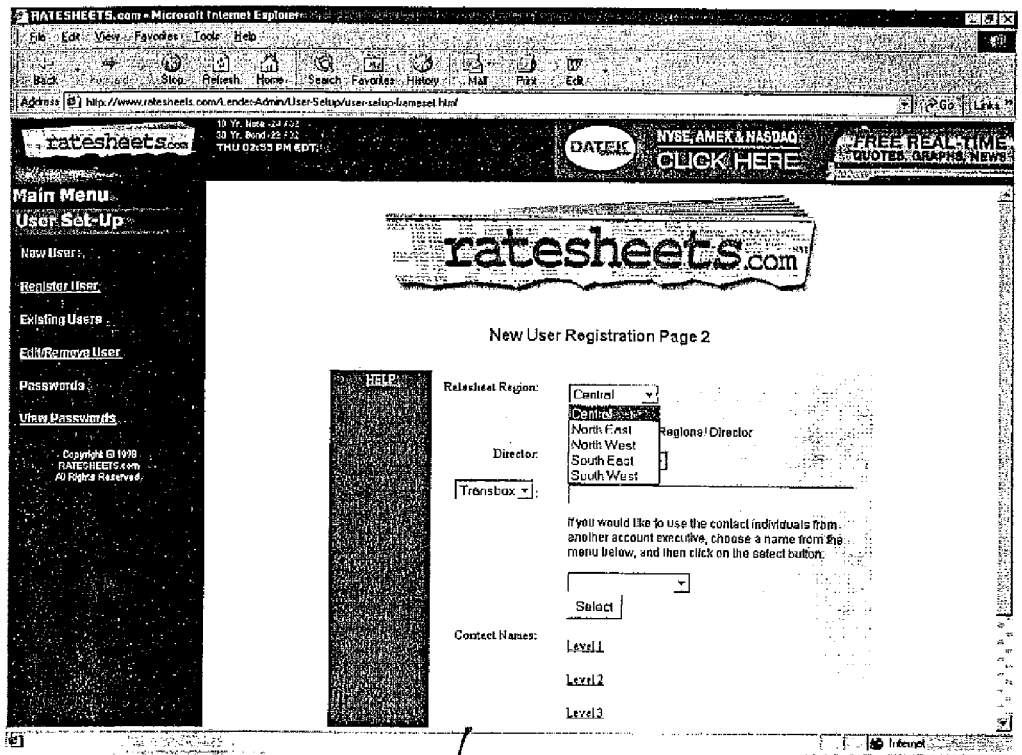
Fig. 5.3

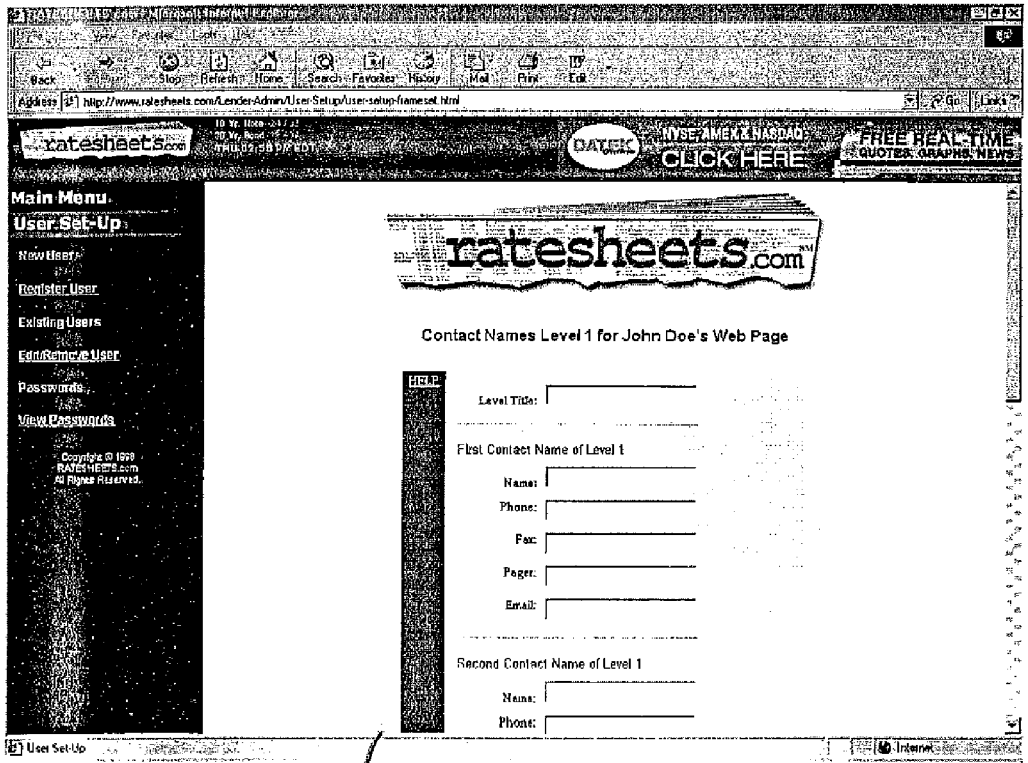
Fig. 5.4

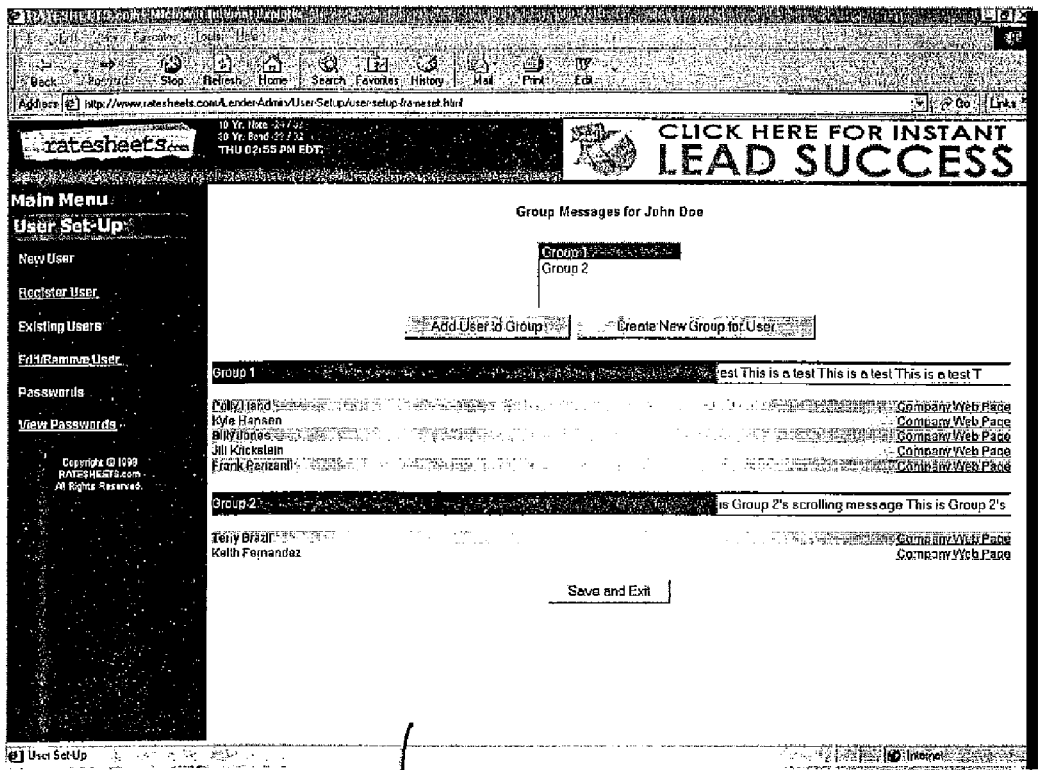
Fig. 5.5

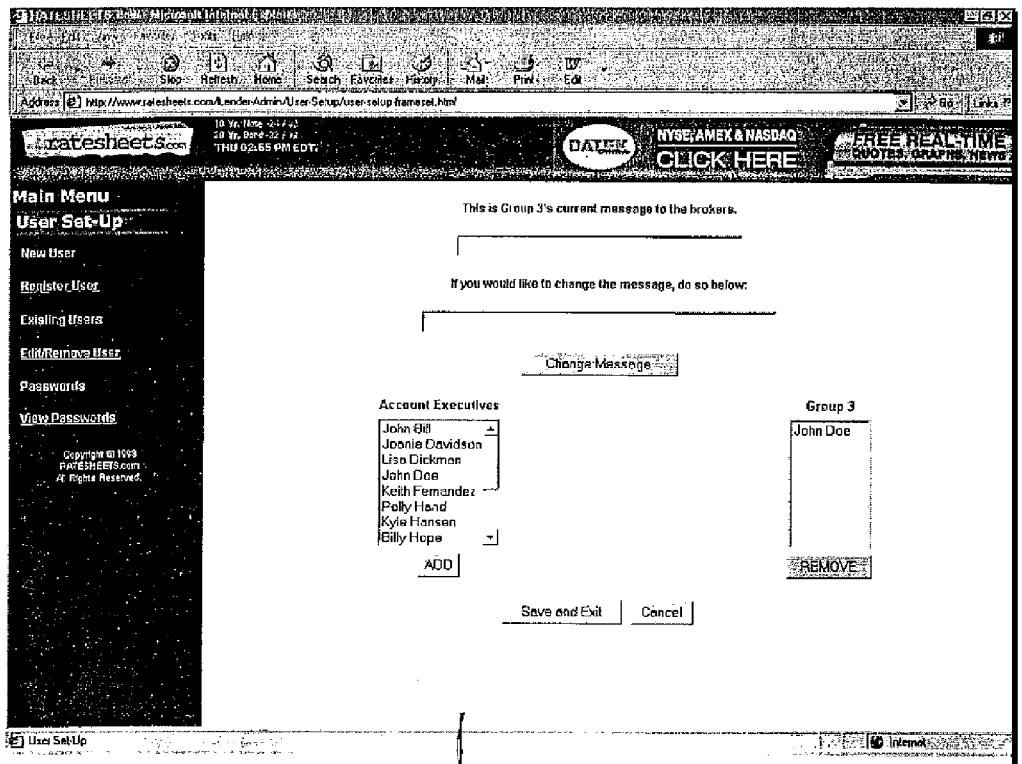
15.6
Fig. 5.6

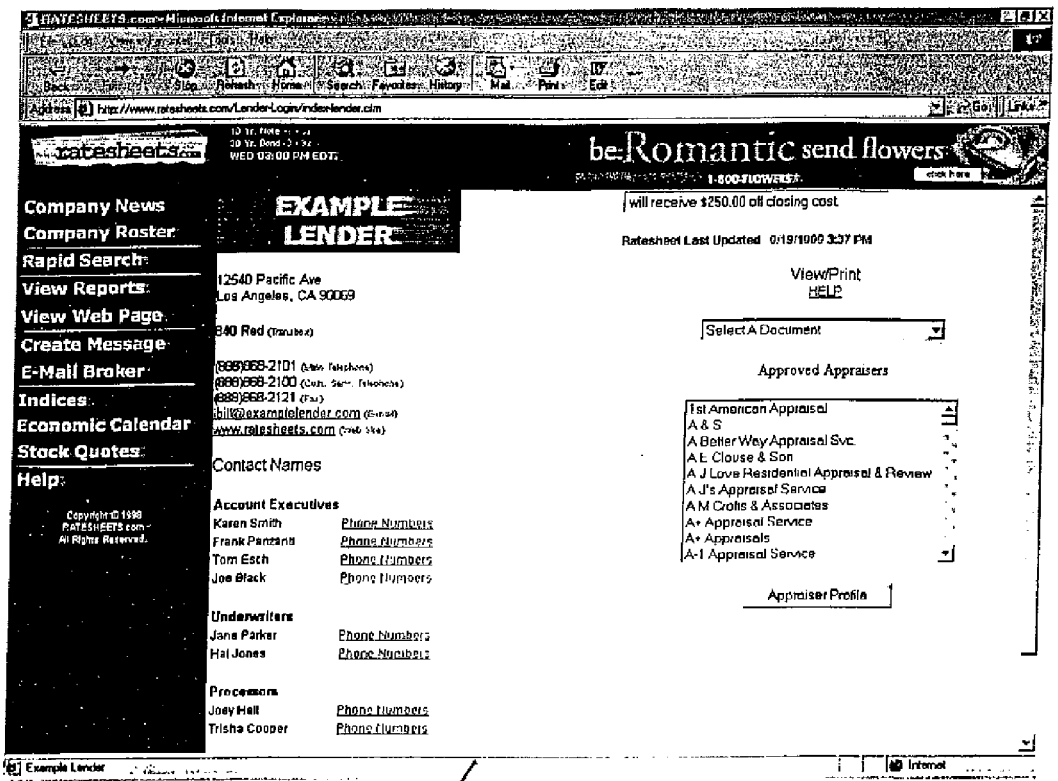
Fig. 5.7

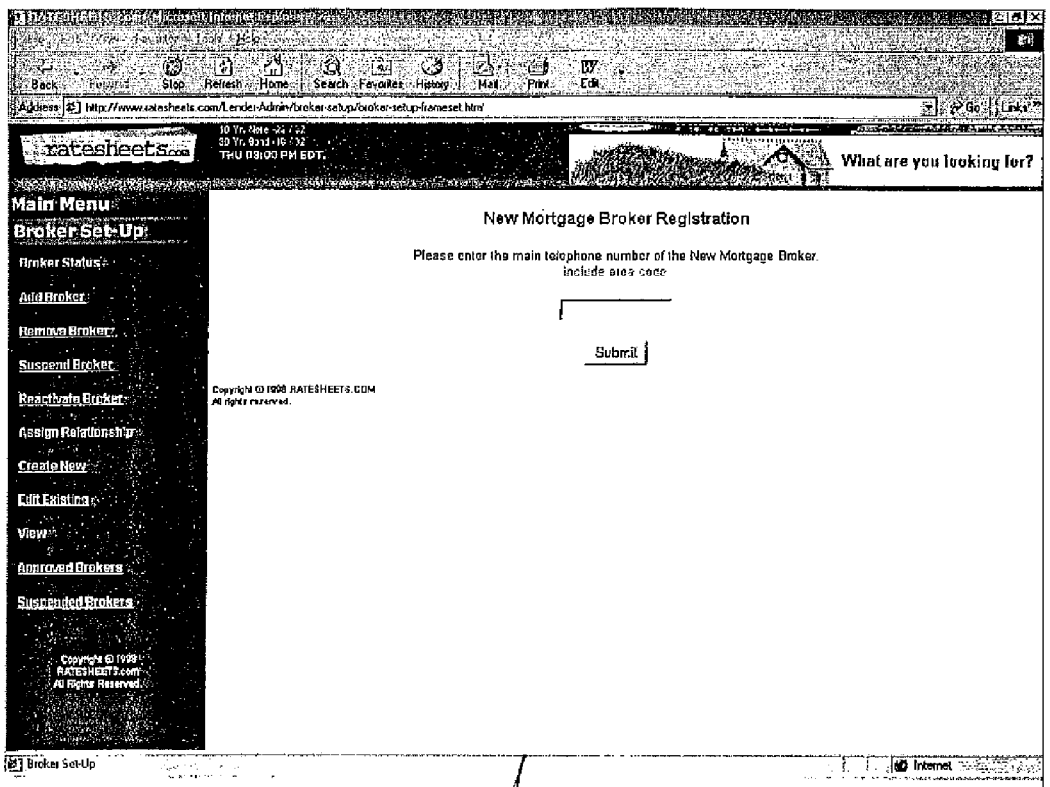
Fig. 5.8

Fig. 5.9

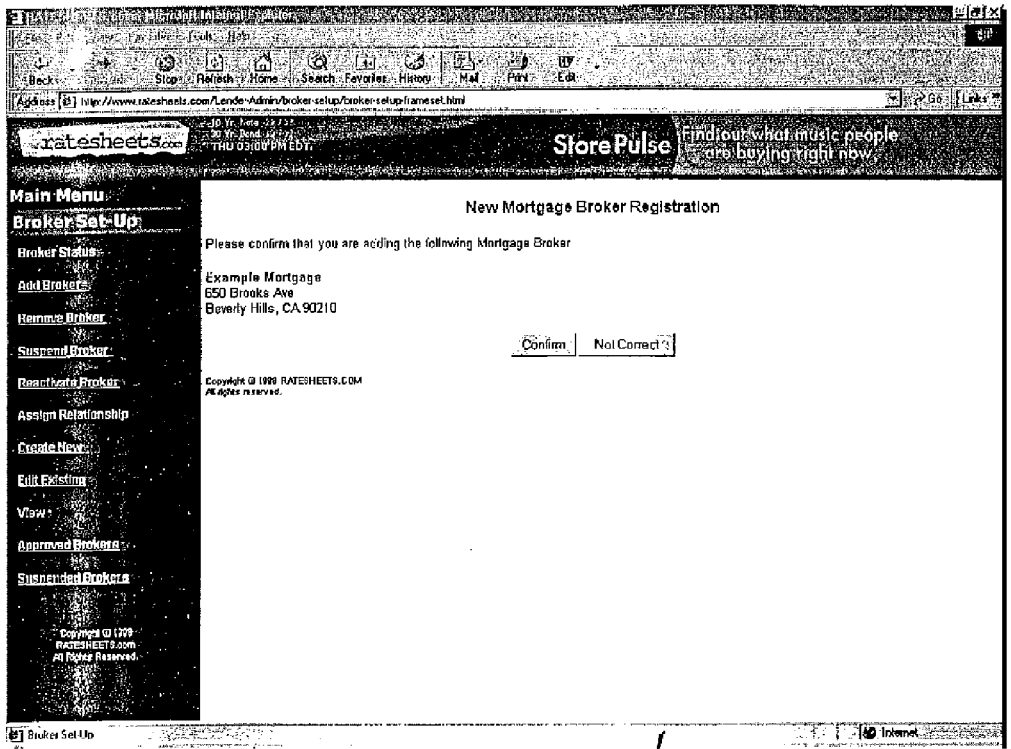
Fig. 5.10

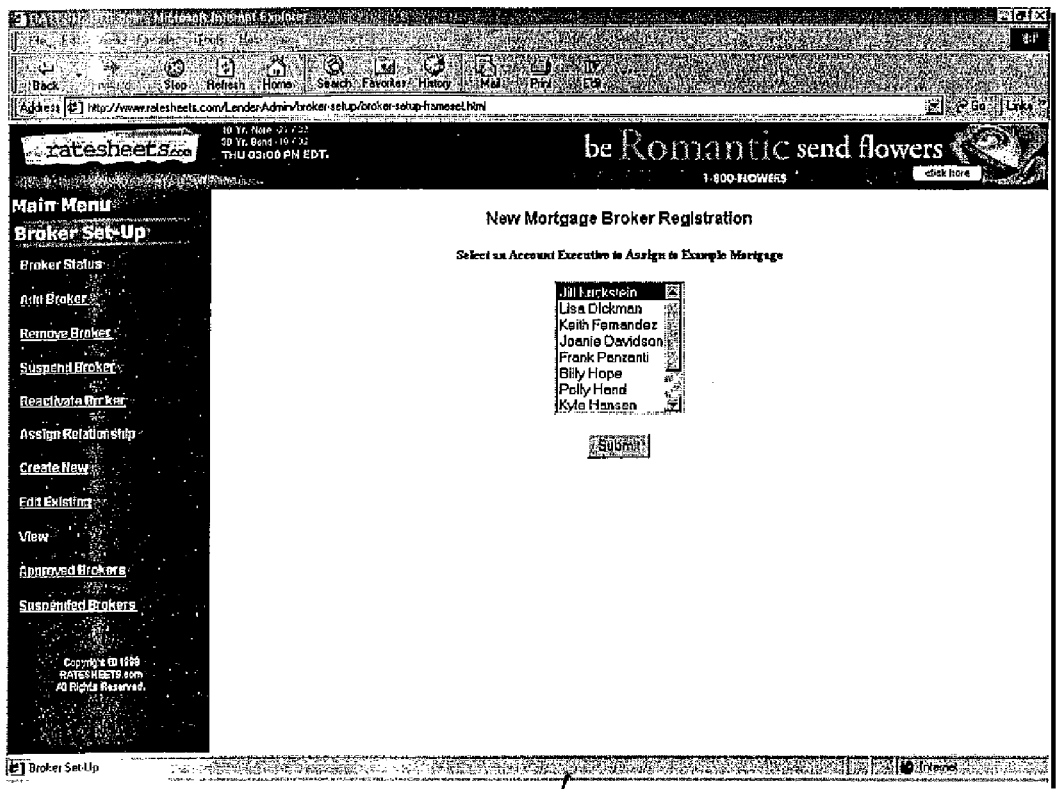
Fig. 5.11

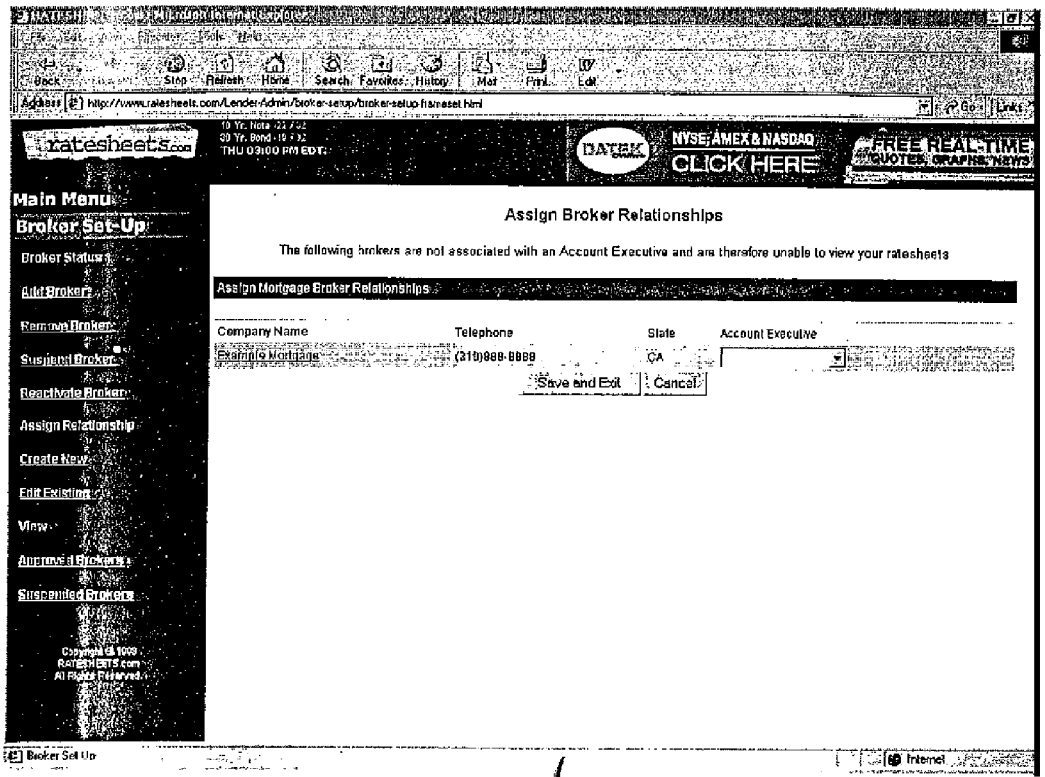
Fig. 5.12

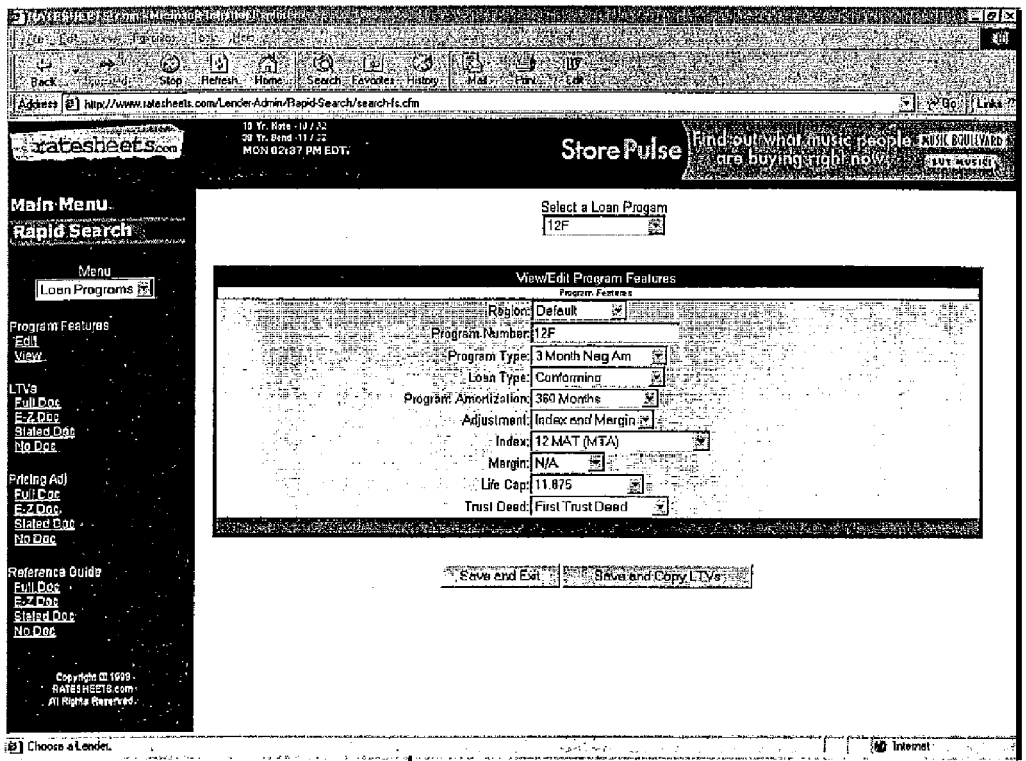
Fig. 5.13

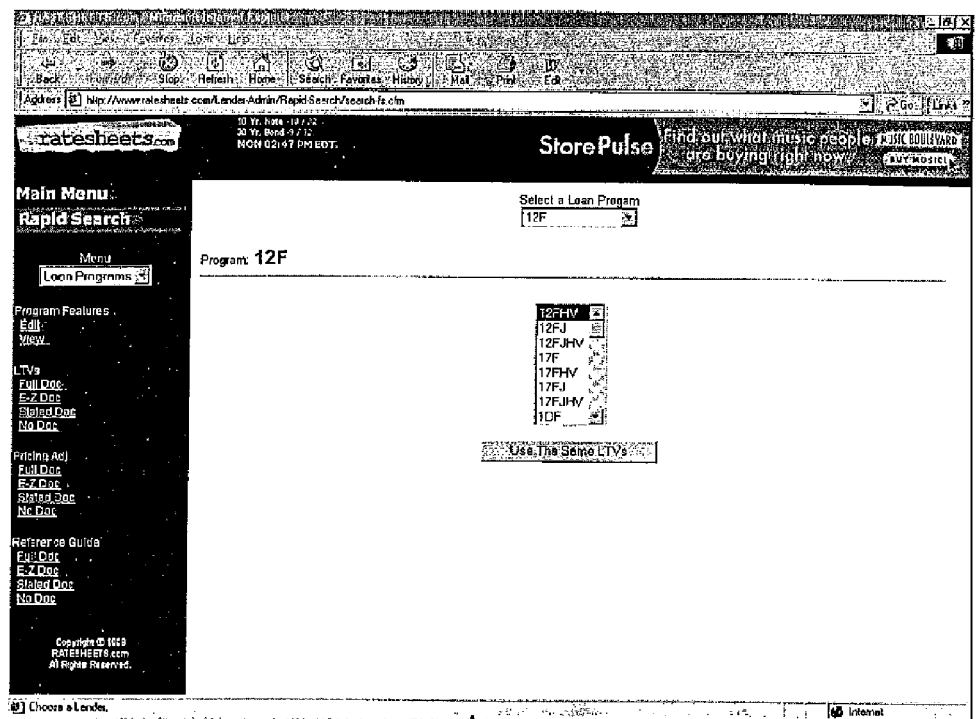
Fig. 5.14

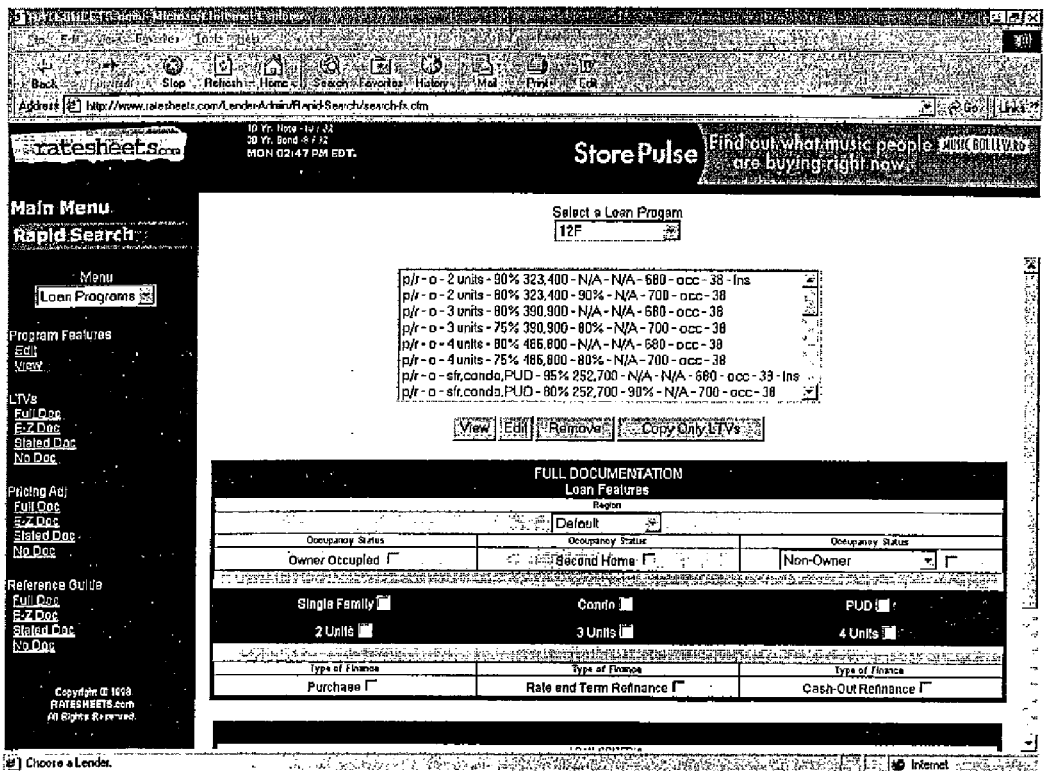
Fig. 5.15(a)

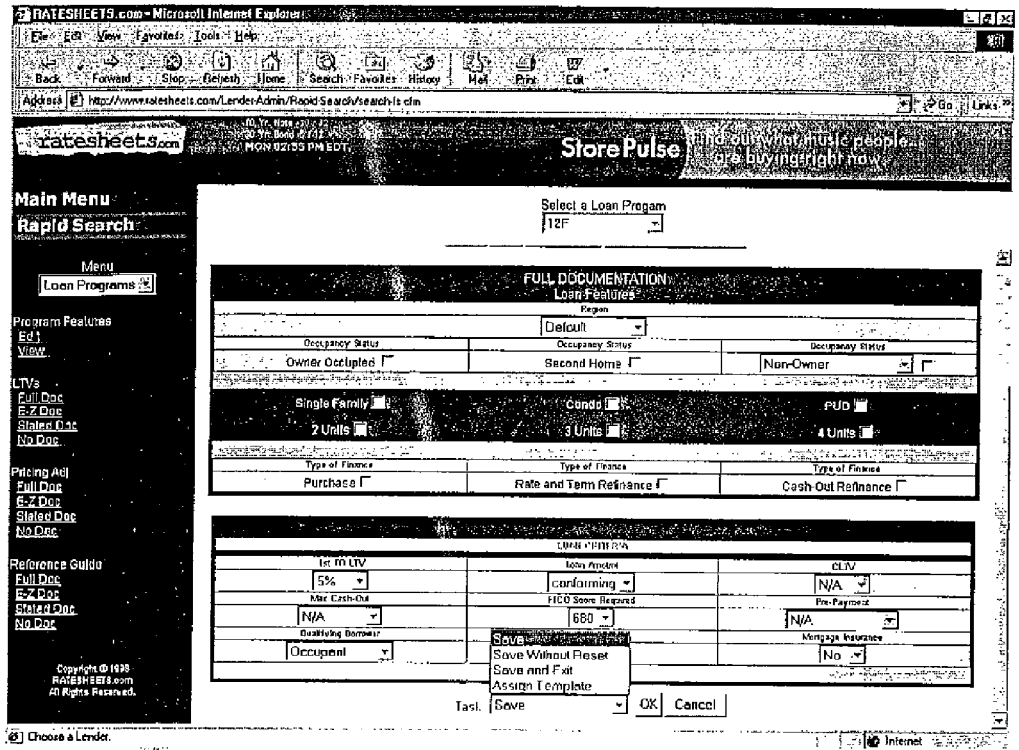
Fig. 5.15(b)

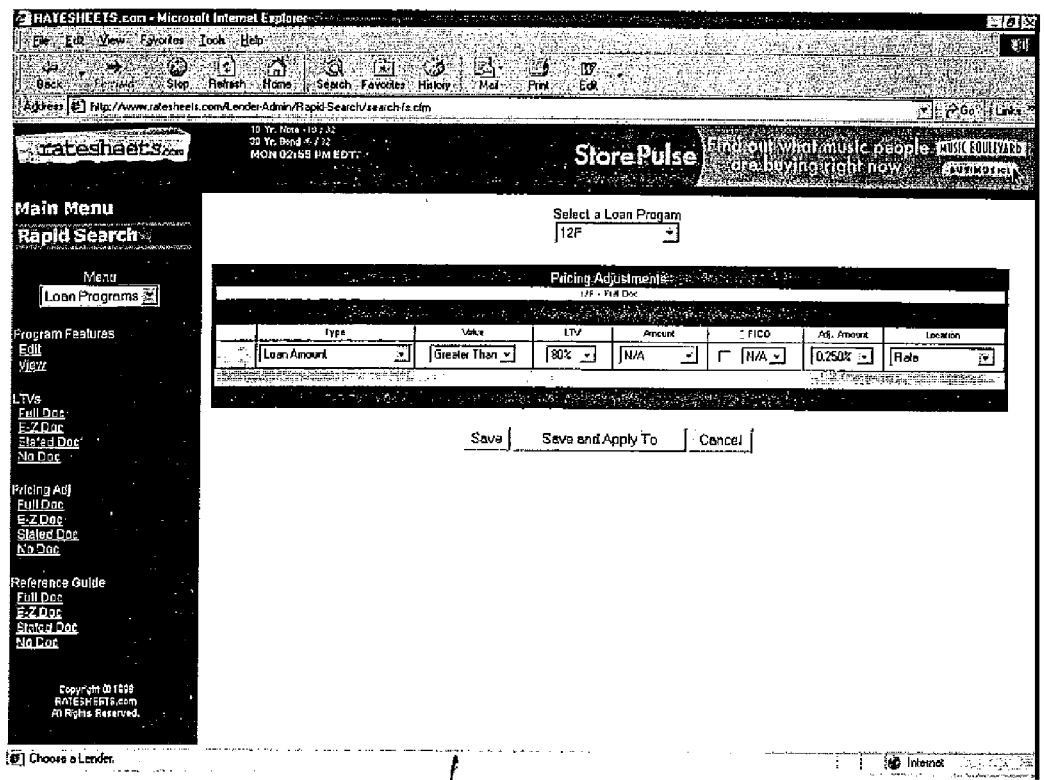
Fig. 5.16

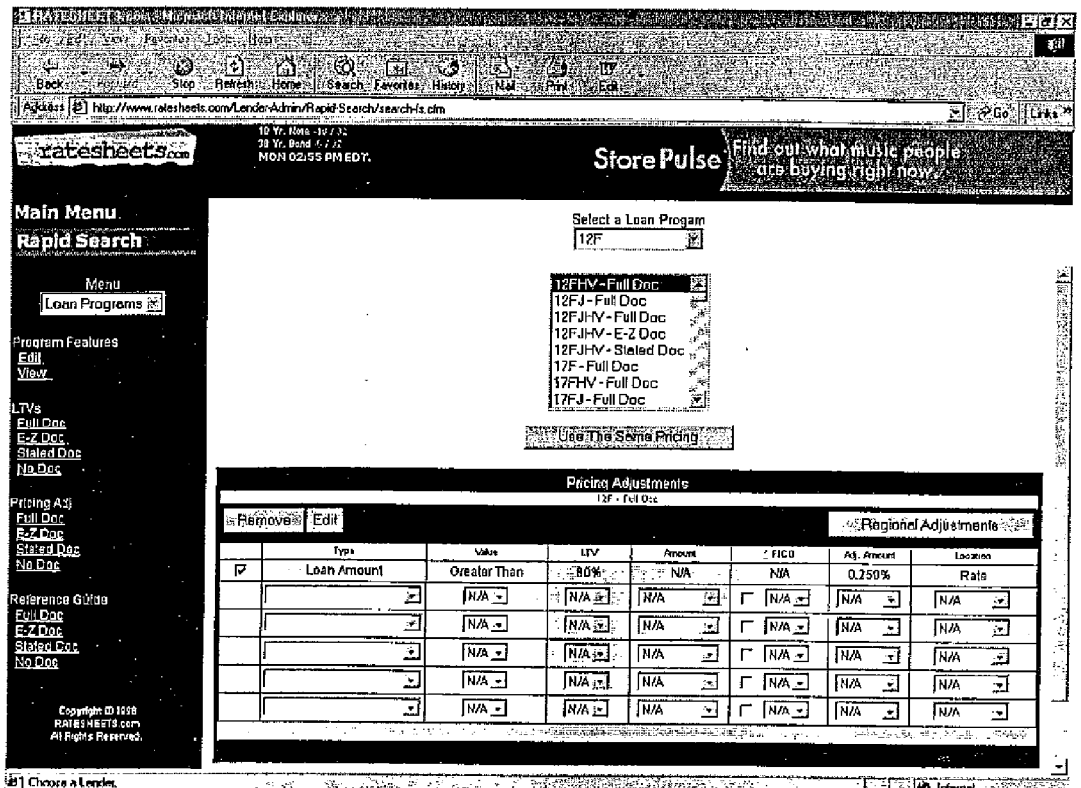
Fig. 5.17

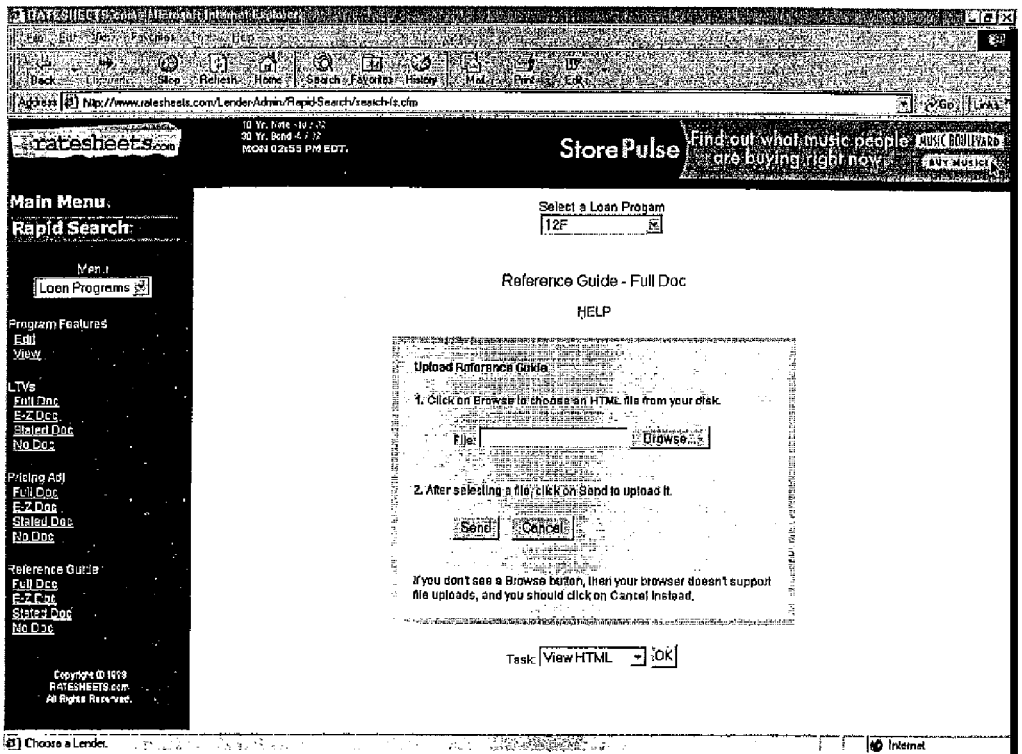
Fig. 5.18

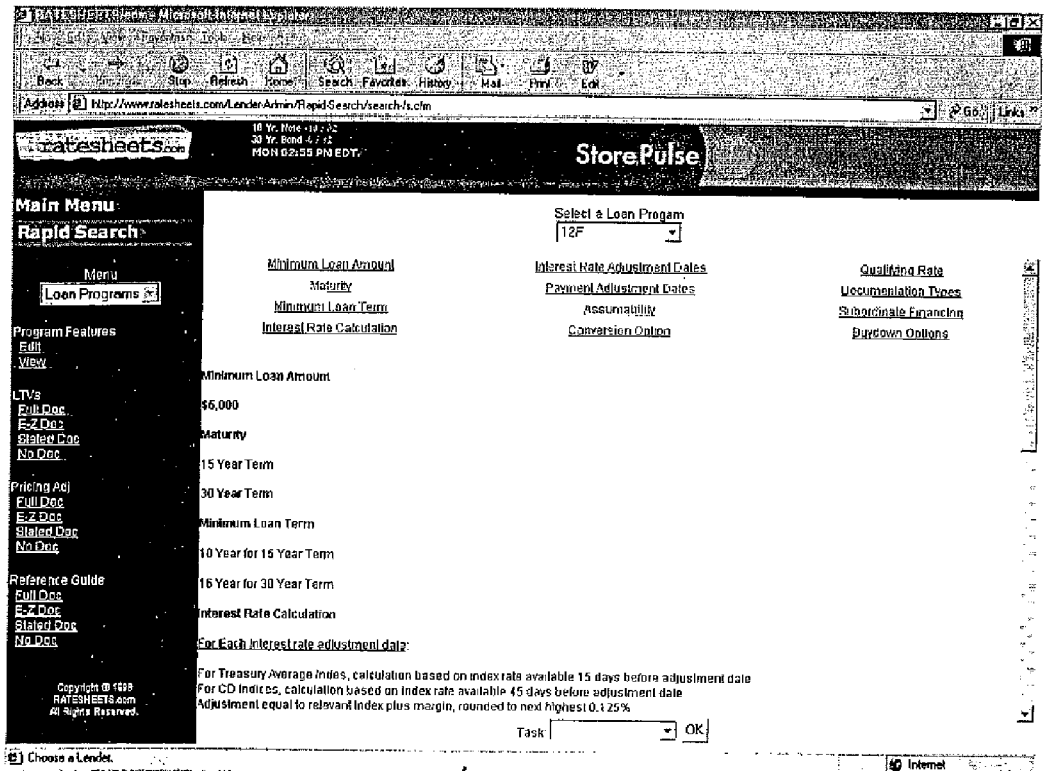
Fig. 5.19

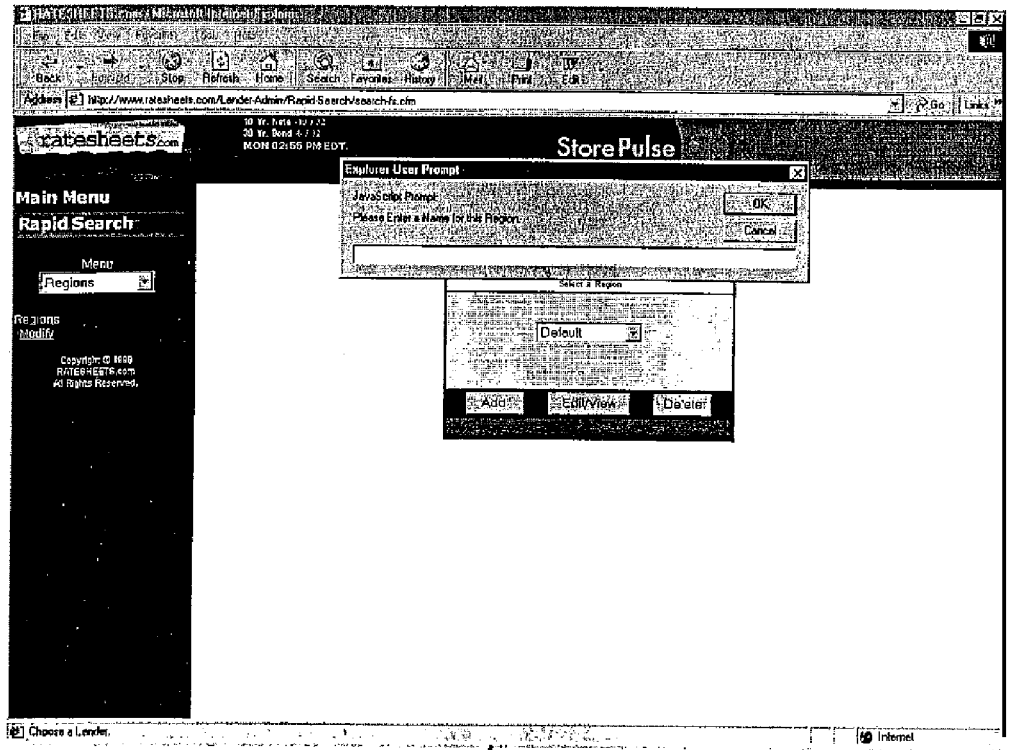
Fig. 5.20

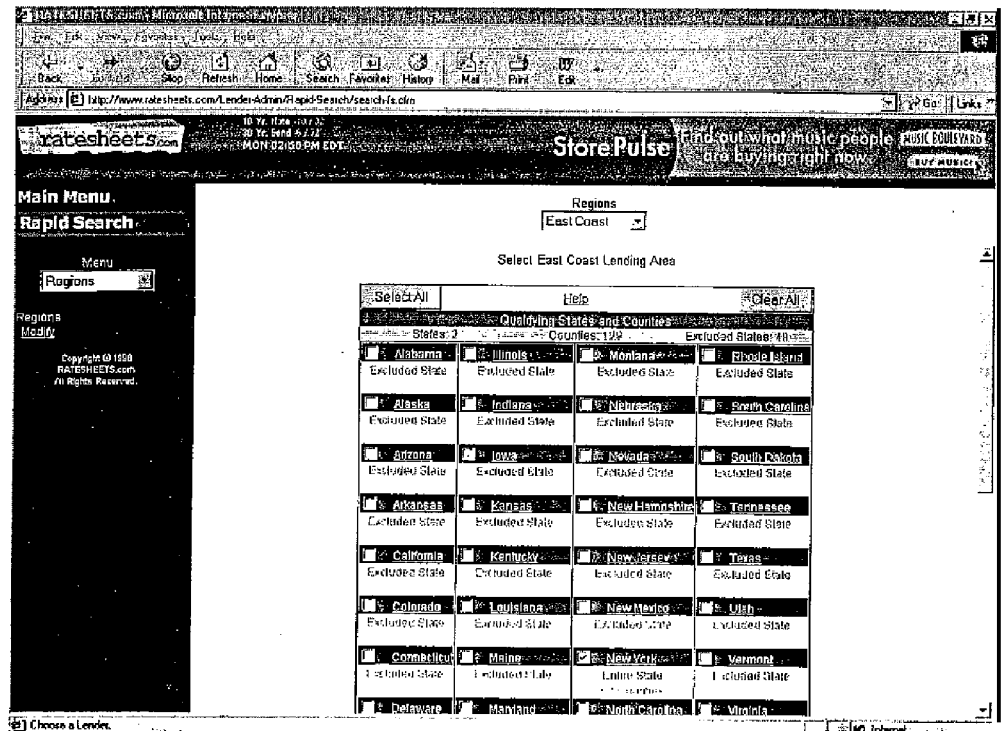
Fig. 5.21

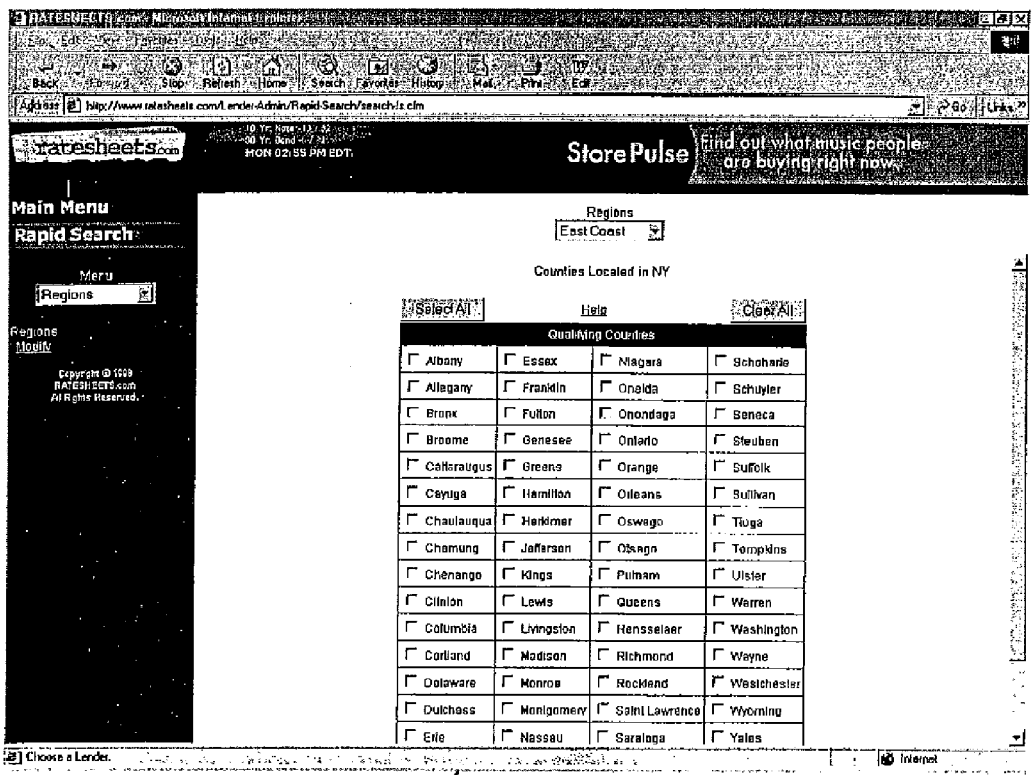
Fig. 5.22

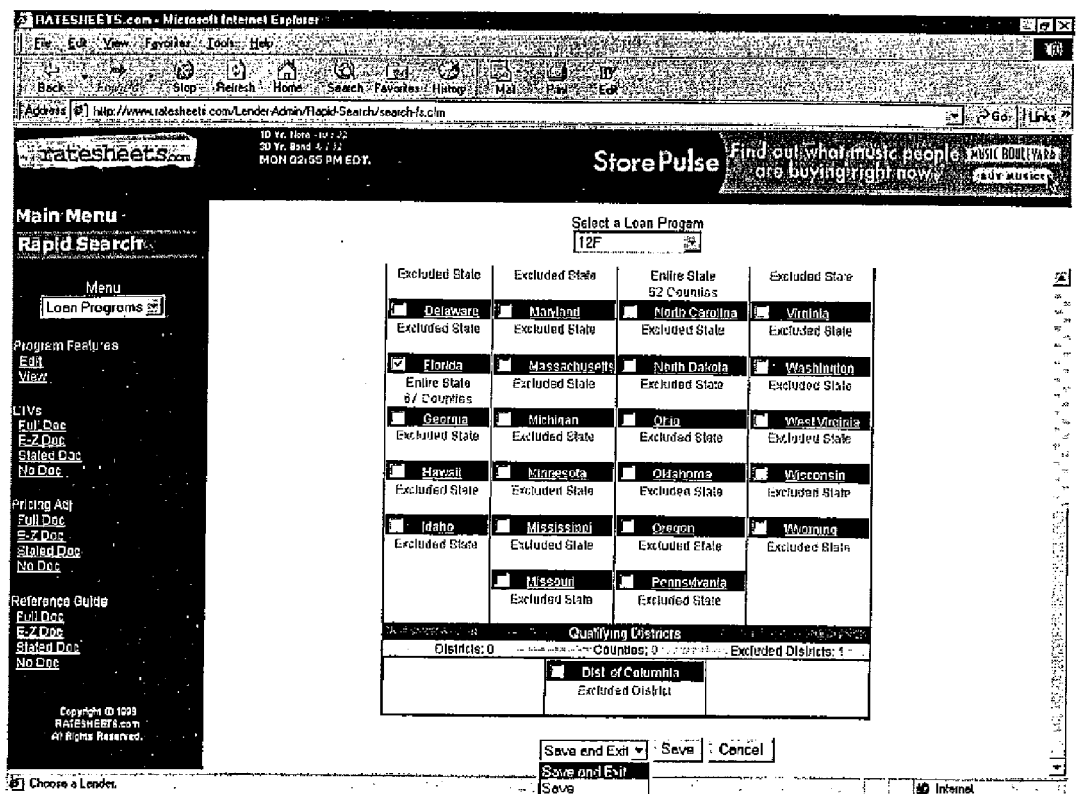
Fig. 5.23

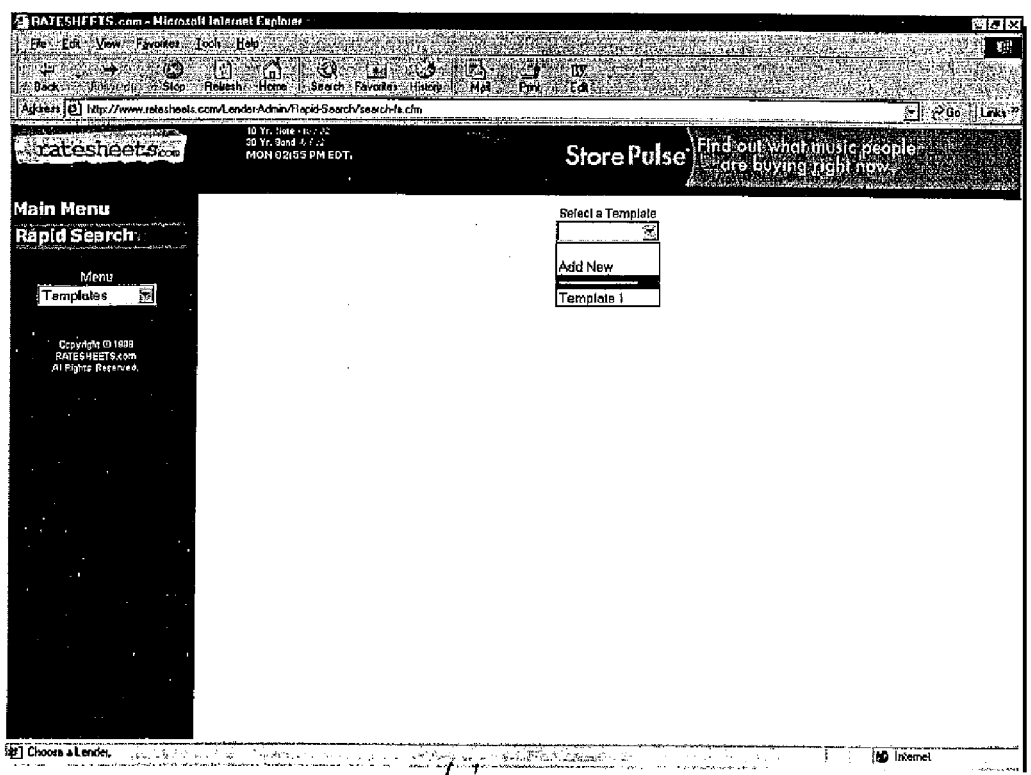
Fig. 5.24

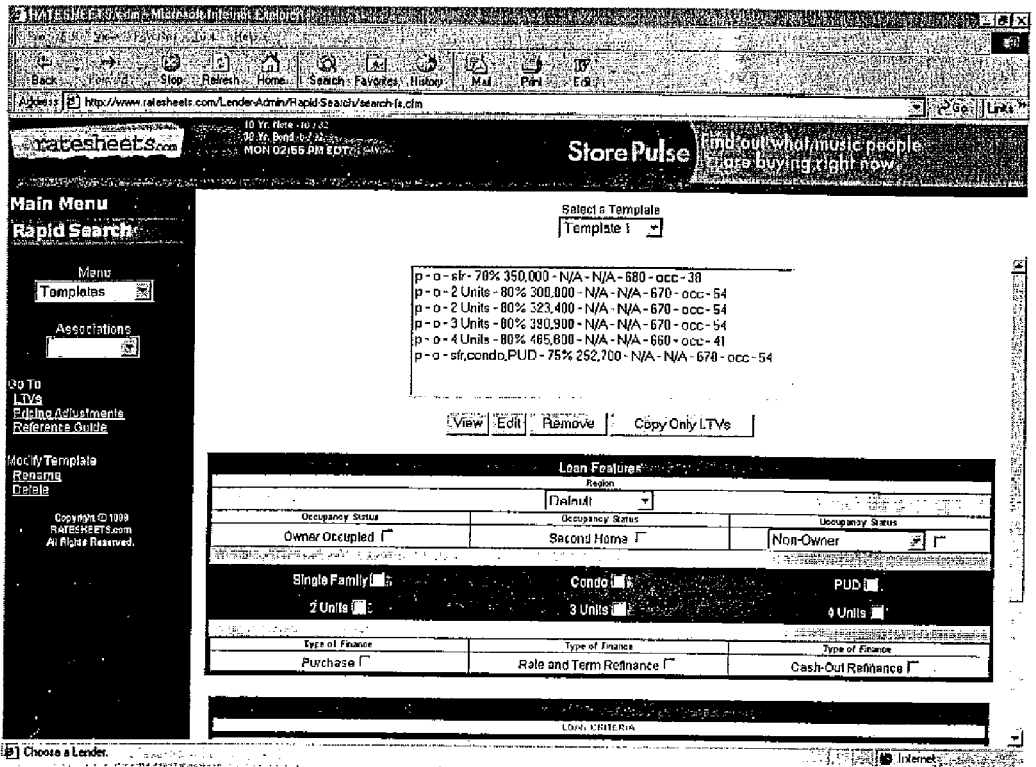
Fig. 5.25

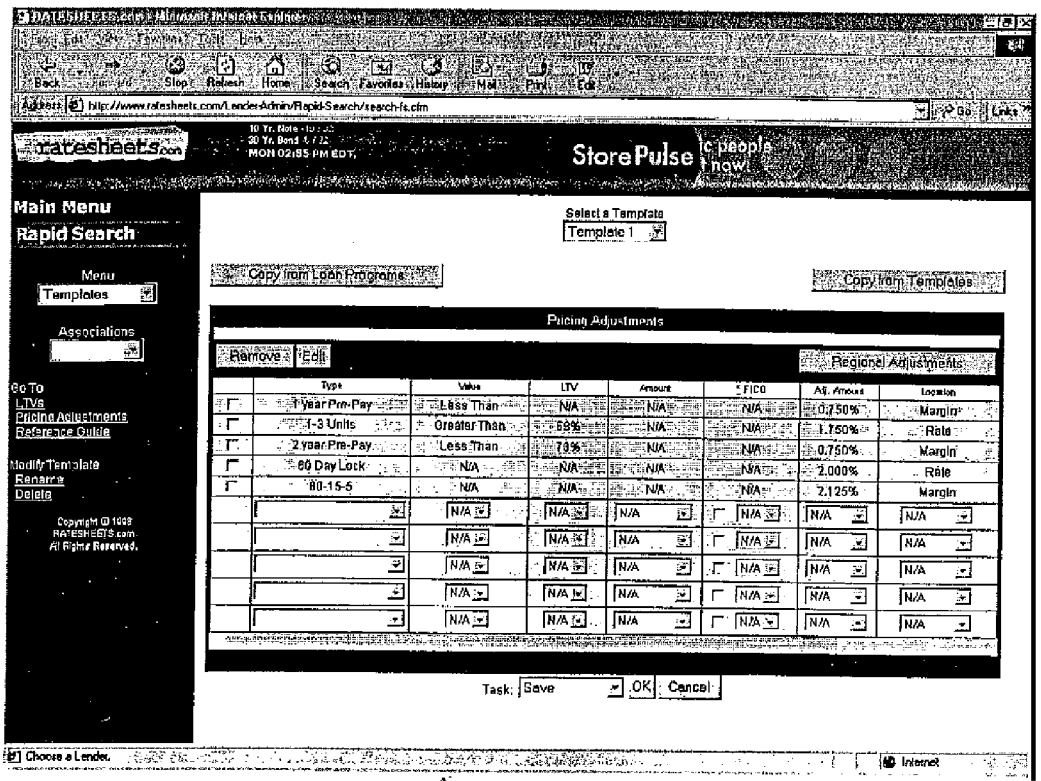
Fig. 5.26

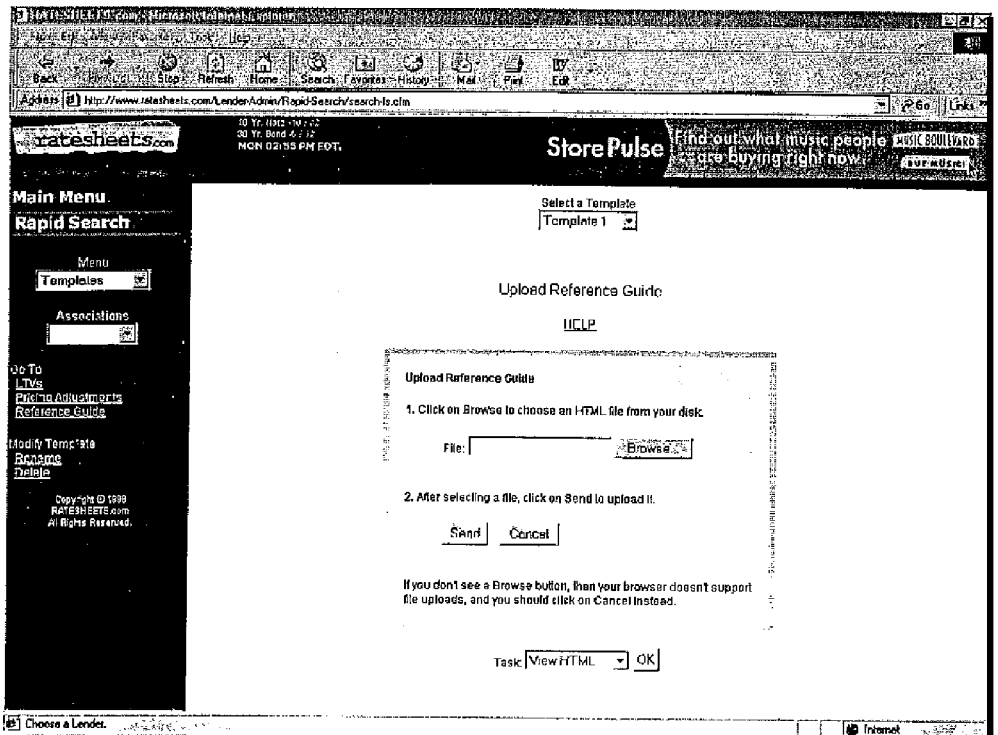
Fig. 5.27

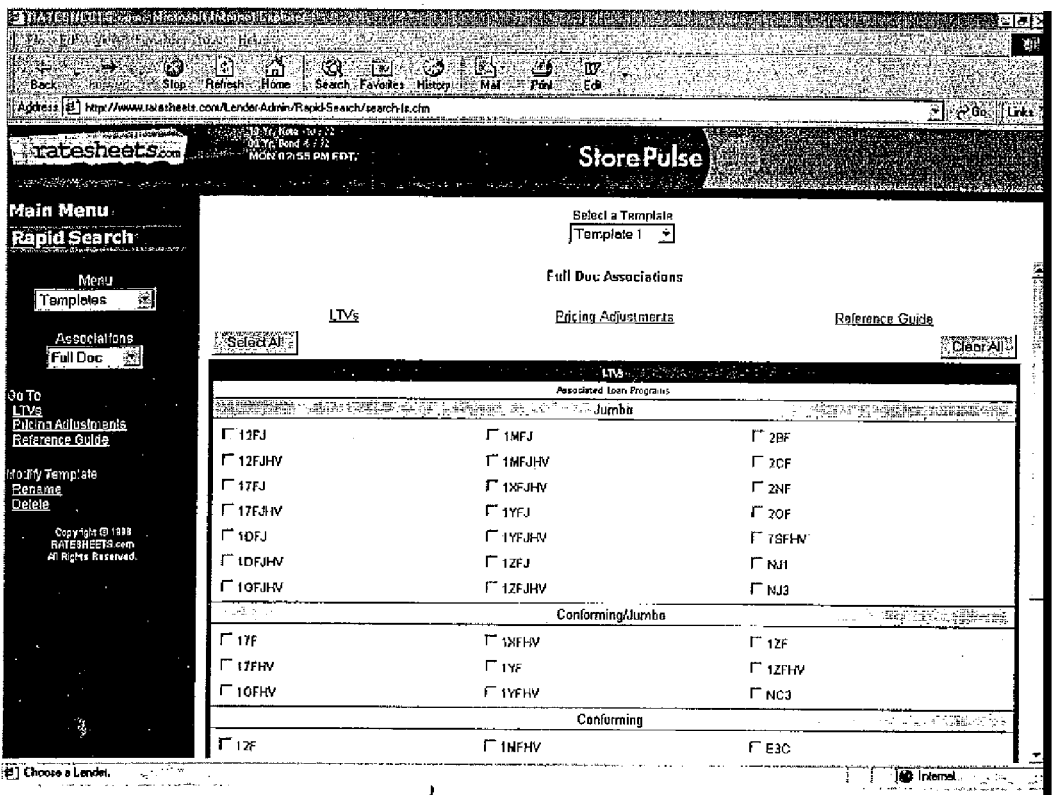
Fig. 5.28

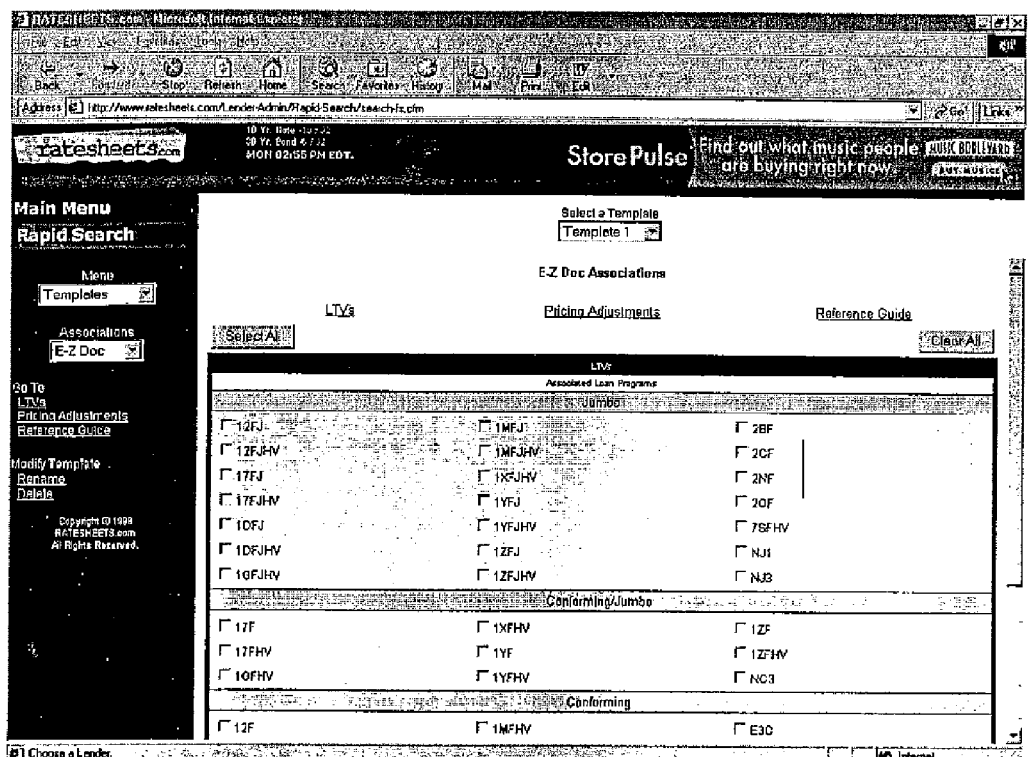
Fig. 5.29

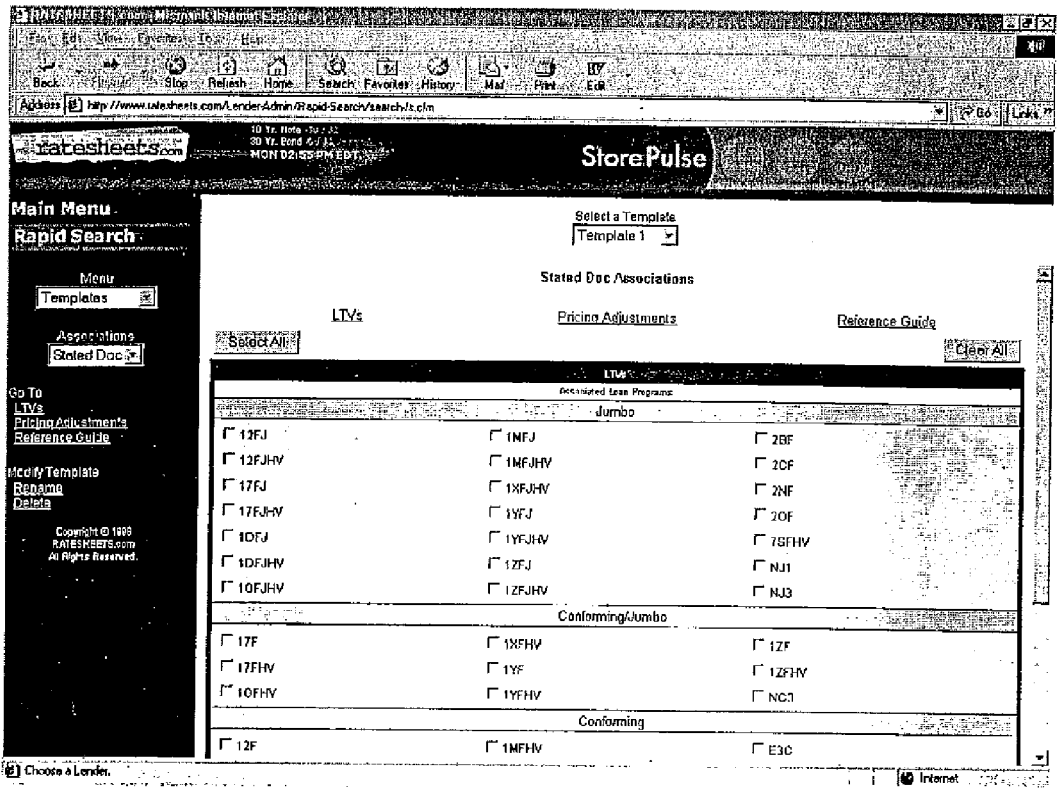
Fig. 5.30

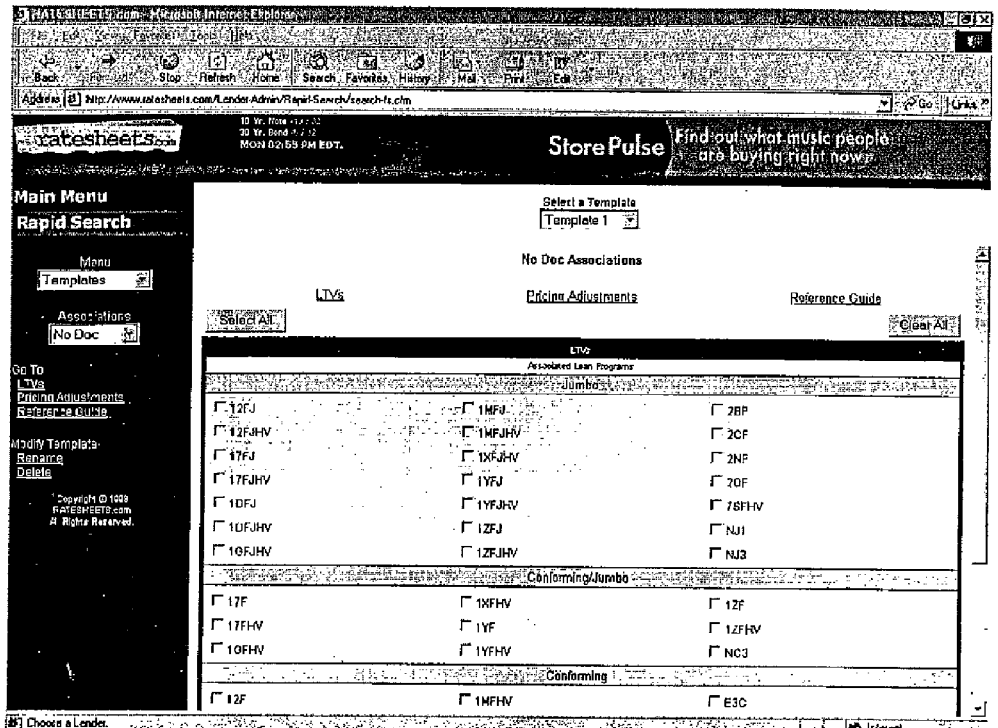
Fig. 5.31

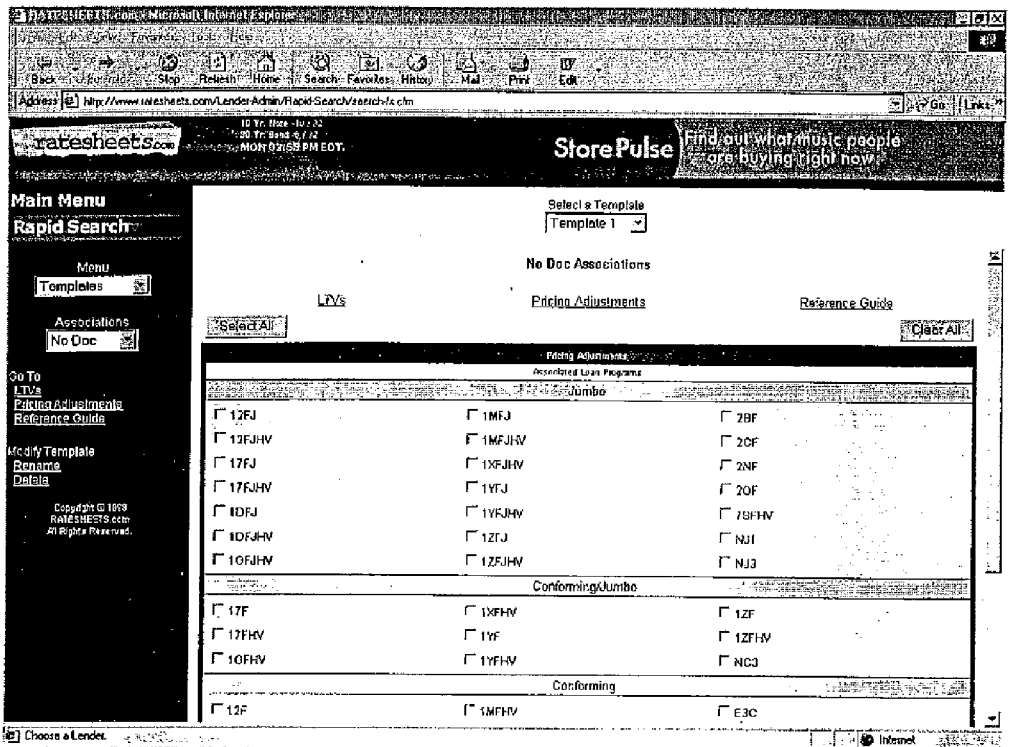
Fig. 5.32

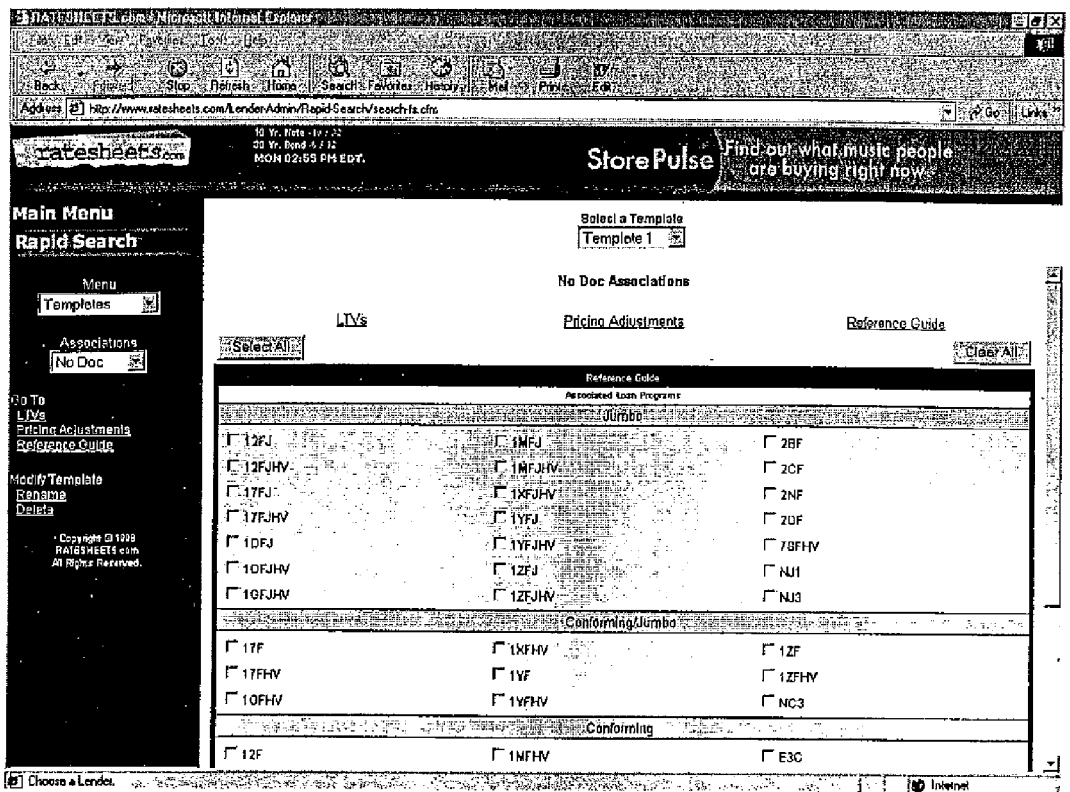
Fig. 5.33

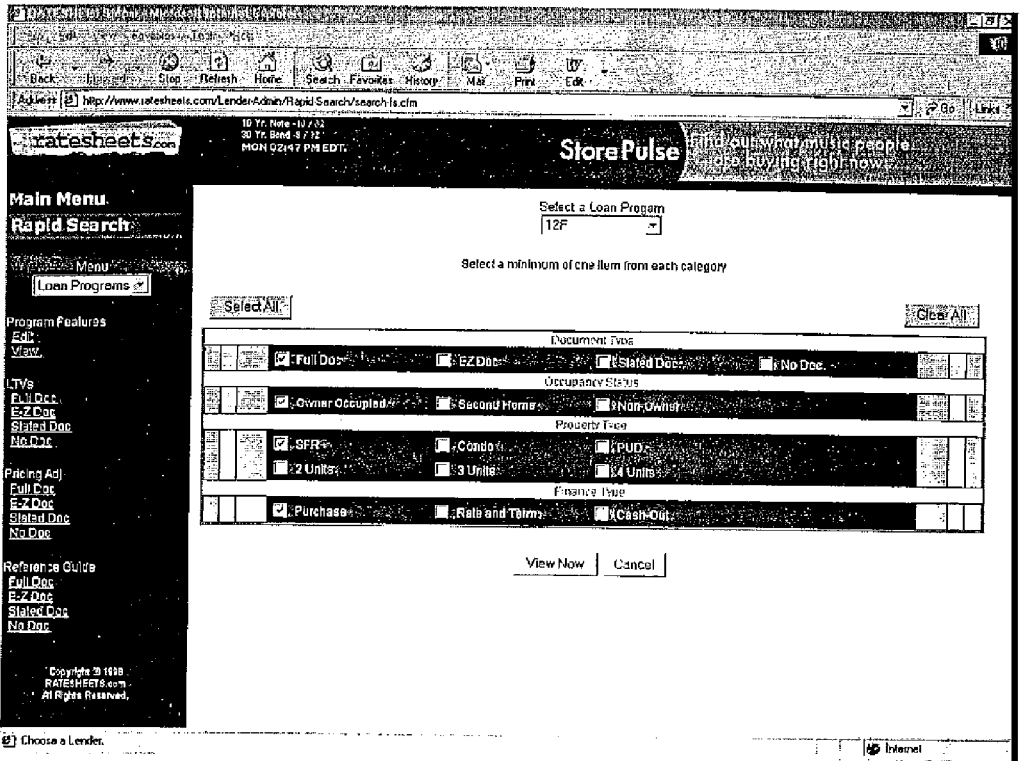
Fig. 5.34

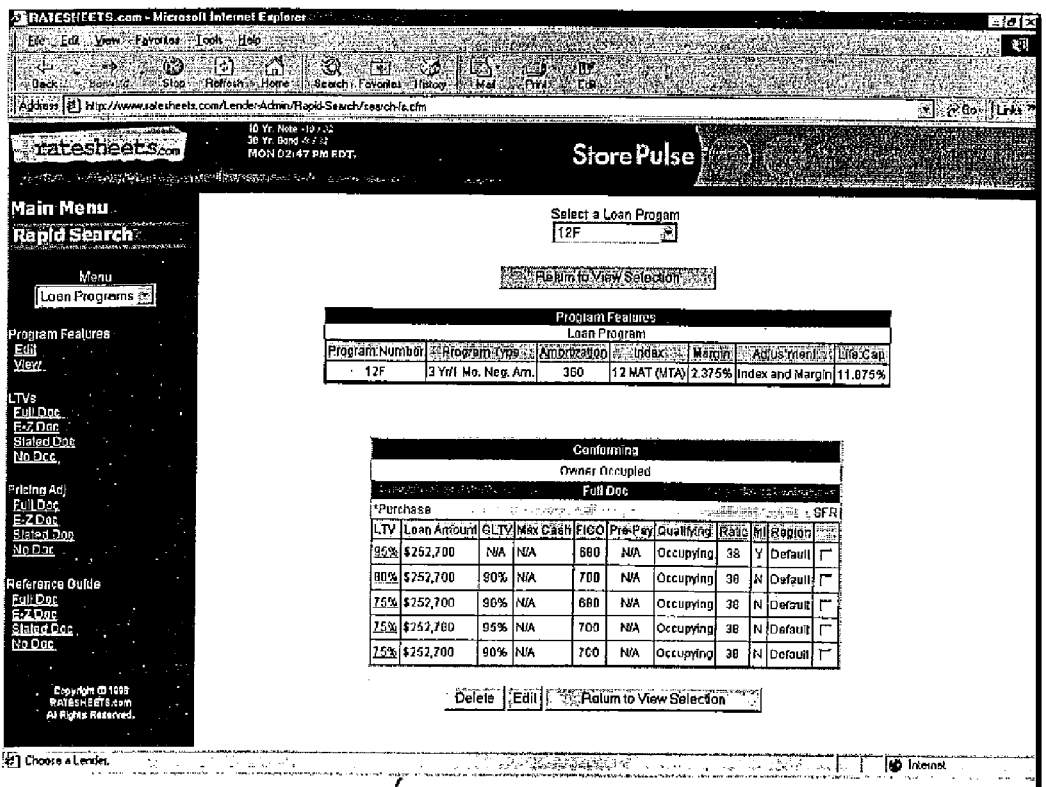
Fig. 5.35

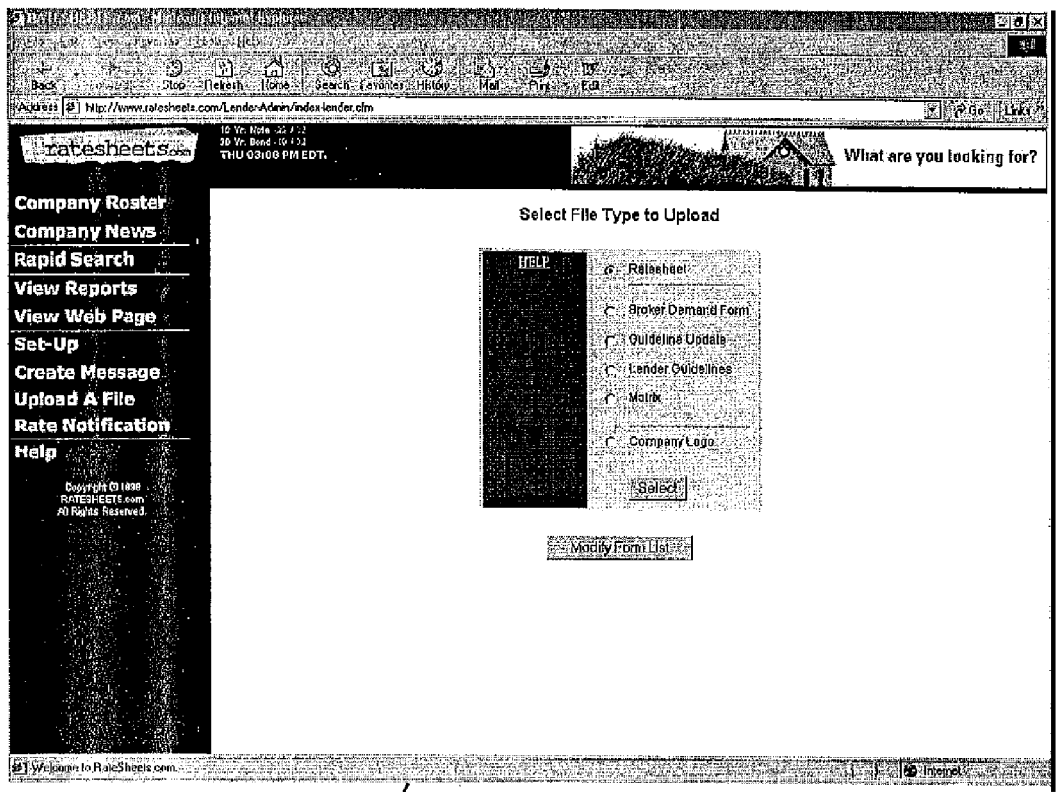
Fig. 5.38

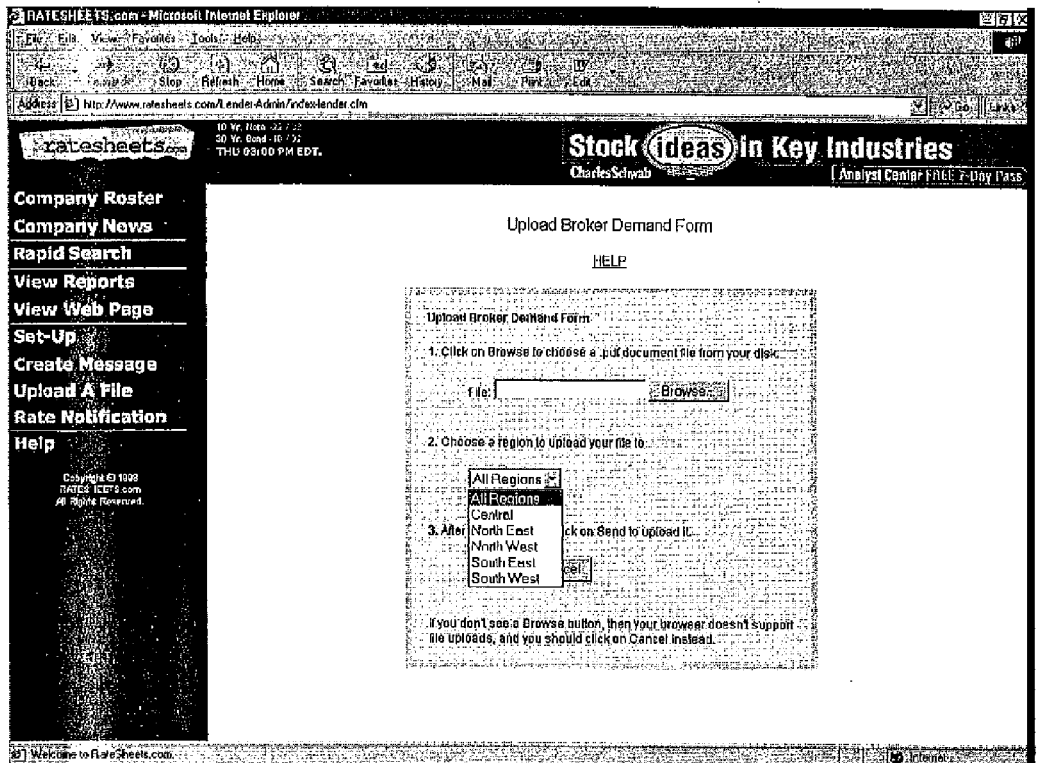
Fig. 5.39

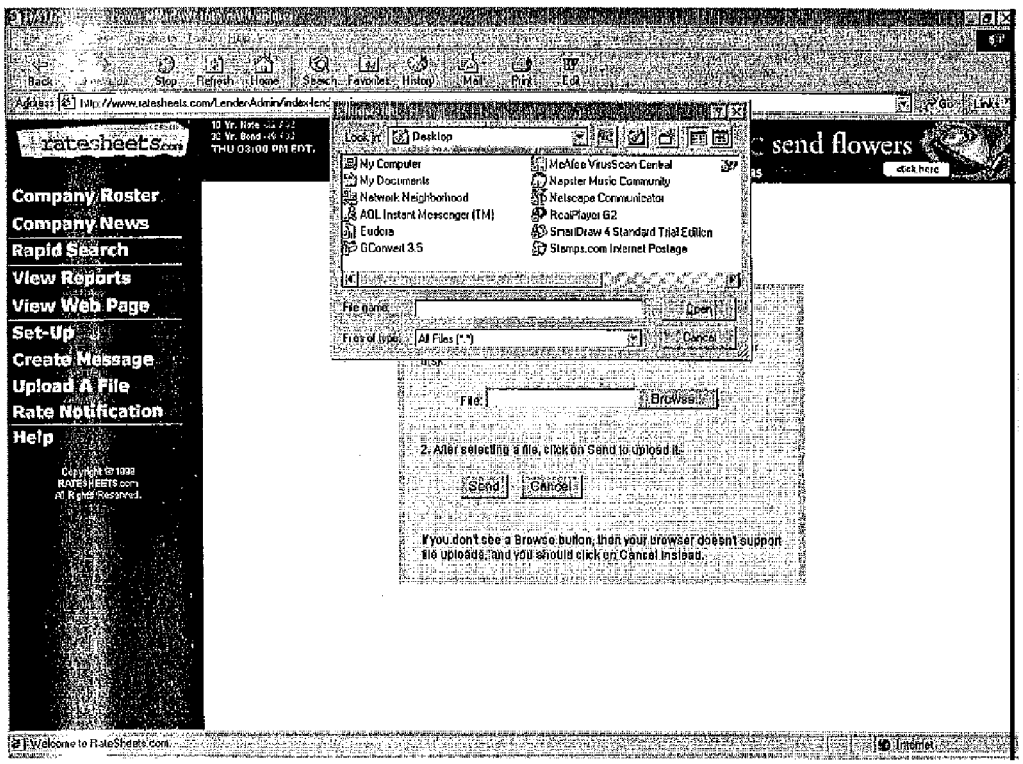
Fig. 5.40

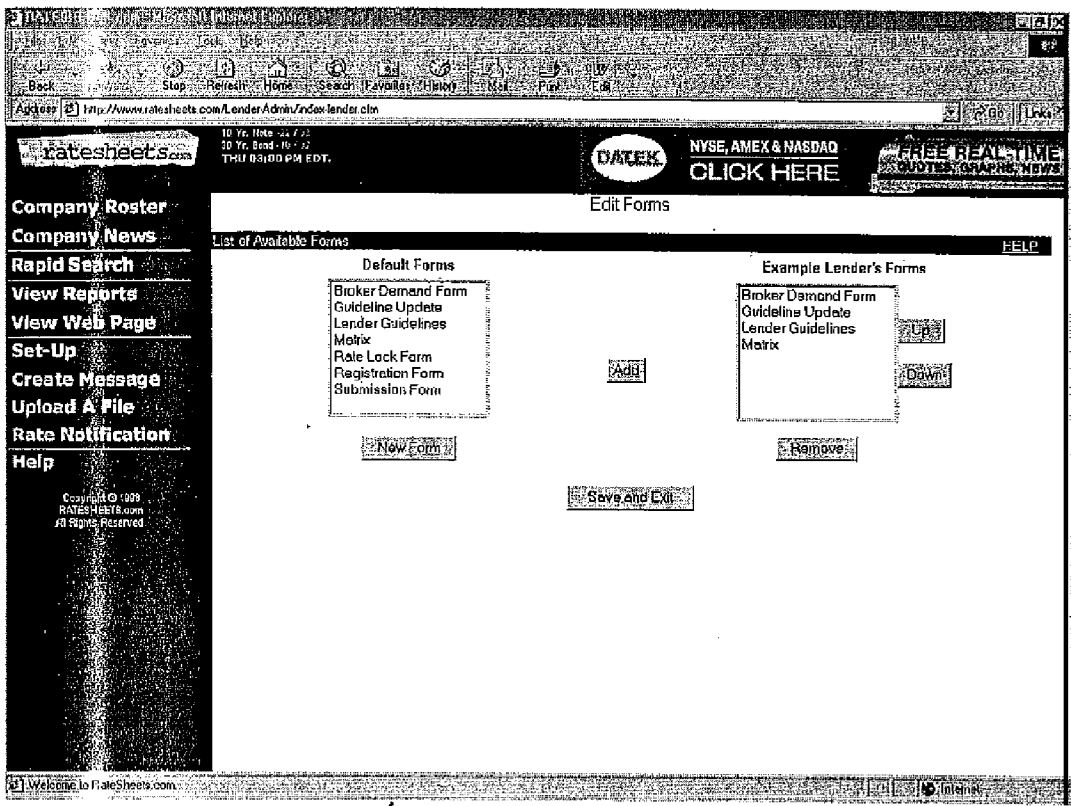
Fig. 5.41

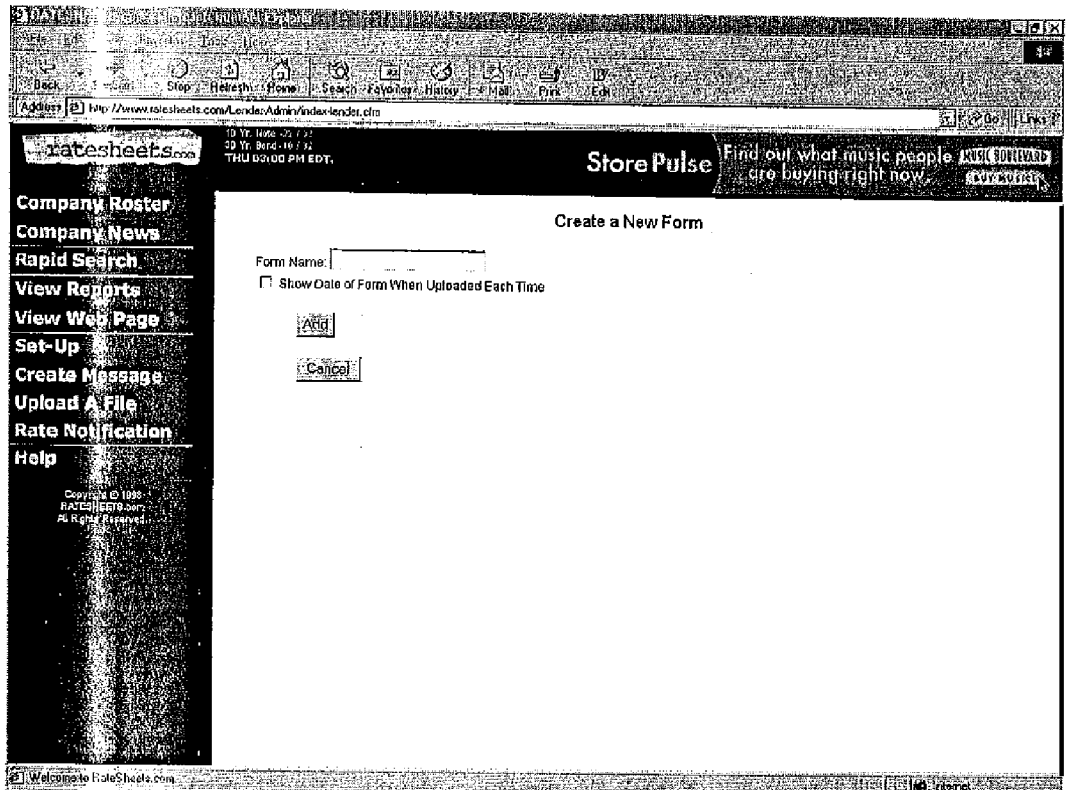
Fig. 5.42

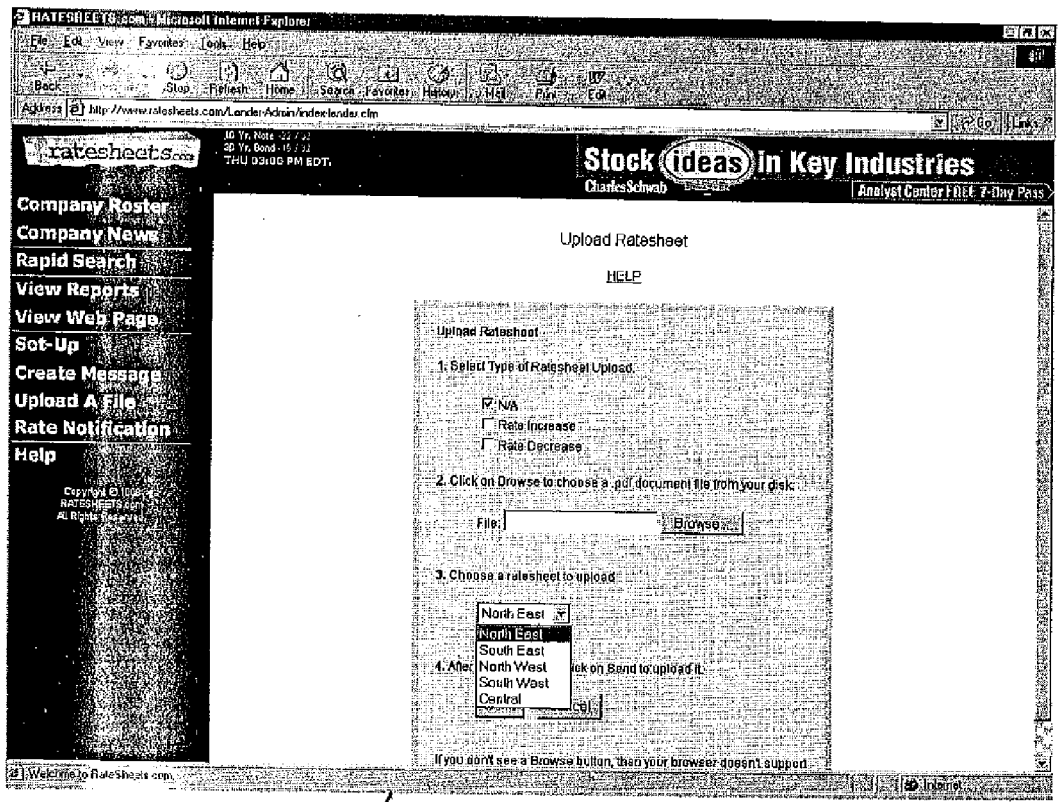
Fig. 5.43

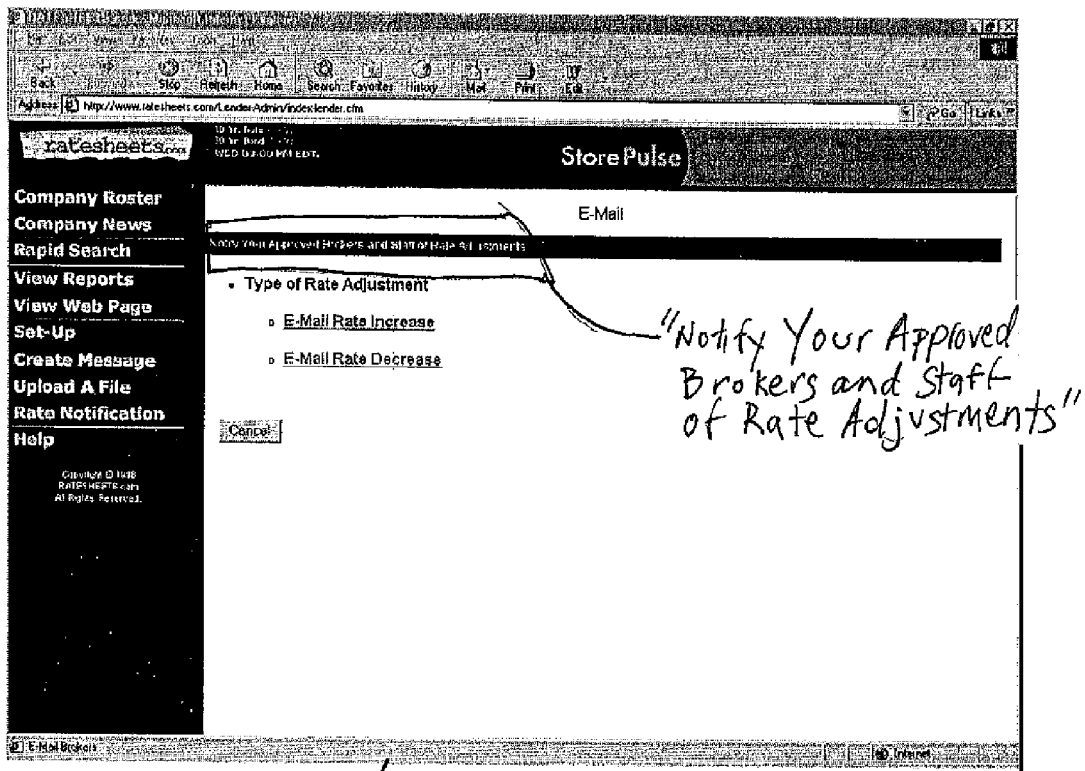
Fig. 5.44

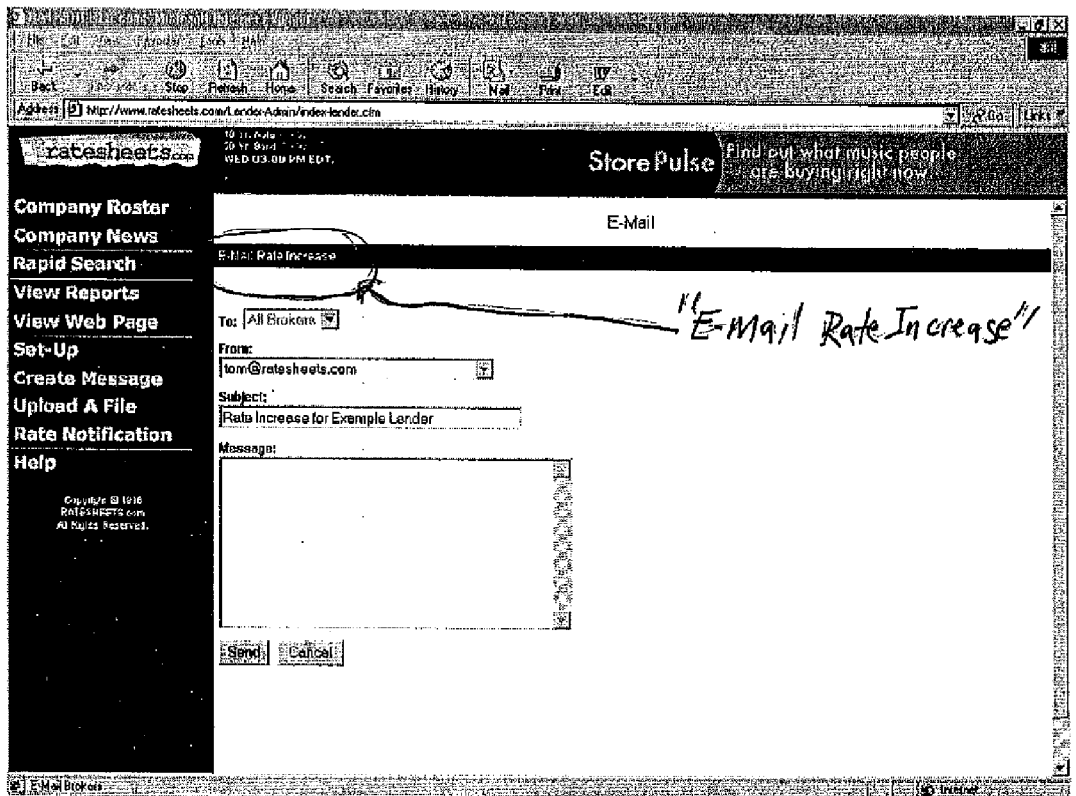
Fig. 5.45

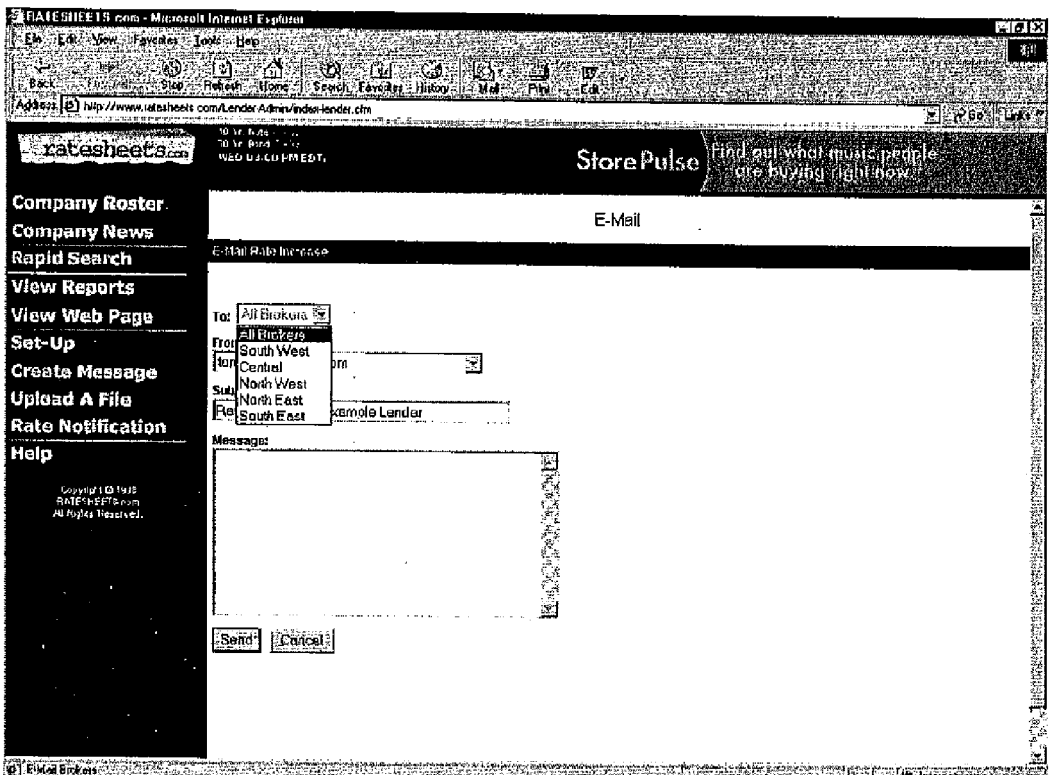
Fig. 5.46

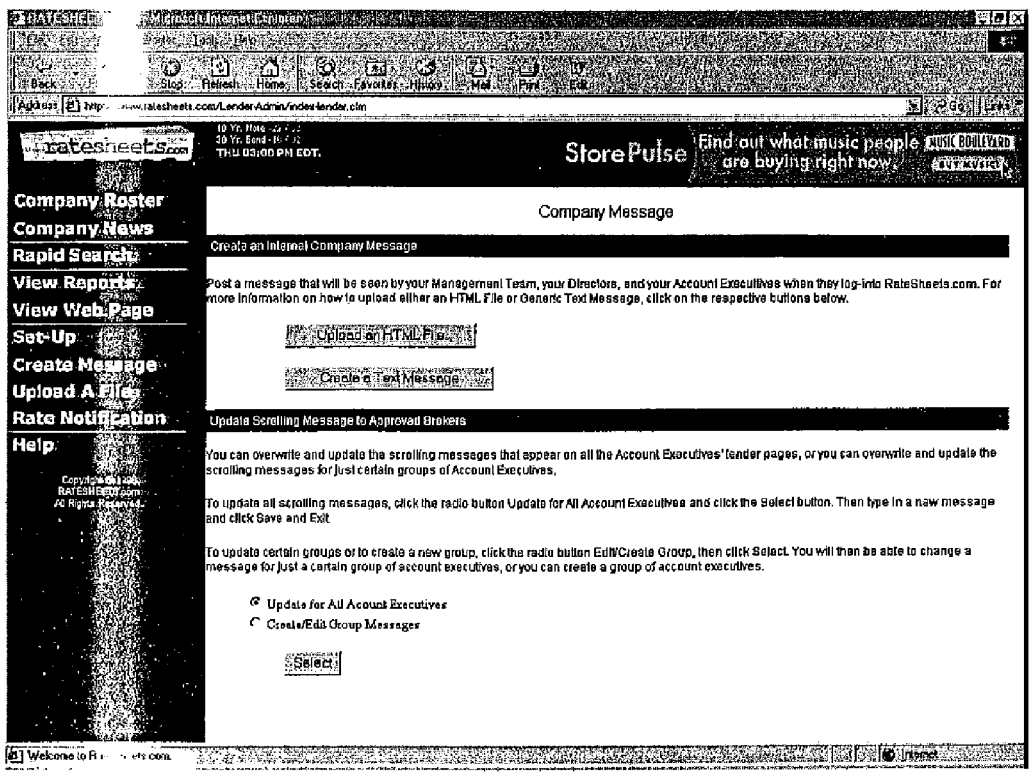
Fig. 5.47

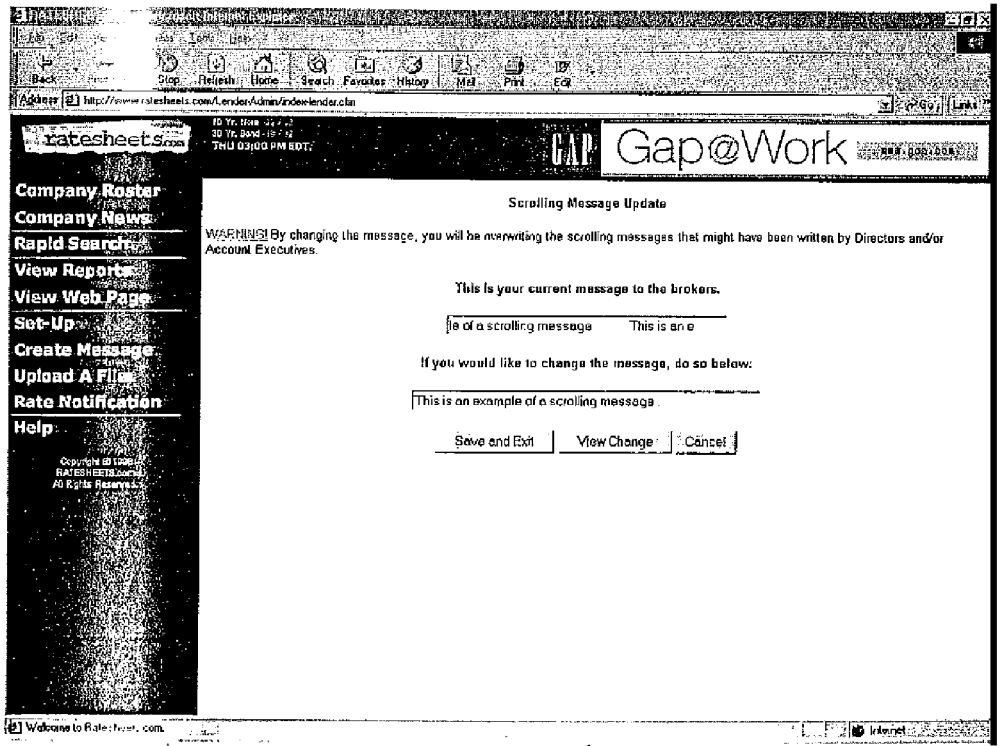
Fig. 5.48

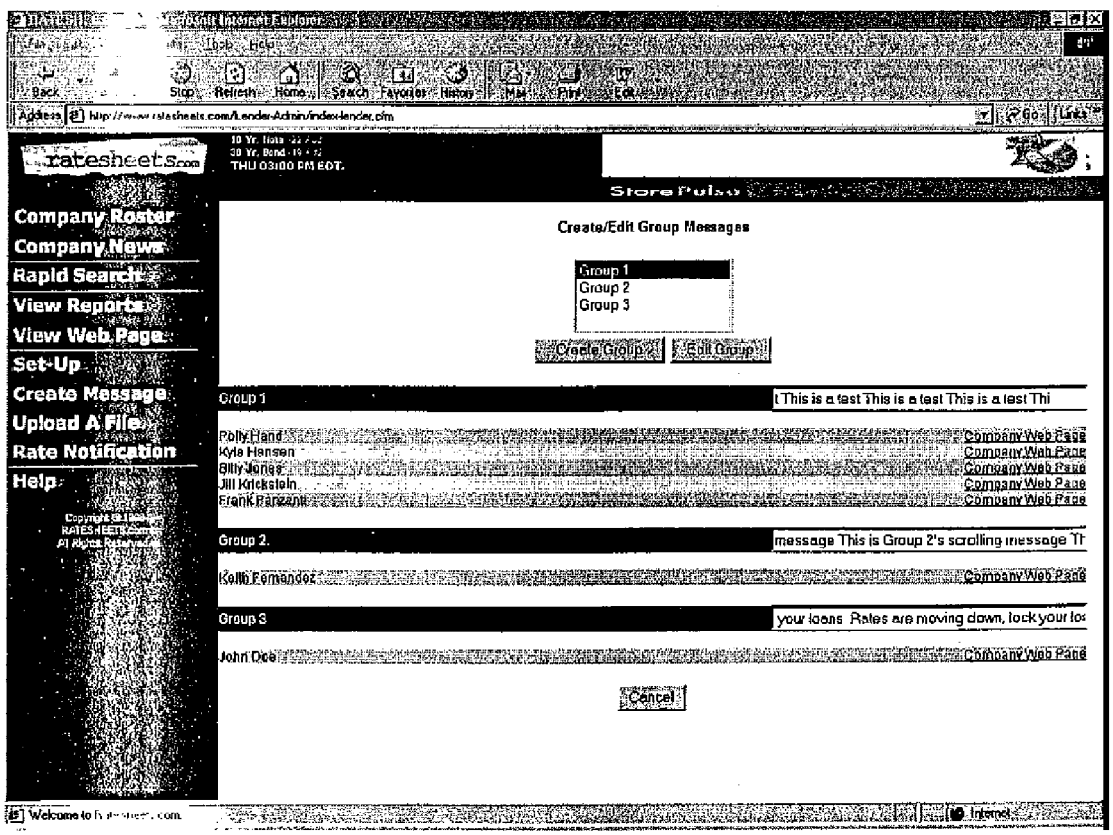
Fig. 5.49

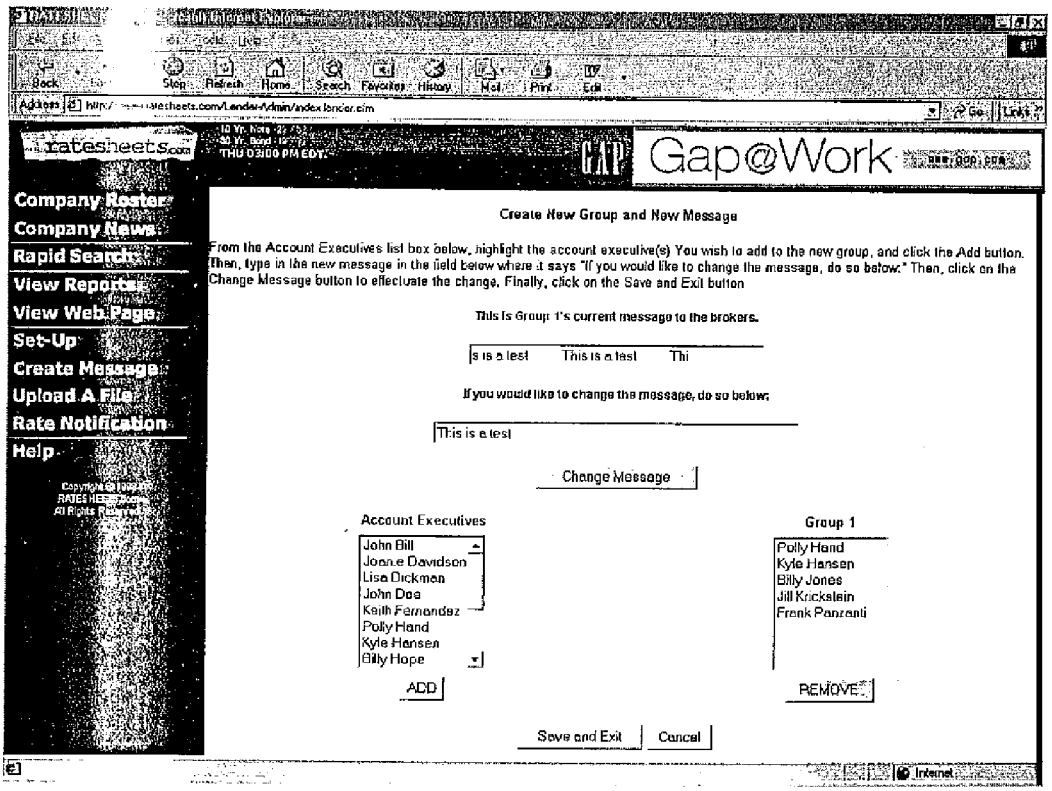
Fig. 5.50

Fig. 5.51

Fig. 5.52

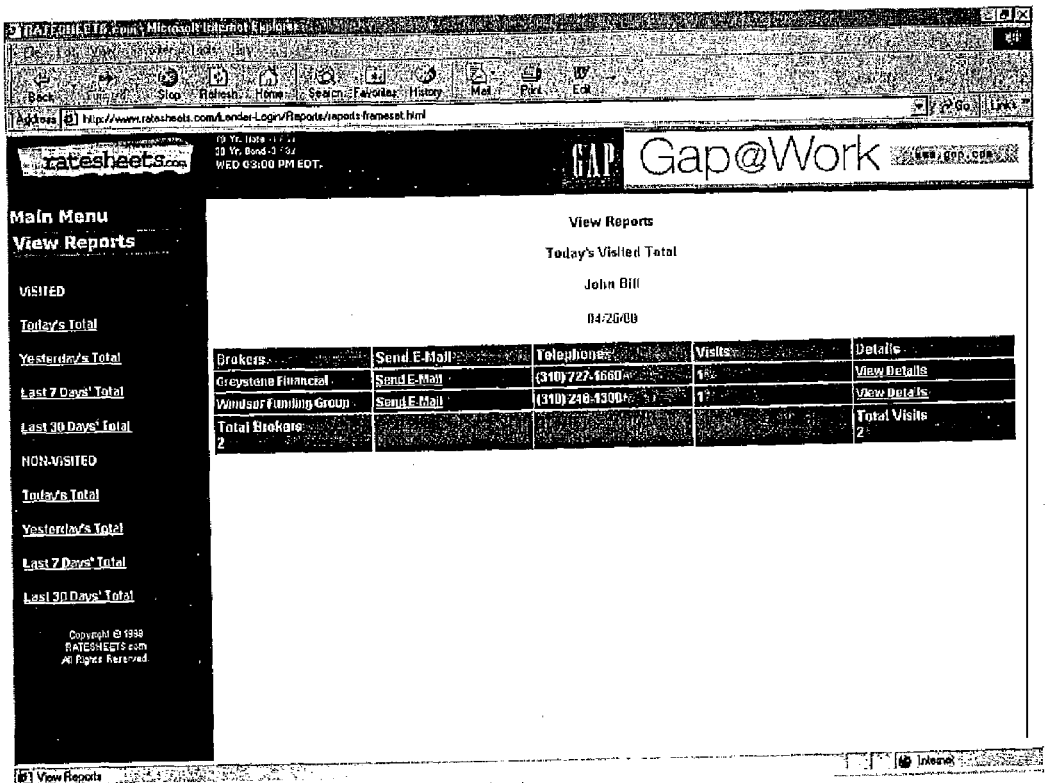
Fig. 5.53

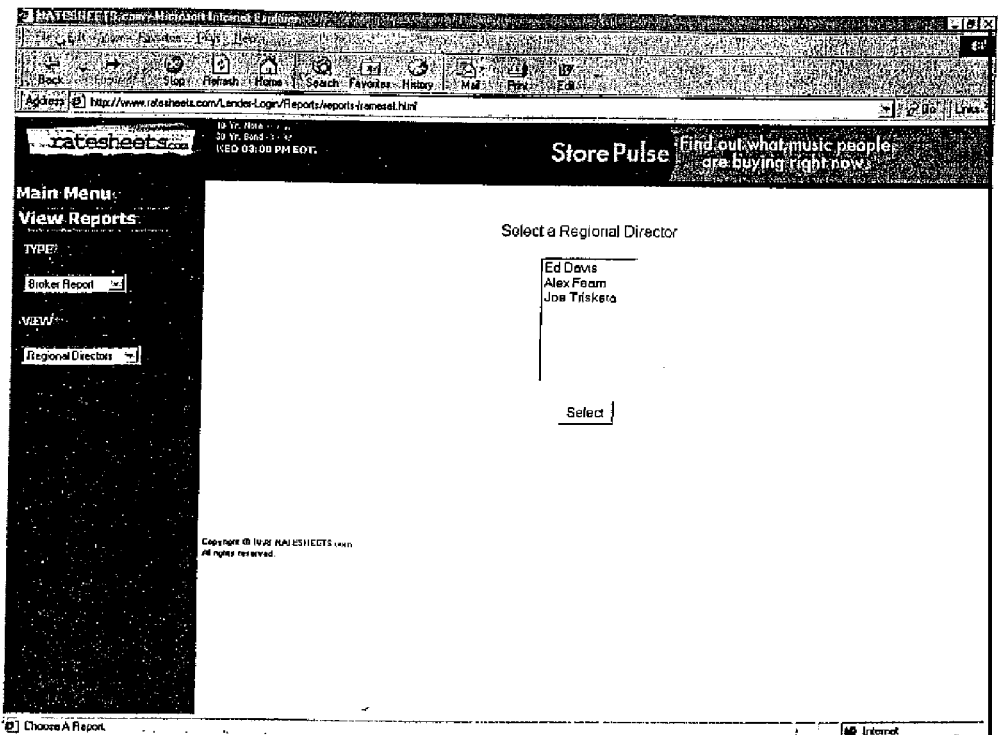
Fig. 5.54

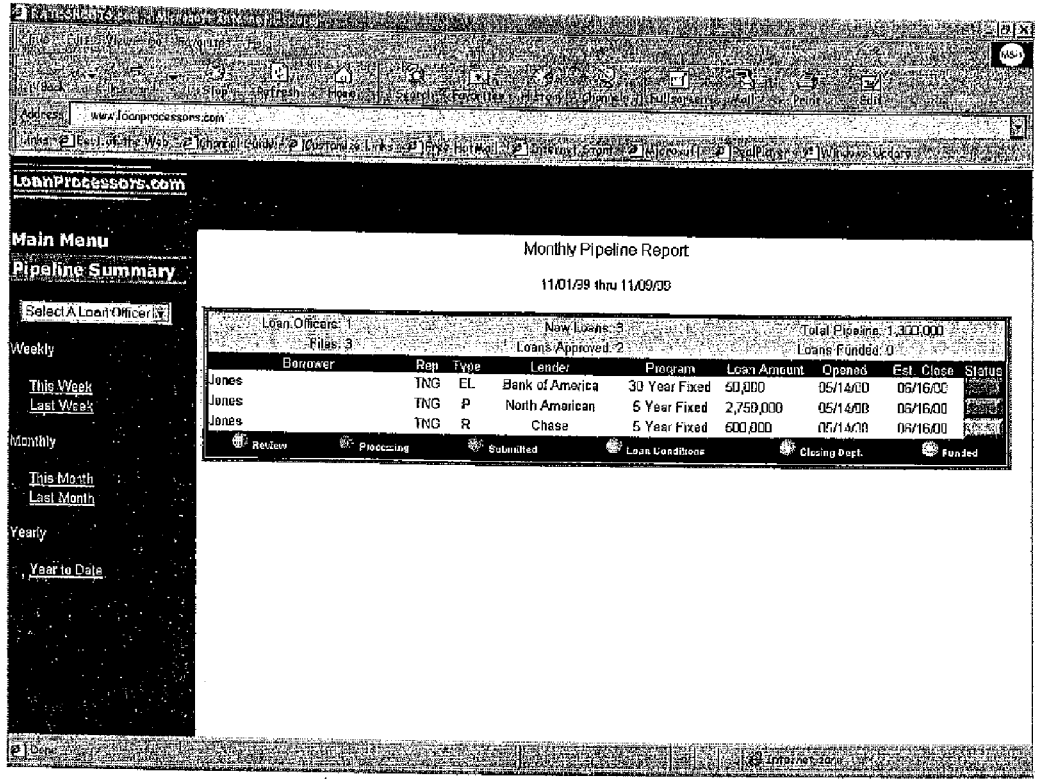
15.55
Fig. 5.55

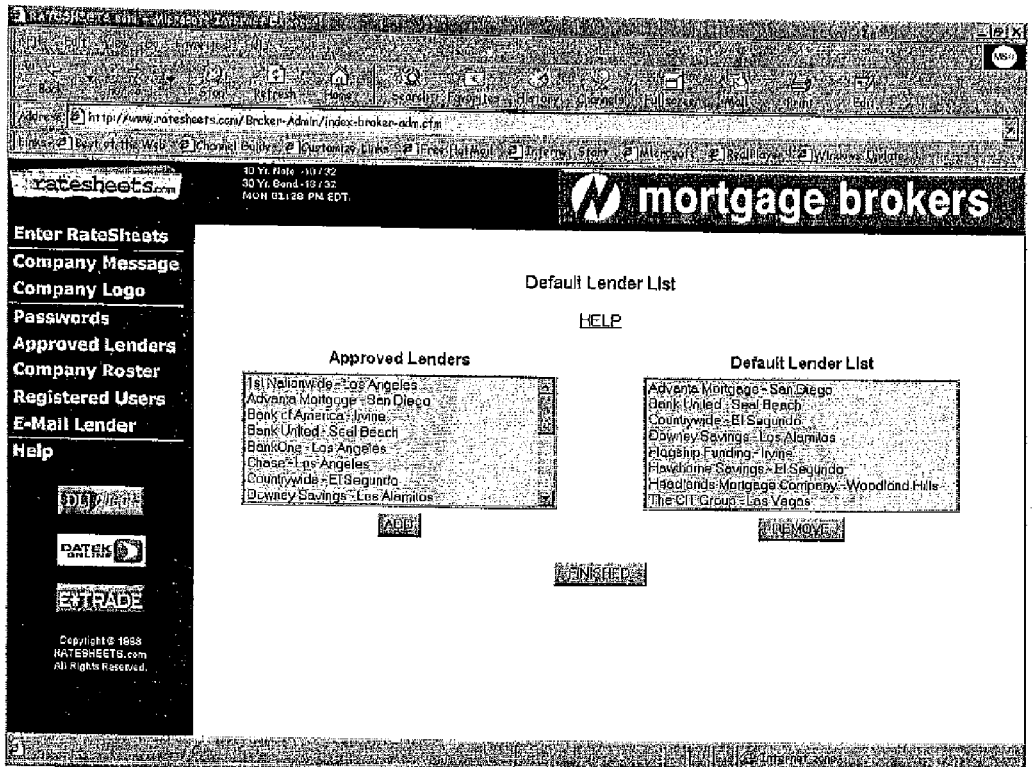
15.56
Fig. 6.1

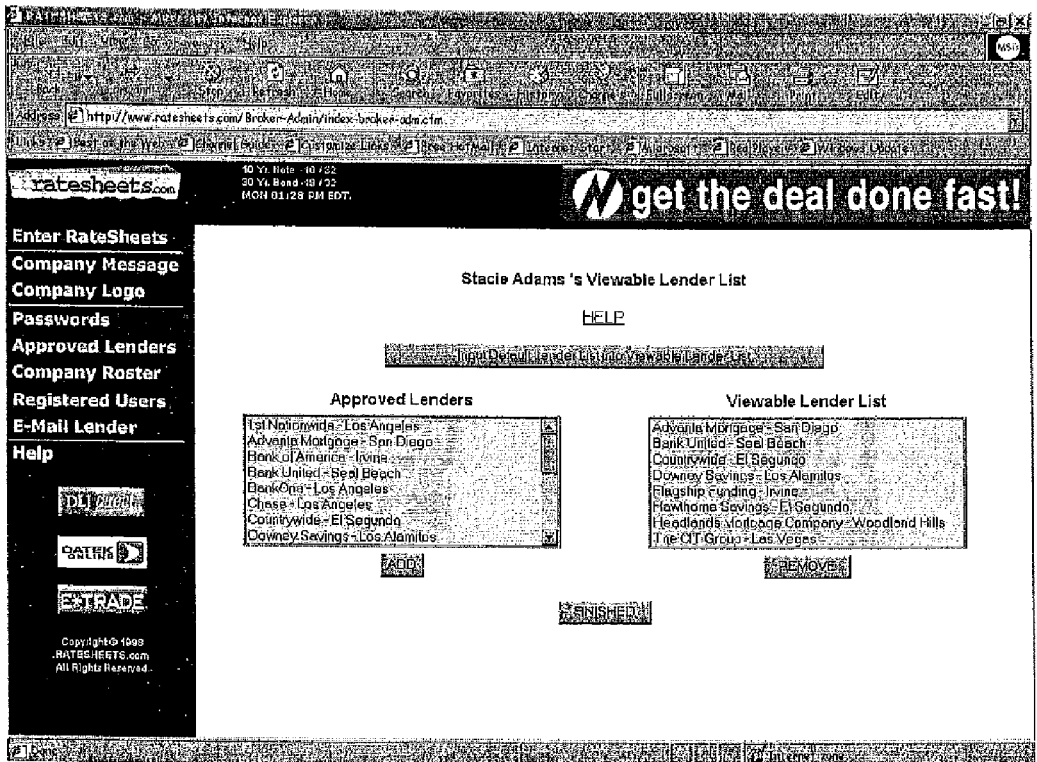
15.57
Fig. 6.2

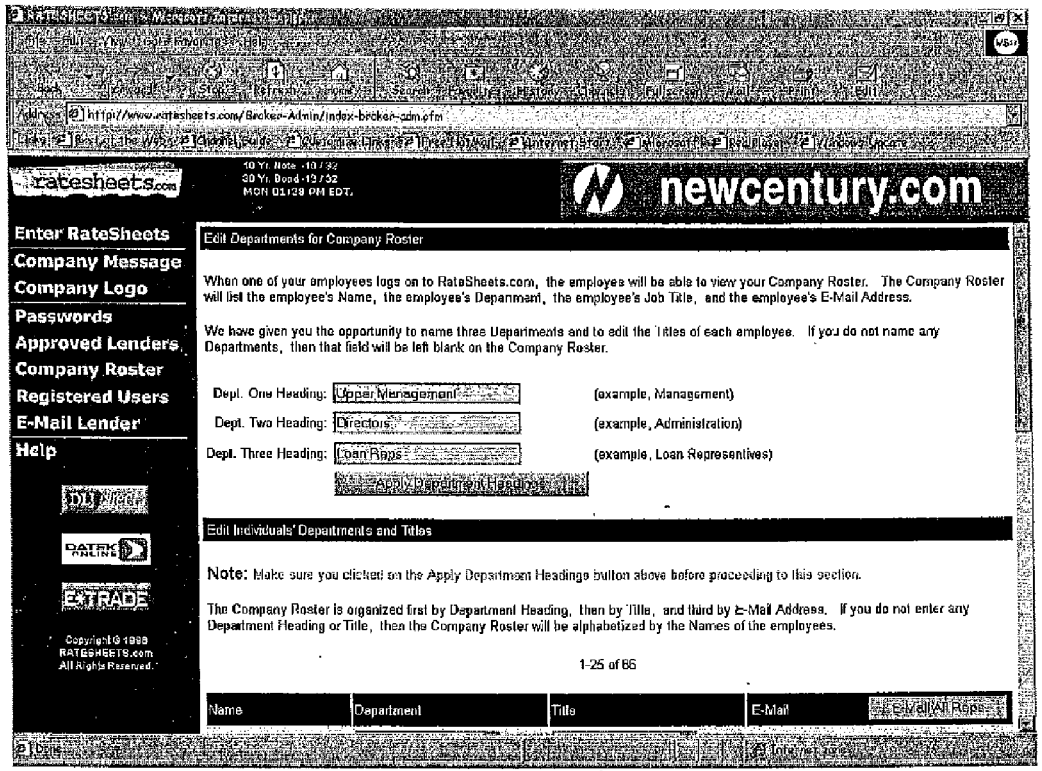
Fig. 6.3

Fig. 6.4

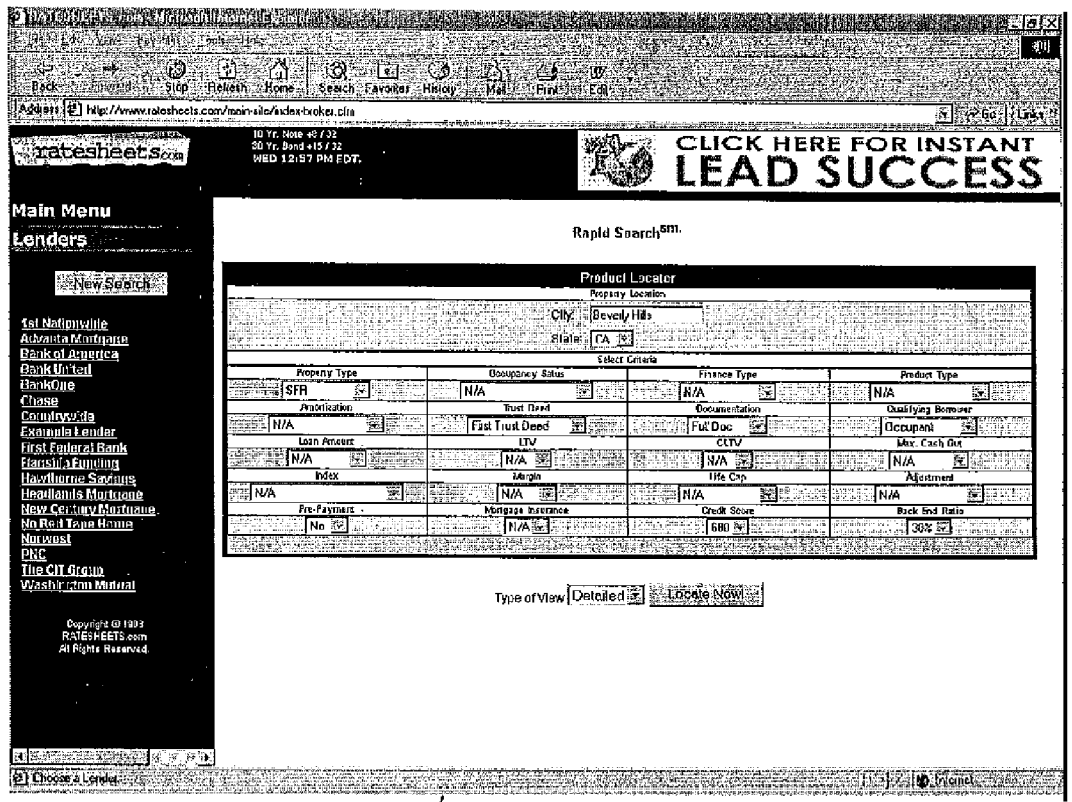
15.60
Fig-6.5

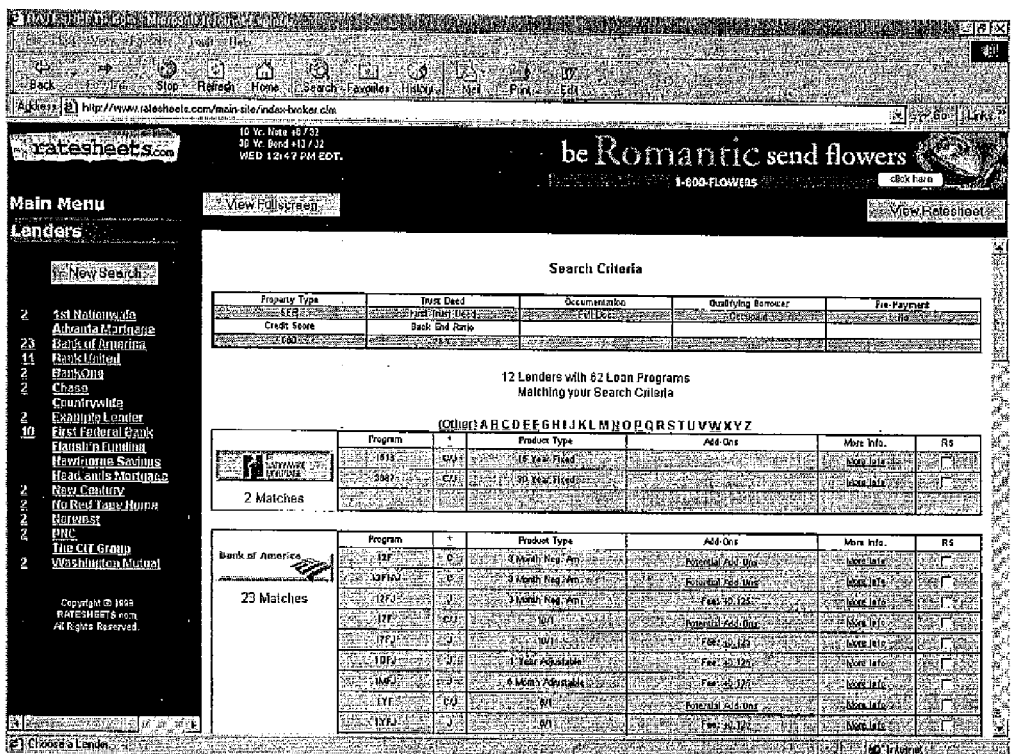
15.61
Fig. 6.6

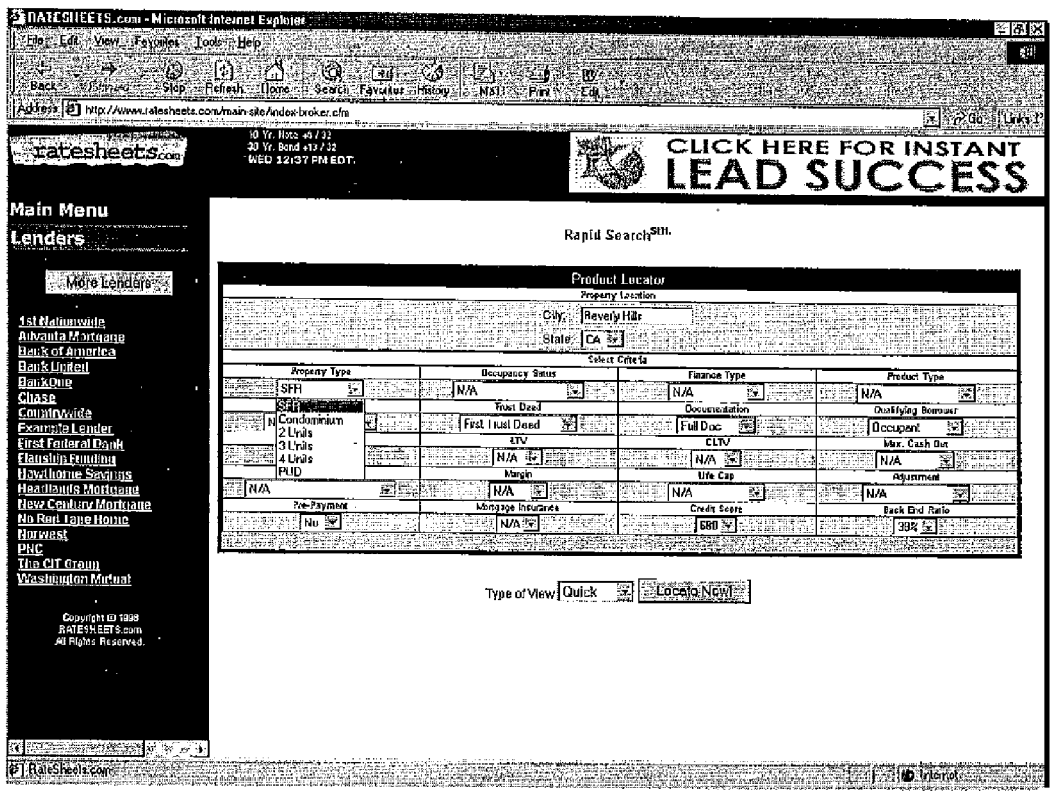
Fig 6.7

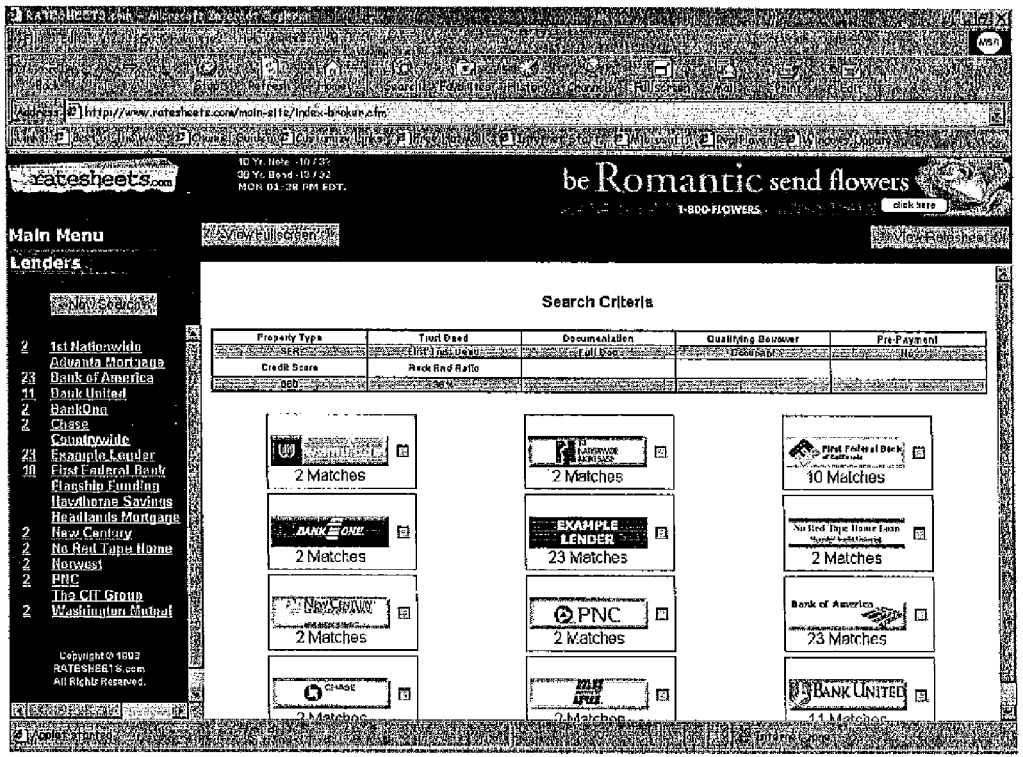
15.63
Fig. 6.8

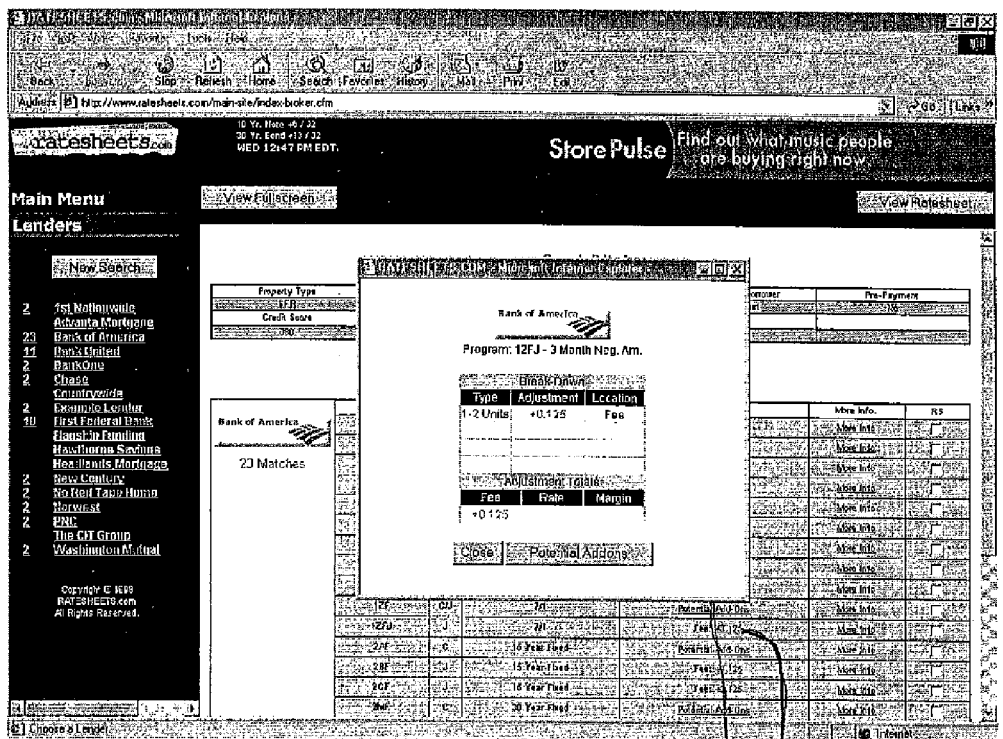
Fig. 6.9

Fig. 6.10

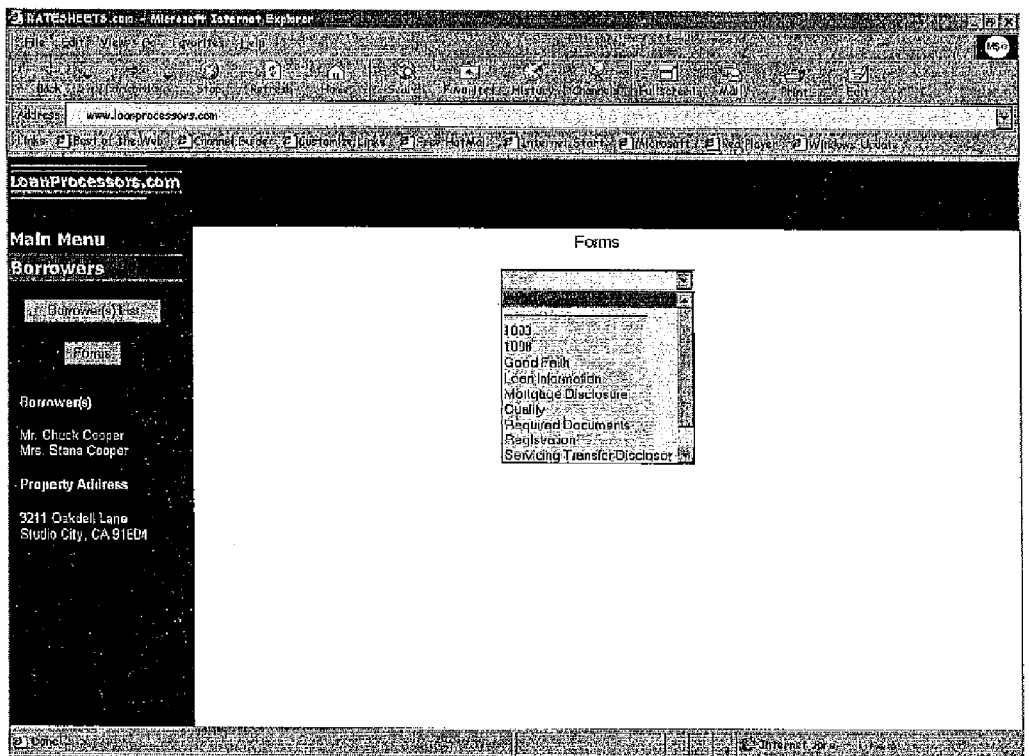
15.66
Fig-6.11

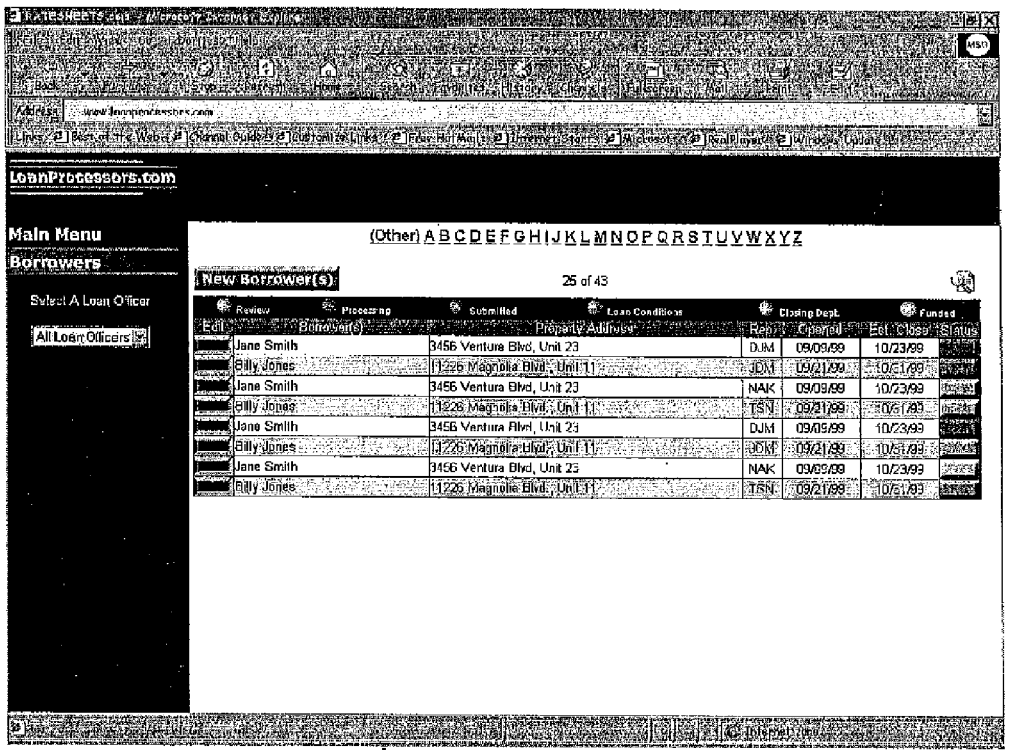
15.68
Fig. 6.13

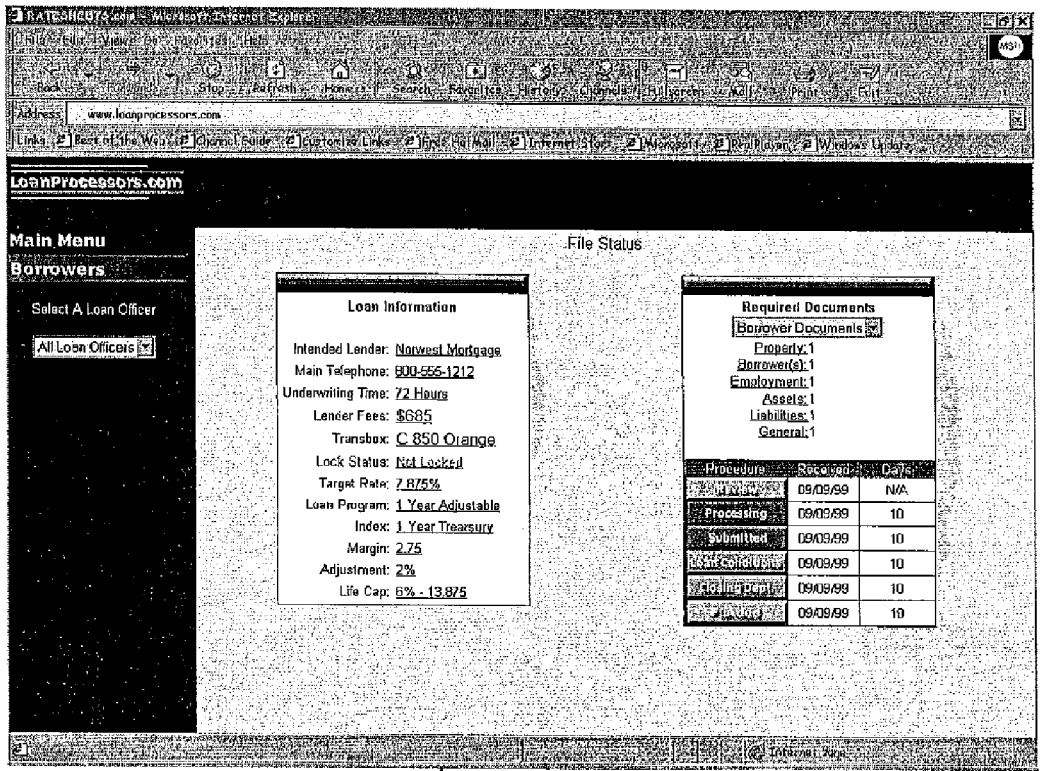
Fig. 6.14

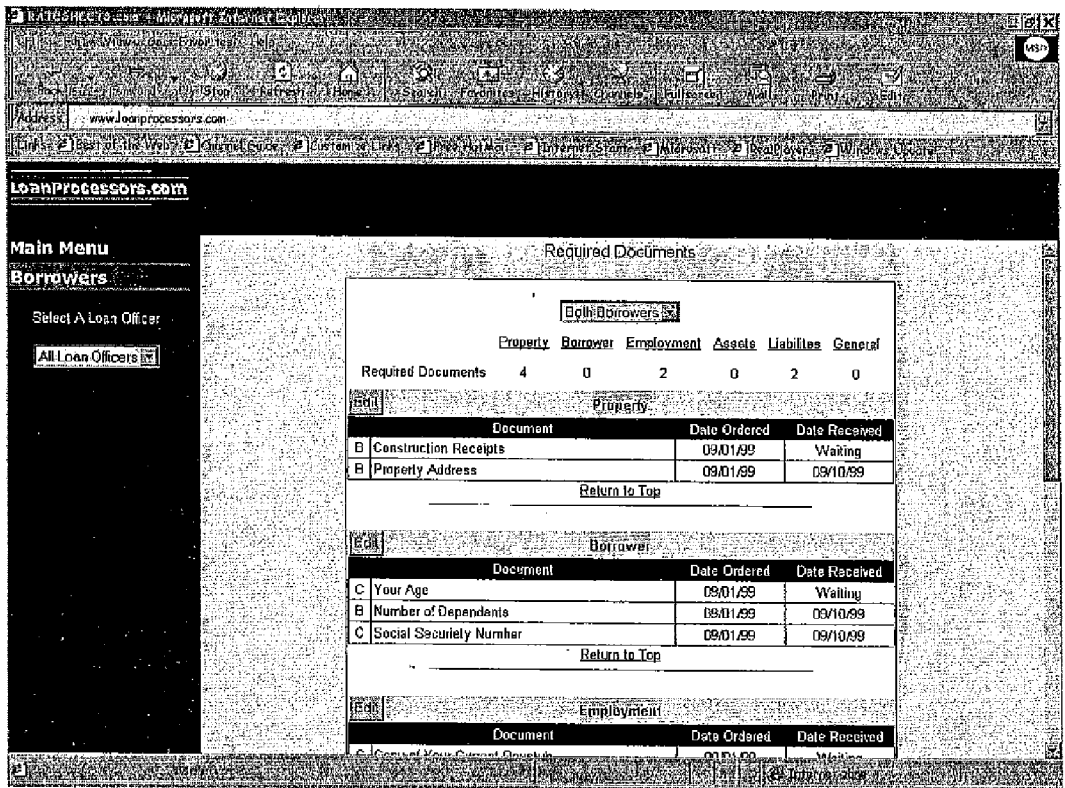
15.70
Fig. 6.15

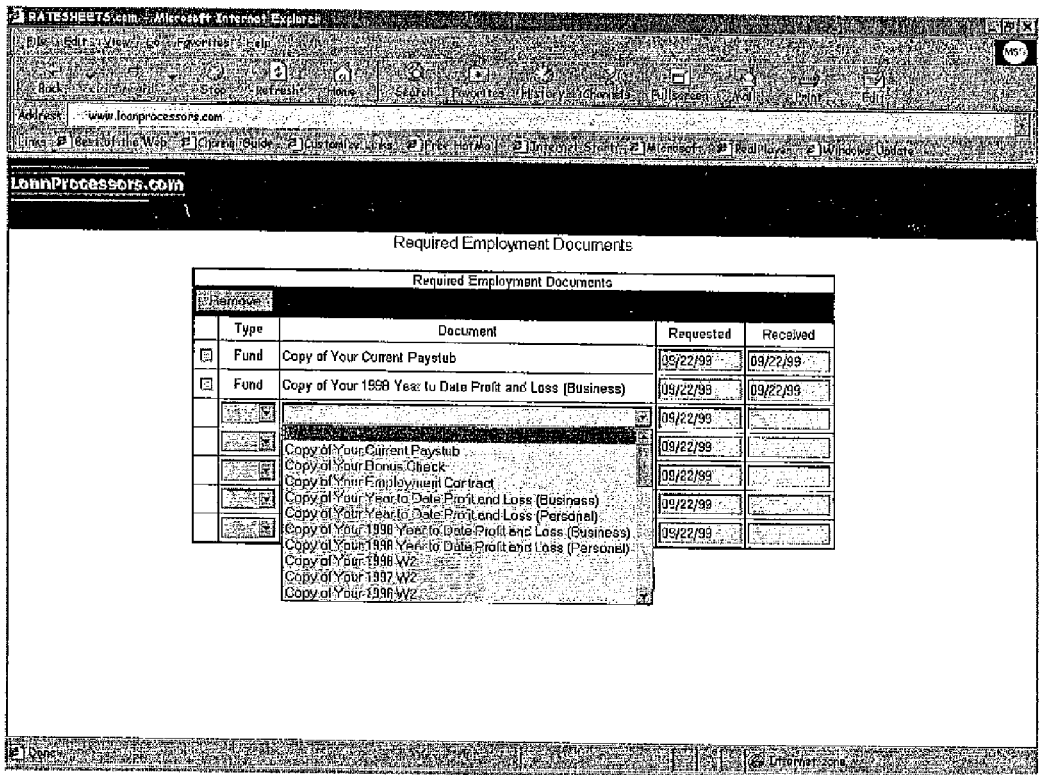
15.71
Fig. 6.16

GOOD FAITH ESTIMATE OF CLOSING COST

Borrower(s): Chuck and Stana Cooper  
Property Address: 3170 Dona Maria Dr. Studio City, CA 91604  
Purpose of Loan: Purchase  
Loan Amount: $450,000

Loan Product: 5/1  
Interest Rate: 7.500%  
Points: 1  
APR.: 7.635%  
Amortization Period: 360 Months (30 years)

| Info | Item | Cost |
|---|---|---|
| Go To | Our Fees | $6000 |
| Go To | Lender Fees | $6000 |
| Go To | Third Party Fees | $6000 |
| Go To | Title Company and/or Closing Agent Fees | $6000 |
| Go To | Government Fees | $6000 |
| Go To | Lender Pre-Paid Items | $6000 |
| Go To | Imponds or Escrow Deposits | $6000 |
| | Total Fees | $42,000 |

Cost Break Down

Our Fees

| Hud# | Item | Cost |
|---|---|---|
| 801 | Our origination fee @ 0.125 | $6000 |

COMPUTER SYSTEM AND METHOD FOR NETWORKED INTERCHANGE OF DATA AND INFORMATION FOR MEMBERS OF THE REAL ESTATE FINANCIAL AND RELATED TRANSACTIONAL SERVICES INDUSTRY

This application is a continuation of U.S. patent application Ser. No. 09/566,694, filed May 8, 2000 which claims the benefit of priority to U.S. provisional patent application 60/133,257 filed May 8, 1999, which is hereby incorporated by reference as if set forth in its entirety.

BACKGROUND OF THE INVENTION

The present invention is directed to a system for interchange of data and information for members of the real estate finance and related transactional services industry implemented over a network such as the Internet or one or more intranets. The system allows participants in the real estate finance and related transactional services industry to access and supply to each other data, information, and news concerning particular transactions, services offered, or other circumstances of concern to such participants via a central computer system.

Typically, when a homebuyer needs a home loan, the homebuyer or his or her representative applies directly with a lender or goes to a loan broker to assist in applying for the loan. The broker will submit the loan application to one or more lenders, with the limitation that the broker usually can only submit loan applications to lenders with which he is approved. But, before the homebuyer completes a loan application, one type of which is known in the industry as a "1003", the lender or broker usually prequalifies the borrower.

Prequalification occurs before the borrower completes a loan application to insure that the borrower is not wasting his own time, the broker's time, or the lender's time by completing a 1003 that the lender ultimately will not approve. The prequalification is generally simple mathematical calculations used to determine two qualifying ratios, called front-end and back-end ratios, which are considered relative to the borrower's credit report and employment history. The front-end ratio is calculated by taking the borrower's proposed monthly mortgage payment (which includes first mortgage principal and interest, other mortgage principal and interest, hazard insurance taxes, and any mortgage insurance, any association dues, and other primary housing expenses—known as PITI) divided by his monthly income. The back-end ratio is calculated by adding a percentage (typically 5%) of the borrower's monthly revolving debt and the full amount of all installment debt plus any other non-primary housing related expense—to the PITI and dividing the sum by borrower's monthly income. The acceptable front and back-end ratios, while relatively standard, can vary from lender to lender. Even though the mathematical calculations are rudimentary, many homebuyers are neither familiar with the calculations nor with a lender's acceptable ratios.

If the homebuyer meets the general prequalification criteria, he or she then proceeds to the next step in procuring a loan, which is supplying the lender with the loan application details required by the 1003. After completing, signing, and forwarding the 1003 to a lender, the lender normally requires the applicant to supply additional documentation to support the information written on the loan application. The type of supporting documentation required is dictated by the lending guidelines established by the lender. An example of a lending guideline would be the lender's willingness to accept the applicant's stated income on the 1003 without further proof, if the percentage of the loan amount to the appraised value of the home, known as the loan-to-value or LTV, is eighty percent or lower. If the LTV is greater than eighty percent, then a lender might require the applicant to supply his last two years of tax returns to support the stated income on the 1003. Other examples of documents typically required by a lender to accompany the 1003 are a credit report, an appraisal, a title report and title insurance, escrow instructions, verifications of employment and deposits and/or assets, mortgage insurance and flood insurance, private mortgage insurance, and mortgage insurance premium.

All these documents are given to the lender and comprise an applicant's loan application file. The lender then reviews the loan application file, called underwriting the loan application file. If the contents of the loan application file satisfy all of the lender's guidelines, the lender approves the loan, has loan documents prepared for execution, which then become part of the loan application file, and finally funds the loan.

Distribution of Pricing and Loan Program Information

To determine a borrower's proposed monthly principal and interest payment for the purposes of prequalification and ultimately approval of the loan, an interest rate for the loan must be known. While a lender knows what its own interest rates are for its various loan programs, the broker on the other hand must receive a written document from the lender that includes the loan programs and the corresponding interest rates ("rate sheets"). A wholesale rate sheet, which is distributed to brokers, may be different from the lender's consumer direct/retail rate sheet in that the wholesale rate sheet may set forth a range of rates for the same loan program. Depending on which rate the broker offers to the borrower, the broker may receive a fee from the lender, borrower or both. For example, if a broker offers a borrower an interest rate of 8.250% instead of 8.00%, the lender might give the broker a commission of 0.125% of the loan amount for selling a higher interest rate.

Before the ubiquitous use of fax machines, lenders did not have a method to distribute on a daily basis its rate sheets to all of its approved brokers. Normally, in such times rate sheets were sent by mail, which took several days to reach brokers. Nowadays a lender relies primarily on the daily fax broadcasting of a several page rate sheet to hundreds and sometimes thousands of its approved brokers in a state or across the nation. The broker on the receiving end receives tens of pages of rate sheets, sometimes even more, from all of its lenders.

Fax broadcasting is extremely costly and inefficient for both the lenders and brokers. The cost of fax broadcasting for a lender can easily range from thousands, to tens of thousands of dollars a month, depending on its number of brokers. After broadcast faxing a rate sheet, the lender has no way of knowing whether a broker is even viewing the rate sheet, unless the broker submits a loan application or calls the lender regarding the rate sheet. If the lender makes a mid-day rate change, the broker has no way of knowing of the change unless the broker happens to be in front of the fax machine and comparing the new rate sheet with the previous rate sheet.

From a broker's perspective, fax broadcasting of rate sheets is also troublesome, costly, and inefficient. When the broker receives the faxed rate sheets from all its lenders, the broker typically makes several copies of all the rate sheets to distribute to its own loan agents, also known as loan originators. Receiving an overwhelming number of faxed rate sheets costs the broker in fax machine toner, fax paper, copier toner, and copy paper, not to mention that the broker and/or loan agents might not be at the office to receive the fax or the fax is illegible.

Lenders have begun trying alternatives to fax broadcasting, which themselves have inherent inefficiencies. Many lenders have implemented Fax-on-Demand systems whereby its approved brokers are able to request a fax copy of the rate sheets by dialing from the broker's own fax machine a special telephone number and broker identification number. Fax-on-Demand could reduce the number of broadcast faxes, but it has not necessarily done so. Lenders typically still fax broadcast the rate sheets. Brokers use the Fax-on-Demand when they are not at their own office and need a rate sheet sent to another fax machine, or if the broadcasted fax is illegible or has been misplaced. With Fax-on-Demand, lenders however can determine which brokers have actively requested the rate sheet. Fax-on-Demand is also problematic because it requires brokers to keep track of a different fax number for each lender. Such numbers can get lost or may not be available, if for example a broker is working outside his or her regular office.

With the advent of email, lenders looked at this medium as a way to reduce the cost of distributing rate sheets. The inherent problem with email is apparent to anyone that has received several emails with large file attachments. The prospect of receiving more than twenty emails, each with an attachment of three to ten pages of text and graphics is unacceptable to most brokers. A broker would spend tens of minutes waiting to download each email, then would have to open either a word-processing software, spreadsheet software, or whatever other type of software application required to read the file that the lender sent. Similar to receiving a fax, the broker would either need to make copies of the rate sheet, print several copies of the rate sheet, or email the attachments to its loan agents, who would encounter all of the same problems that the original email recipient had.

While some lenders have started posting rate sheets on their own broker websites, most such websites are limited in scope, and are barely more than advertisements for the lender. Even today, no lender has developed a business to business website for comprehensively dealing with wholesale mortgage brokers.

Lender websites for brokers are as problematic for the broker as receiving emails. Brokers do not want to go to twenty or more websites each day to view, download, or print rate sheets. There are many problems with doing so. For example, each of these lender's broker websites has a unique URL (web address). These web addresses are not necessarily intuitive. For example, Countrywide, which is a national wholesale lender, does not use www.countrywidewholesale.com but uses www.cwbc.com. As another example of a problem, each lender with its own broker website requires the broker to remember a unique user name and password. Brokers that are not at their own computer, and have not bookmarked the web addresses, and/or do not have their username and passwords written in front of them, have a difficult time remembering how to get into each of their lenders' websites.

There are some websites that are not operated by either lenders or brokers. At these websites a broker can type in the criteria of the loan he or she is looking for and the search query will generate a listing of some lenders that fund the type of loan with the corresponding interest rate. Such website systems that generate a lender list in response to a loan criteria query are disadvantageous in many respects. First, a rate sheet must be obtained from a lender. Since rate sheets are not necessarily available from a lender in electronic form or in an electronic form that is compatible with a system, a data processor must manually input the data into a searchable database. The manual inputting process may be prone to errors or omissions. Furthermore, the lender may not have authorized reproduction and use of the rate sheet. In addition, the lender found in the search might not even lend in the geographical location that the property is located. Still further, the broker who searches the database might not even be approved with a lender who meets the search criteria. And similarly from the broker's perspective, there is no mechanism in such systems to focus its loan agents on certain lending parties it may have special relationships with. Loan agents work inefficiently in that they are exposed to lenders that their brokers may not have authorized them to deal with. More simply put, the third party websites take control away from lenders and brokers as to how their loan programs are characterized, updated, and presented. Because of such disadvantages and problems, many lenders may opt out of such systems. Any broker or loan agent can pay for the service, so a brokerage firm does not have control over which of its own loan agents have access to its lender's rate sheets, thus taking control away from the owners of the brokerage firm.

Submission of 1003 and Rate Locking

Prior to personal computers, prequalification calculations were done either by hand or on handheld calculators, loan applications were completed by either hand-writing or typing the information, and underwriting the loan application files was done completely by human evaluation and calculation. During the past few years personal computers, through the use of loan origination software such as Genesis, Contour, and Byte have made the process of prequalifying an applicant and completing a 1003 more efficient. For example, a broker could type the applicant's debt and income values into predefined fields in a software application, to quickly prequalify the applicant. Then the broker could type the information required on a 1003 into predefined fields in a software application, which the broker could store for future use or completion, to view on the computer monitor, and to print for the borrower's signature, and ultimately forward to the lender. Normally, the broker would fax or overnight a completed 1003 to the lender for conditional approval. The lender has a data processor re-type the data of the 1003 into its own loan processing software, reviews the content of the 1003, compares it against its lending guidelines (which may be guidelines dictated by an investor), and then tells the broker which additional documents are required to support the stated information on the 1003. The broker would then fax to the lender a completed rate lock form, which would secure for the applicant the desired interest rate and loan program for a specified period of time. This entire process would take place via fax and/or mail courier services.

With the advent of the modem and the Internet, a broker could forward the completed 1003 in digital format through the dedicated telephone lines or through the Internet to the lender to be downloaded by the lender to be printed. The lender would then would take the printed 1003 and have its own data processors re-type the data into its own processing software. This two step process requires double entry of data, first on the broker's end and then on the lender's end. Not only does this double entry take additional time and labor, but it also creates the opportunity for inaccurate transcribing of data. In the end, the broker would still have to mail the original signed hardcopy 1003 to the lender.

Companies that permit the on-line submission of loan applications are, for example, E-Loan, IMX Exchange, Fannie Mae and Freddie Mac, and the lender's own websites. E-Loan is an on-line broker. It markets its website to consumers, who then complete on-line applications, which E-Loan in many circumstances forwards to lenders for pre-qualification and conditional approval. E-Loan does not provide brokers with a mechanism to obtain wholesale rate sheets, or submit loan applications to the lenders with which they are approved. IMX Exchange is an auction site that permits brokers to complete on-line loan applications or forward digitally formatted loan applications from their loan processing software to IMX Exchange. IMX Exchange then notifies participating lenders that can review the submitted loan application and bid on the loan. The highest bidding lender then needs to contact the broker to complete the loan application process. Fannie Mae and Freddie Mac are Secondary Market Investors that buy loans that lenders have funded, bundle them (called securitizing the loans), and then sell theses "mortgage-backed securities" to the investing public. The loans that Fannie Mae and Freddie Mac purchase must comply with their strict purchasing guidelines, such as loan amount, LTV, credit rating, property type, qualifying ratios, etc. Fannie Mae and Freddie Mac permit brokers to submit digital loan applications either on-line or from broker loan processing software directly to them. Fannie Mae and Freddie Mac can download and port the digital application into their own loan processing and underwriting software. The broker will then receive conditional approval from Fannie Mae and Freddie Mac, stating that they will purchase the loan from a lender who funds it as long as everything stated in the loan application can be substantiated by additional documentation, including appraisal, tax returns, credit report, title insurance, etc. With the conditional approval, the broker then needs to approach a Fannie Mae or Freddie Mac sponsored lender, who then might offer to fund the loan. The Fannie Mae and Freddie Mac process limits the scope of a lender's business because the lender can only sell to Fannie Mae and Freddie Mac loans that satisfy their strict purchasing guidelines. Moreover, Fannie Mae and Freddie Mac do not have a system in place whereby the sponsored lenders can easily distribute their rate sheets to their approved brokers. Once the broker gets conditional approval from Fannie Mae and Freddie Mac, the broker has to go through traditional channels to find sponsored lenders' pricing, and to get the lenders all the supporting documentation for the loan application file.

Underwriting and File Status

As mentioned above, underwriting is the process whereby a lender decides whether a loan application satisfies its lending guidelines before the lender approves and funds the loan. In most all circumstances, a lender must receive not only an original signed 1003, but must receive an original appraisal, credit report, escrow instructions, title report and insurance, other insurance if required such as hazard, private mortgage insurance, mortgage insurance premium or flood insurance, tax returns, W-2s, verification of deposits and employment, and any other document the lender may require. In order to accommodate borrowers, who need to show sellers that they will be able to obtain a loan to purchase the house, lenders issue conditional approvals based on stated information in the loan application. As indicated above, the loan application is generally either faxed or overnighted to the lender, who then re-enters the 1003 data into its own processing software. The lender's underwriter would compare the content of the loan application against its lending guidelines, and then either fax or email a message to the broker that the lender either conditionally approves the loan application, or rejects the application.

If the lender conditionally approves the loan application, the lender would then create a list of all the conditions that must be met by the borrower before the loan is funded. The lender would speak to the broker on the telephone and would send the condition list either via fax or mail courier service. The condition list is constantly being updated as conditions are met. The broker would then have to communicate the list to the applicant on the telephone, or send the condition list via fax or mail courier service.

Completion of Loan Application File

To fund the loan, the lender has to receive all the supporting documents required under the condition list. The borrower, broker, lender, and investor would all need conforming copies of the documents for their own personal records. The broker and the lender normally would have to also take the data from the documents, such as the credit report and appraisal, and re-type the data into their own respective processing software. This process is cumbersome and often results in inaccurate transcribing of data.

As can be well appreciated from the foregoing discussion, there are many complexities and logistics to preparing and processing loan applications. While there have been some attempts toward reducing the time and effort involved in the process, existing systems and methods have problems that need to be addressed.

SUMMARY OF THE INVENTION

The present invention relates to a "Real Property Financing Collaboration System" (hereinafter "RPFC"). RPFC generally means a system that permits managing data and/or information from different parties relating to the financing or refinancing (including borrowing on equity) of improved or unimproved real property. To overcome the problems and disadvantages in existing systems, the present invention, among other things, does one or more of the following:

The system permits the flow of data and information in a continual stream between a plurality of computer systems controlled by different "participating parties".

The system permits an interchange party to allocate resources on a computer system to a participating party who can subcontrol those resources.

The system permits the flow of data and information to areas on an interchange party's computer system, the areas being accessible by a plurality of "participating parties" under conditions defined by a participating party.

An advantage of the continual stream, common areas, and/or subcontrollable features is that they enable "single entry" of data or information which data may be presented to, accessed by, or gathered by a plurality of participating parties having a need for or interest in the data or information generated therefrom. "Single entry" means that only one participating party needs to enter data or information needed by or of interest to other participating parties.

The system further permits presentation and delivery of data and/or information in desired media to participating parties and their systems.

The system provides standardized user interfaces as part of allocated resources.

The "participating parties" may include borrowers also referred to as consumers; brokers (including broker administrators and broker party users such as loan processors and loan agents who also may be referred to as broker account representatives or broker agents); lenders (including lender administrators and lender party users such as lender management, lender regional directors, lender account executives, lender processors and lender underwriters); investors (including Fannie Mae, Freddie Mac, Ginnie Mae, and any other investor active in a secondary or higher market for securitization of loans); transaction parties (including accounting firms, appraisal companies, attorneys, business management firms, credit unions, credit reporting companies, document companies, escrow companies, flood insurance companies, private mortgage insurance companies (PMI), mortgage insurance premium companies, real estate companies, title insurance companies); taxing authorities; and other members of the real estate financial and related transactional services industry, and/or other supporting parties; and an interchange party that provides a hub for communication of data and/or information presentation to two or more of the foregoing parties.

BRIEF DESCRIPTION OF THE DRAWINGS

FIGS. 5.0-5.55 are allocated resources for a lender and its users, the allocated resources being user interfaces, according to the present invention.

FIGS. 6.1-6.20 are allocated resources for a broker and its users, the allocated resources being user interfaces, according to the present invention.

Applicant hereby reserves all copyrights to the user interfaces shown in this application.

DETAILED DESCRIPTION OF THE INVENTION

The present invention relates to a "Real Property Financing Collaboration System" (hereinafter "RPFC"). An RPFC generally means a system that permits managing data and/or information from participating parties relating to the financing or refinancing (including borrowing on equity) of improved or unimproved real property.

The present invention, among other things, enables "single entry" of data so that only one participating party needs to enter data or information needed by or of interest to other participating parties.

Generally, "data" means facts and beliefs about the real world; "information" is data that has been processed and formatted to support decision making. Data may be processed to generate information. Information may also be processed to generate further information. The information that has been processed may itself be data depending on the context. "Data" or "information" includes data and/or information formatted into or as electronic files. For convenience herein, the terms "data" and "information" shall each be inclusive of both data and information, unless otherwise indicated.

Figure 1:
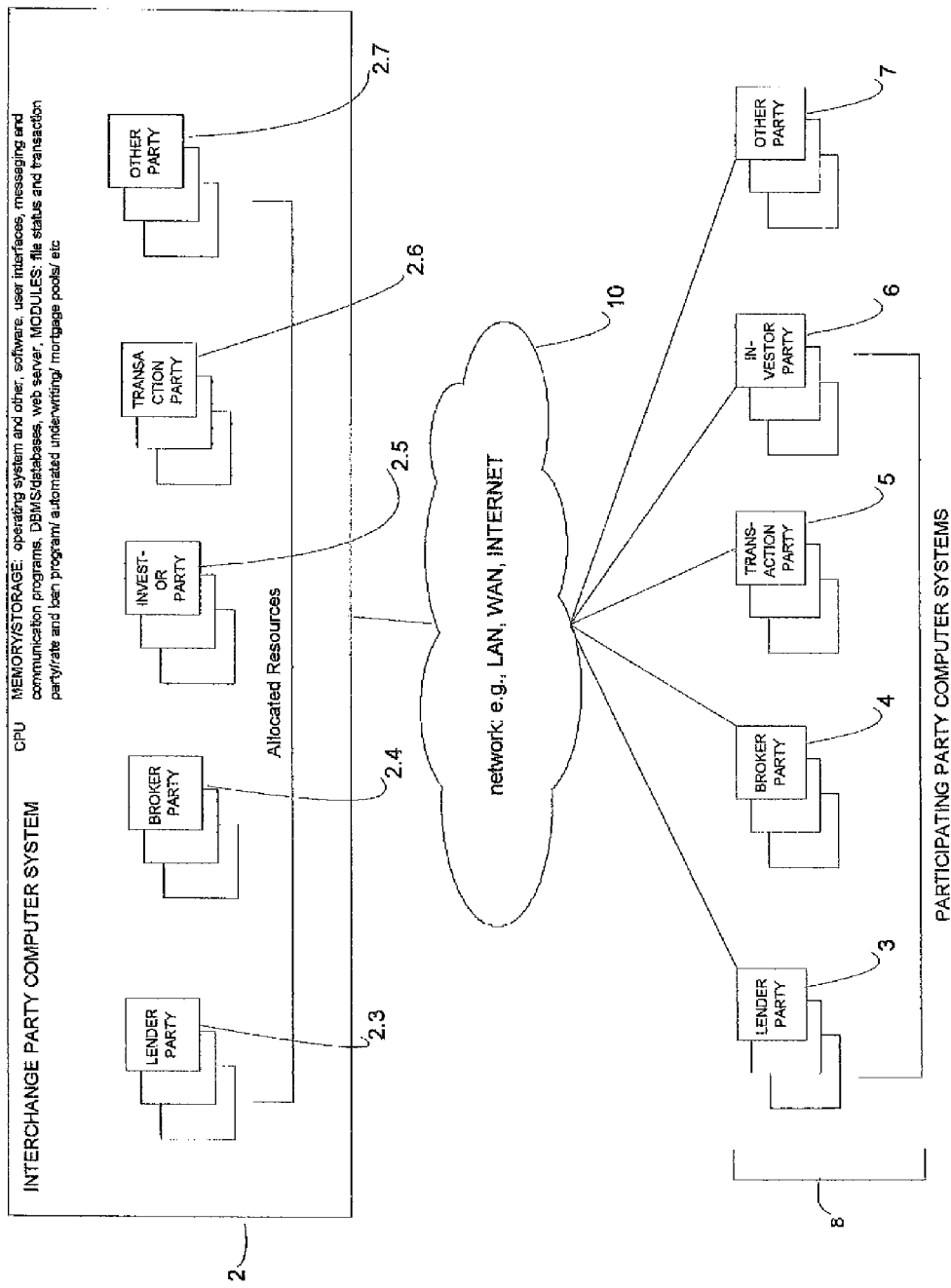
FIG. 1 shows an overview of an RPFC 1, according to the present invention.

FIG. 1 shows an overview of an RPFC 1, according to the present invention. The RPFC 1 may be used to communicate data between a variety of sources, as mentioned above. For example, it may capture data from electronic loan application forms; other electronic applications; verification or approval forms or files. The system may include means to organize captured data into records in a database or into other file format; it may transmit or present data to other participating party computer systems; it may evaluate data; it may receive data from online loan brokers about a loan application; and/or it may receive data from others involved in the processing, approval, funding, closing, or resale of a loan. Generally, an RPFC 1 includes two or more participating parties in communication with each other via allocated resources on a single computer systems and/or separate computer systems. In one possible embodiment, the RPFC includes at least three participating parties, with one of the parties being an interchange party who provides a central computer system 2 ("interchange party computer system") that facilitates communications and transactions between at least two other participating party. Computer systems in system 1 may be networked over LANs, WANs, INTERNET or other known network systems using known protocols for such systems, including TCP/IP.

The interchange party computer system as described in more detail below includes one or more units of allocated hardware and/or software resources 2.3-2.7 preconfigured for use by a participating party. The interchange party's computer system may contain all or some of the allocated resources 2.3-2.7 for the participating parties.

Figure 2:
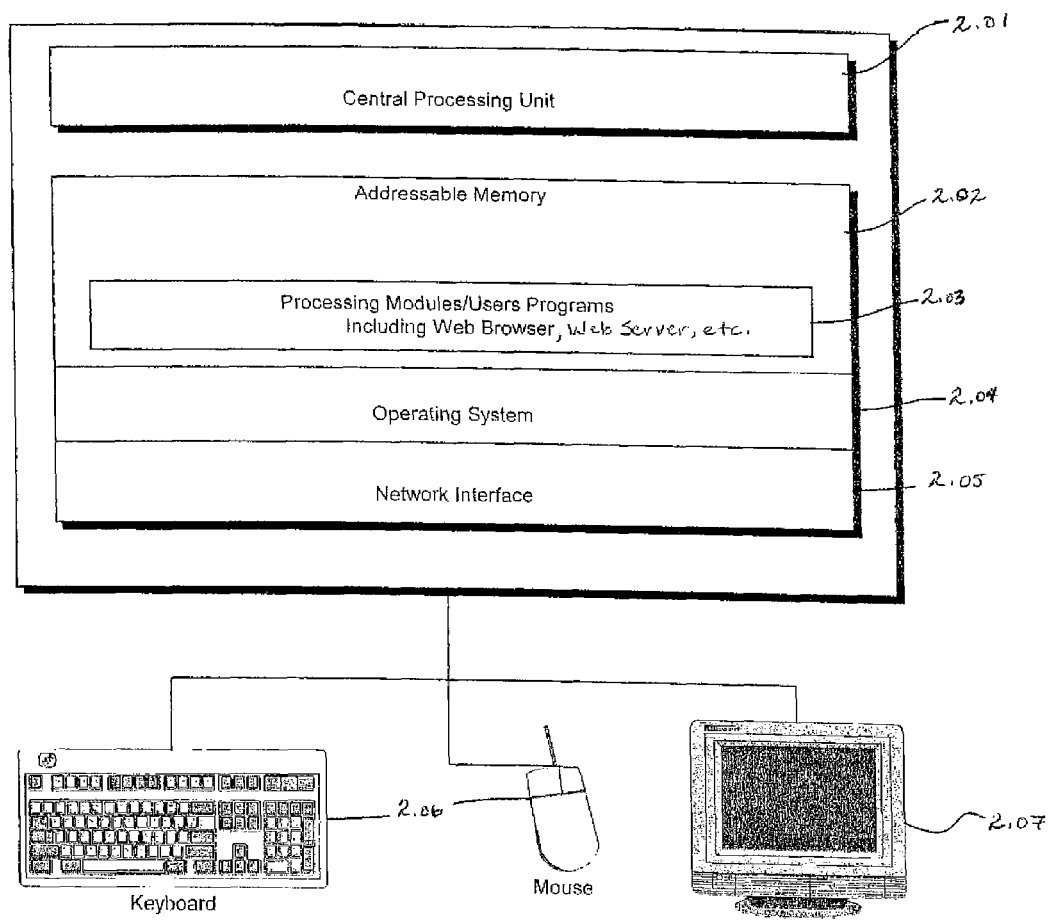
FIG. 2 illustrates features that would be typically found in a computer system that is included in the system of FIG. 1

FIG. 2 illustrates features that may be typically found in a computer system e.g., 2, 3, 4, 5, 6 or 7 of a participating party or other party in system 1. As used herein a "computer system" generally means a set of hardware and software components that include one or more of the following: central processing unit ("CPU") 2.01; memory (RAM or ROM) 2.02, software applications 2.03, operating system 2.04 and network interface 2.05, and related I/O subsystems. A computer system may include one or more of the following: disk drive, input devices such as keyboard or mouse 2.06, display monitor 2.07, networking card, other subsystems known in the art, web browsers, web servers, database management system software, and/or communications software. It will be understood by persons skilled in the art, that a computer system may also be in the form of a Personal Digital Assistant (PDA), a wireless computer system or device capable of communications over the Internet or other network, or a computer terminal (thin client) or Internet appliance capable of such network communications. A "participating party's computer system" is a computer that is substantially under the operational control of a participating party. A participating party computer system may be in the form of one or more computer systems. And a computer system may include subsystems. Such subsystems could be, for example, a group of client systems networked to one or more servers substantially under the control of a single participating party.

A participating party's computer system may also comprise or include software applications for one or more data capture servers that include accepting data transfer from one or more data sources that may be outside a participating party's computer system. The source of the data may be another participating party's computer system. Data may also enter a data capture server by direct manual input or connection to storage medium such as a CD-ROM, disk drive, floppy drive, memory cards, ZIP drive cartridges, and the like. Appropriate parsing applications could parse the data captured from forms into appropriate database records and fields. XML based applications are suitable for authoring forms, transferring data into the database, and extracting from a database.

A participating computer system may further comprise or include a presentation server that includes software applications for presenting data or information to one or more participating parties. In certain embodiments, the presentation server is a web server for an Internet or intranet website that serves web pages to other participating parties. The web pages may be served via known TCP/IP protocols and formatted in known formats of mark up languages such as HTML and XML.

Computer systems of system 1 may execute a conventional operating system, including, but not limited to, Microsoft Corporation's Window (sm) 3.x, 95, 98, 2000, NT or DOS operating systems; Linux operating systems; Sun Microsystems' Unix Solaris operating systems; IBM's AIX Solaris operating systems; SGI's IRIX Solaris operating systems or other operating systems, including, but not limited to Window's CE, Palm OS, etc. for PDAs, cellular devices, web devices, or other computing devices. The possible software components of a computer system described herein, including operating system and application software, may reside on one or more hardware components providing addressable memory for the computer system.

A participating party's computer system may manage data, including access, retrieval, transfer, addition, deletion, modification and/or storage of data in any variety of known data storage media, including local hard drive, CD-ROM or other mass storage device, local area network servers, wide area network servers, storage resources substantially under the control of the participating party on a server that is shared with other parties (including servers shared with other participating parties, such as a server provided by an interchange party as allocated resources, as described below), and local RAM, if data is generated on demand or linked to other programs such as spreadsheet or database programs executing in RAM.

Data and information may be formatted by a participating party's computer system for printing, viewing, transfer to another computer system, storage in any of many known formats, including, Adobe PDF; rich text (RTF); SGML formats including HTML and XML; ALLAIRE Cold Fusion CFML; MICROSOFT ASP; JAVA Script MICROSOFT Word, Excel, Access; bitmap, JPEG, GIF, and other graphics standards.

The RPFC may generally be divided into a client system 8 representing participating party computer systems 3-6 composed of one or more computer systems or terminals of participating parties and a server system, hereinafter referred to as an "interchange party computer system" 2 ("IPCS", for short) composed of one or more computer systems substantially under the control of an interchange party. Features typically appropriate for an interchange party's computer system are as described above, and shown in FIG. 2. The components of IPCS system 2 may be physically located together or distributed and linked via network.

FIG. 1 illustrates a lender party computer system 3, broker party computer system 4, transaction party computer system 5, investor party computer system 6, and other party computer system 7 in communication with the IPCS 2. However, this illustration is just an example—fewer or more participating parties in various combinations could also be in communication with the IPCS 2.

The interchange party may allocate preconfigured units of IPCS resources 2.3, 2.4, 2.5, 2.6 and 2.7 to other participating parties who are then authorized by the interchange party to control their respective allocations and modify them, as permitted by the interchange party. A party's allocated resources may be dynamic in nature in that they may have built in parameters permitting their modification according to the needs or usage of a participating. For example, the present invention contemplates that participating parties will create and manage database records, input and manage data, upload files, communicate, collaborate, and exchange things with each other through their respective allocated resources on the IPCS. As a result of such things, the allocated resources under the control of a participating party may expand, contract, or otherwise be modified. Herein, such modified allocated resources shall also be considered "allocated resources".

Figure 4:
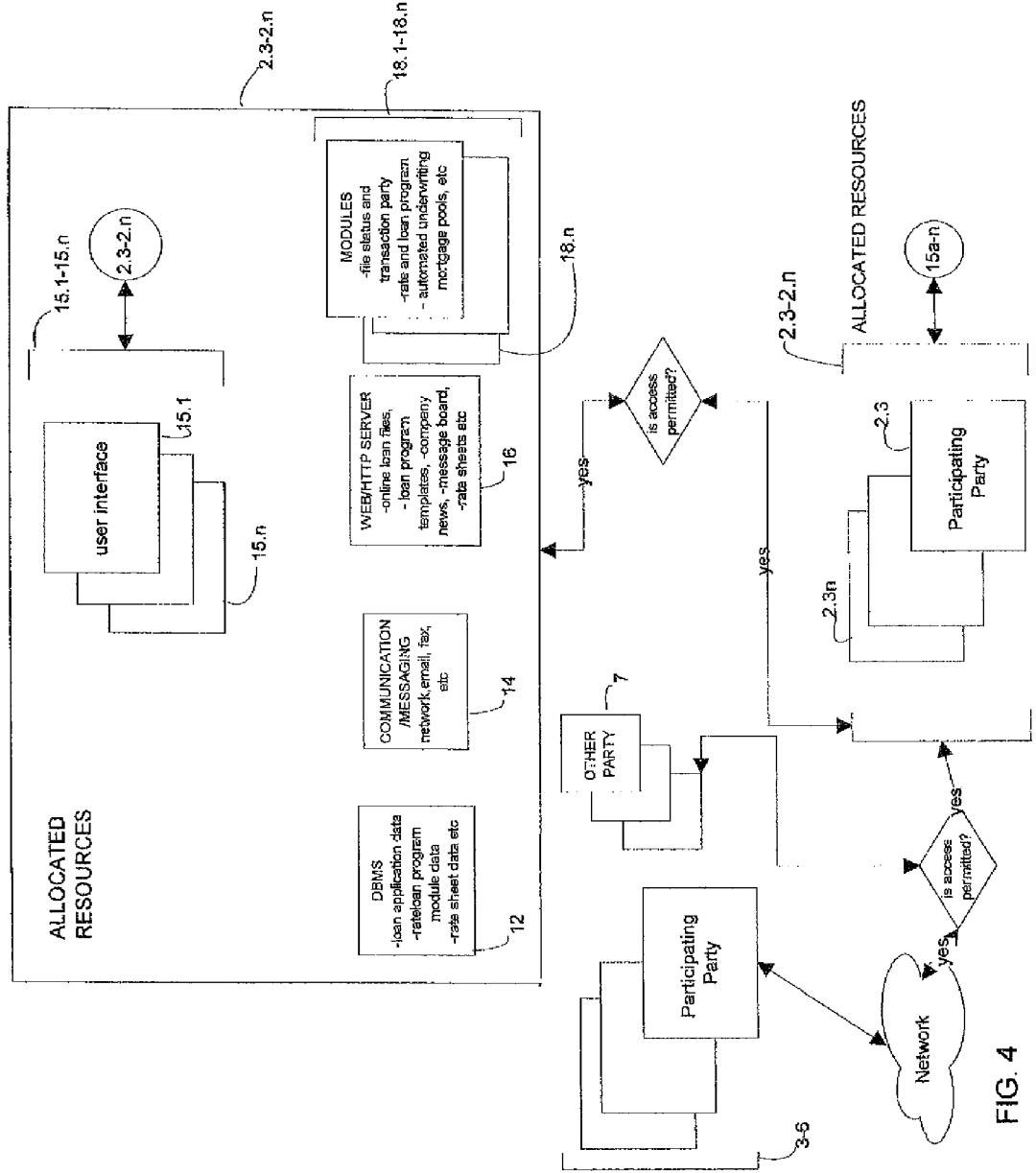
FIG. 4 is a schematic representation relating to allocated resources for participating parties and interactivity thereamong.

The units of allocated resources 2.3-2.7 on the IPCS may include hardware and/or software resources, including database resources 12, program modules resources 18, communication/messaging resources 14, web server resources 16, network and/or any other resources defined by the interchange party. FIG. 4 shows examples of units of such allocated resources 2.3-2.n ("n" meaning in this and other cases that there may be any number of such components or features). FIG. 4 provides an example; the interchange party may preconfigure a unit of allocated resources to include more or less hardware or software component than what is illustrated, and various components of such resources. Multiple sets of a unit allocated may be provided for multiple participating parties. The allocated resources 2.3-2.n include one or more user interfaces 15.1-15.n. These user interfaces allow a participating party to interact with components 12-18 on its own allocated resources and/or allocated resources of other participating parties. Access between two or more units of allocated resources may be subject to conditions set by a participating party through its user interfaces 2.3-2.n.

The allocated resources 2.3-2.n of a participating may also be in communication with one or more computer systems 3-6 of participating parties. Such communication may also be subject to conditions set by a participating party through the user interfaces of the allocated resources.

In a preferred embodiment, the interchange party provides preconfigured user interfaces to a participating party, such as the graphical user interfaces of FIG. 5 et seq. The user interfaces may be preconfigured to allow a participating party, under conditions set by the interchange party, to post content presentable to others through the IPCS, determine who has access to a party's allocated resources, define data channels between parties, access IPCS program modules and provide input thereto or receive output therefrom. As discussed in detail below, the user interfaces 15.1-15.n may also permit a participating party to post content that will be presentable to users of a participating party or to other participating parties. For example, a user interface 15.1-15.n may include means for a lender to post its rate sheets, announcements, and other content to locations in the IPCS for presentation to it own users, other participating parties, or non-participating parties who may be permitted access to the IPCS. For example, a lender-administrator user interface allows an administrator designated by a lender party to create a list of registered users, approved brokers etc., and to manage such lists. A user interface could provide share and access parameters so that an administrator could specify which of its users or other participating parties would be entitled to access its allocated resources on such a database.

In one embodiment, the IPCS provides allocated resources for participating parties to receive, track and process loan applications, with relevant parties allowed to access the loan application file or status thereof, through common user interfaces.

In another possible embodiment, a unit of allocated resources includes an administrator section with associated user interfaces for the administrator. The interfaces may permit a participating party to register users associated with it and set conditions of use for each registered user. The administrator section is preconfigured by the interchange party to allow a participating party's designated administrator to manage the unit of allocated resources. Managing may include creation of the database, additions, deletions and other modifications permitted by the interchange party. The unit may be preconfigured by the interchange party to allow the administrator to manage which persons associated with it or other participating party may access the IPCS and/or the subcontrolled allocated resources on the interchange party system. For example, in the case of an approved lender list, a user interface may provide means for a broker party to designate which of its users, e.g., loan agents, through the IPCS, can see which listed lenders. Accordingly, the administrator section would include preconfigured software features that allow the administrator to register users, create user profiles, edit user profiles, and remove users.

The administrator section of a unit of allocated resources may also be preconfigured to allow an administrator to post content to sections of the allocated resources or other resources on the IPCS and to define which of its registered parties and/or other participating parties may access a section of posted information. Such posted content could include, for example, text, graphics, audio and/or video files in formats such as PDF, WORD, HTML, XML, GIF, JPEG, MPEG, TIF, WAV, etc.

The administrator section of a unit of allocated resources may also be preconfigured by the interchange party to allow an administrator to define channels of communication for data flow, file exchange, etc, between its registered users and/or other participating parties and their registered users.

In one possible embodiment, the allocated resources include preconfigured user interfaces in the form of MICROSOFT ASP, CFML, HTML, and/or XML documents which are associated with IPCS programs, databases, web servers, web browsers, file servers, network communications links, email programs, etc to provide the foregoing functionality, as is well known in the art.

Data may enter the IPCS system, including allocated resources therein, through one or more data capture servers.

The contemplated data types include details supplied by a borrower to a loan application file; details of loan programs offered by a lender, including the terms and conditions for participation in the loan programs by consumers and brokers; data for rate sheets; details of a credit report; escrow details; appraisal details and/or other details relating to loan applications, application processing and borrower qualification, and lender, broker, investor loan programs in a real property financing transaction. Further discussion of the kind of data that may be captured will be found below relative to specific participating parties. The data capture server may assign the data to a database, import the data into a file format, or make the data accessible to application software, which may process the data or incorporate it into a formatted file, for example.

System 1 may include one or more web servers for capturing and/or presenting data. As used herein, a web server generally refers to a computer system that runs web server software that enables access by remote computer systems or terminals via the Internet or other network transport to allow presentation of data and information; data and information storage and transfer; and other transactions known in the art. Suitable web server software is well known and includes Apache Software Foundation's Apache Server web server; Netscape's FASTTRACK series web server, Microsoft Corporation's IIS, and Sun Microsystems' JAVA WEB SERVER. An example of a web server is web server 16 in FIG. 4.

For purposes of illustration, the following description shall be in terms of an online loan application. In this example, an online application may be presented to a participating party, such as a consumer, from any number of sources including a loan broker's website or a lender's website. It may also be emailed to a consumer. The loan application may also be presented to a loan broker or other participating party that completes the application on behalf of a consumer, or assists the consumer in completing the application.

A loan application for presentation to a participating party may be located on a web server which may be part of or separate from system 1. In the case of online loan applications, the loan application may be served to the consumer as HTML, XML, Java Script, ActiveX, Applet, CFML, MICROSOFT ASP, or through other known mechanisms or formats that can be retrieved by through a web browser or other known interface. (Other servers in system 1 may use the same mechanisms or formats for interfacing with other computers.) The loan application could be served by a web server that is part of IPCS 2.

After a consumer completes a loan application, the resulting loan application data is captured by a data capture server in the IPCS and logged into a server log. The log records the collected data and may assign an identifier or key value to the data. For example, the identifier could be an indicator of any number of things including the time of receipt, source (e.g., the particular loan broker), etc. The logged data may then be parsed by a software program that assigns items of the raw data into predefined fields in a database 12. For example, XML documents may be parsed by freeware or commercially available XML parsers. The parsing program may be created through standard program techniques that are known or within the skill of persons in the art. The parsing program would be designed to map data from the loan application to database records that are predefined.

Each record would be composed of one or more fields that correspond to the class of an item of data and/or the value of an item of data. Any field may be keyed to any one or more other fields. For example in the case of a loan application, the database would contain tables that include a field for attributes (loan application details) such as annual income; years with current employer; amount of loan sought; etc.

Databases may be based on any number of known DBMS, including hierarchical databases, network databases, relational databases, and object oriented databases. Suitable DBMS are widely available and include Oracle, Sybase, Microsoft SQL Server, and DB2. One suitable database system is a relational database based on SQL language. A suitable SQL database would typically include a Data Definition Language (DDL) for creation of a new database and new objects within an existing database; a Data Manipulation Language (DML) for processing existing database objects; and a Data Control Language (DCL) for administering permissions and other security-related issues. The data processing is handled by a database engine and can be accessed by various searching means, including Boolean logic evaluation, proximity calculations, and fuzzy logic evaluation. The databases of the present invention may also be custom designed, the design process and features being well within the skill of persons in the art.

One or more data channels may be defined for the transmission of data between components of a single computer system or between different computer systems. As used herein "data channel" means a logical event, not necessarily a physical channel, directing the flow of data into computer storage and/or processing systems. Data channels are determined by the structure of, for example, a loan application, or the way answers are coded into database fields, and the programs that are to operate on predefined categories or items of data. A data channel may also be a logical or computed combination of other data channels.

Looking at FIG. 4, one or more data channels, which are collectively illustrated as arrowed lines may communicate parsed data from server 16 to assigned fields in database 12. More specifically, there could be a data channel assigned to each loan application attribute. For example, data from database 12 may be introduced into a program module(s) 18.1-18.*n* consisting of one or more program modules that perform a predetermined operation on data. Database 12 is also in communication with a server 16. Server 16 may be a web server for interfacing with remote computer systems in system 1. Web server 16 may be used to present data from database 12 to remote computer systems 3, 4, 5, 6, 7 etc. over a network. The data may be presented in any known format, including HTML, XML, PDF, CFML, MICROSOFT ASP, and other formats noted elsewhere herein or that are known in the art. Alternatively, presentation server 16 could present the data to a printer or video display or computer system, or through other means for displaying data (not shown in the figure).

One or more of data channels may communicate data from database 12 to applications in the IPCS or other participating party's computer system calling for stored data. Although not illustrated in all cases, it will be understood that any other components of system 1 may communicate defined fields of data to another system component along a data channel assigned to a field(s) of data. For loan applications, the predefined data channels may include one or more loan application data channels for transmitting data relating to loan application details; rate-lock form details data channel; rate sheet details; loan program details; credit report details; loan pooling program details; escrow details appraisal details; and title report details. It is to be understood that the data channels depicted in the figures are for illustrative purposes only and should not be construed as a limitation on how data may be communicated between system components, other paths being within the spirit and scope of this disclosure.

One or more program modules 18 may be included in one or more participating party computer systems to process data output from another participating party to generate desired forms of information, as described below. Information processed in system 1 may be presented to an end-user in any known form of communicating information, including: printed reports, emailed reports; server-stored reports; said reports displayed in predefined layouts including governmental and quasi-governmental formats such as Fannie Mae and Freddie Mac standard protocol and HUD; accessible to end-users over a public or private network, including website posted reports. The presentation server 16 may serve web pages to remote computers systems through conventional TCP/IP protocols or other known protocols. The web pages may be presented through conventional web browser application such as INTERNET EXPLORER series of web browsers by Microsoft Corporation, or the NETSCAPE COMMUNICATOR series of web browsers by Netscape Communications Corporation.

The following sections are detailed description of the parties having access to and control over allocated resources of the interchange party computer system ("IPCS"). The description is intended to be just one example of allocated resources available to various participating parties, and how the allocated resources could be used.

Example Interchange Computer System Features for Participating Parties

In these sections, representative and example user interfaces 15 are included as figures. The allocated resources to a participating party on an IPCS may include one or more of the following:

Administrator resources that allow a participating party to post content accessible by its users or by other participating parties;

Administrator resources that allow a participating party to control who has access to content on the allocated resources;

Administrator resources that allow a participating party to post accounting, reporting, and statistics pertaining to use by its users or by other participating parties; and User resources for authorized users of a participating party's allocated resources.

In the following sections, certain possible embodiments of an RPFC and allocated resources on an IPCS will be illustrated in the context of specific participating parties and their users. It is to be understood that such embodiments are examples and not limitations of the participating parties, and components and features of the invention.

Figure 4A:
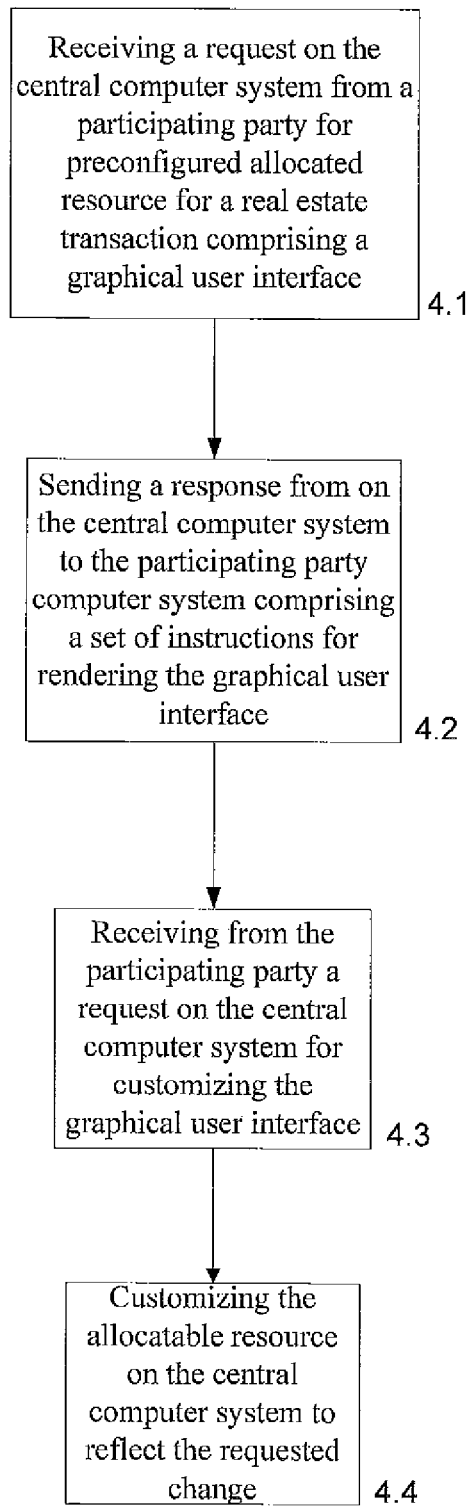
FIG. 4A is a flowchart relating to customizing the graphical user interface.
Figure 7:
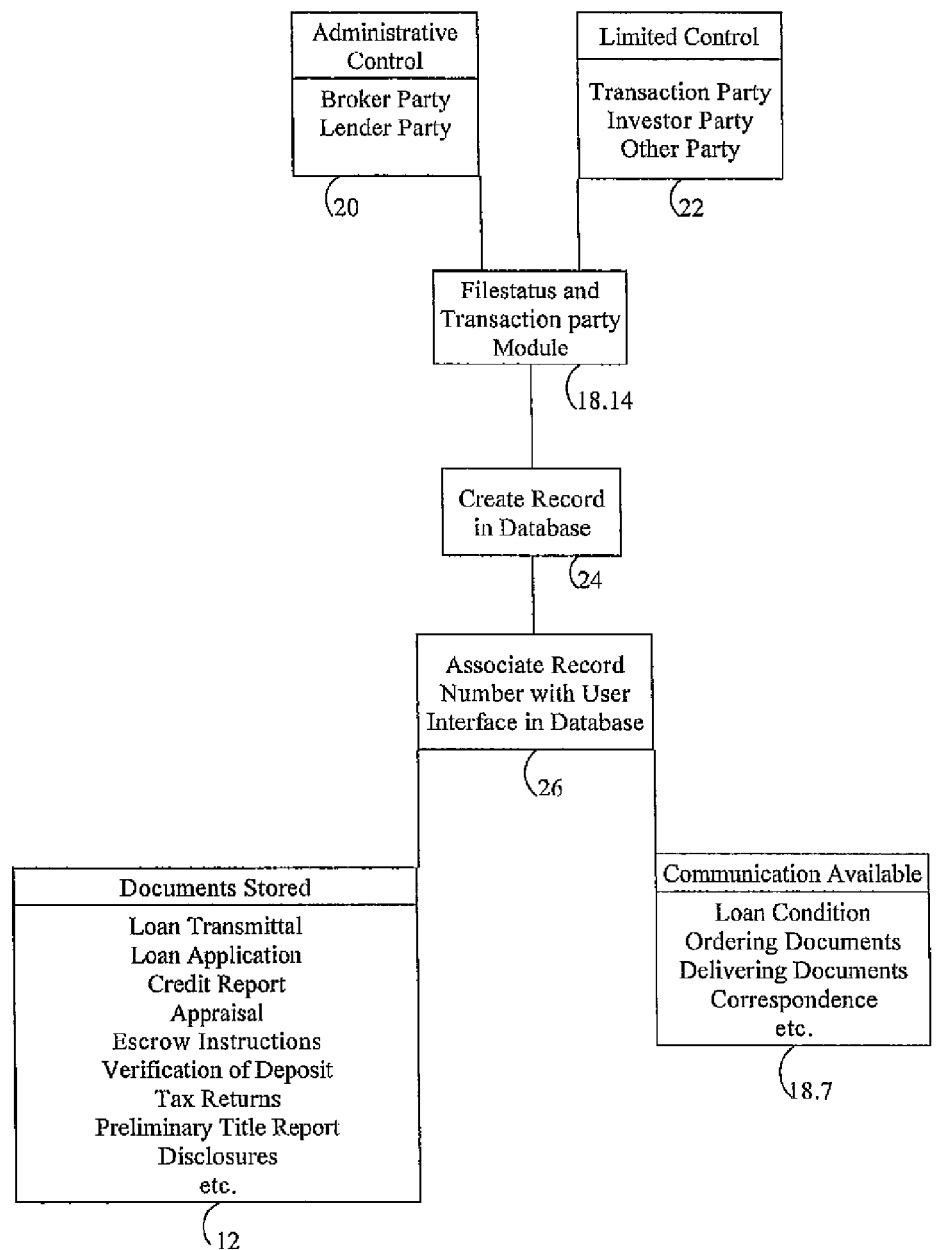
FIG. 7 is a schematic representation of one possible embodiment of File Status and Transaction Party Module according to the present invention.

FIG. 4A shows a flowchart of a method implemented over an Interchange Party Computer System ("IPCS") comprising receiving a request on the central computer system from a participating party for preconfigured allocated resource for a real estate transaction comprising a graphical user interface, sending a response from on the central computer system to the participating party computer system comprising a set of instructions for rendering the graphical user interface, receiving from the participating party a request on the central computer system for customizing the graphical user interface, and customizing the allocatable resource on the central computer system to reflect the requested change.

Lender Parties

Lender Administrators

Each Lender may have (1) a main administrator or (2) a main administrator and a branch administrator(s) that have control over the Lender's allocated resources 2.3 of the IPCS and the Lender's own internal computer processing systems on lender computer system 3.

Lender Party User

A Lender Party User ("LPU") may include corporate management, branch management, regional and branch directors, account executives, underwriters, and loan processors. While each LPU does not have complete administrative control over the Lender's allocated resources of the IPCS, they each have varying degrees of access to and control of the allocated resources, as dictated by the Lender Administrator, the Interchange Party, and other Participating Parties.

FIGS. 5.0-5.55 are screen shots of allocated resources in the form of user interfaces 15, according to the present invention. The user interfaces may be in the form of HTTP pages for a Lender and its users. FIG. 5.0 shows a user interface 15.1 in the form of a web page that serves as a home page for a Lender Administrator. An administrator for an investor party, for example, could have a similar page. The page is part of the allocated resources provided by the interchange party to the Lender. The page is basically a menu list that may be used by the Lender Administrator to access other Lender Administrator user interfaces. As seen in FIG. 5.0, the page includes links to a company roster; company news; a searchable, managed database, "rapid search"; a statistical module for producing reports, "view reports"; a user set-up page; a company message system; a page for uploading content; a rate notification page; and a help section. (FIGS. 5.1-5.55 correspond to the pages that are directly or indirectly linked to foregoing links.) The foregoing and following features are presented as examples not limitations; persons skilled in the art will appreciate from the scope and spirit of the teachings herein that many additions, deletions and modifications to the templates discussed herein are possible.

LPU Set Up Module

Through the LPU set up module 18.1, the Lender Administrator can grant, edit and remove an LPU's access to its allocated resources on the IPCS. FIGS. 5.1-5.6 show user interfaces 15.2(a)-15.2(b), 15.3-15.6 for a Lender Administrator to set up a profile for an LPU. In this case, an account executive. As can be seen, the user interface allows group associations and access permissions. When granting an LPU access, the Lender Administrator completes an on-line registration form that sets forth the LPU's pertinent contact information, title, and level of control of and access to the Lender's allocated resources on the IPCS. When setting up an account executive, the Lender Administrator must also input the corresponding contact information, rate sheet region, and support staff information for each of the account executives. This input information appears on the account executive's Lender Page, which is the interface on the IPCS 2 that the broker has to the Lender's allocated resources. See View Lender Page Module, below, for more detail.

In setting up an LPU, the Lender Administrator designates the level of control that each LPU has over the Lender's allocated resources 2.3. For example, the Lender Administrator determines whether a given account executive or director can modify scrolling messages viewed by an account executive's brokers on the Lender Page. The data input information through user interfaces 15.2(a)-(b), 15.3-15.7 may be stored in a database allocated resource 12.

Viewing Lender Pages Module

The allocated resources provided to a Lender include pre-configured user interfaces in the form of "Lender Pages". Through the Viewing Lender Pages Module 18.2, the Lender Administrator can view the Lender Pages of all the Lender's account executives or other designated LPUs. The Lender's approved brokers have access to their account executives' Lender Pages. The LPUs can view all or some of the Lender Pages, as dictated by the Lender Administrator. A Lender may use and customize the Lender Pages to present, for example:

i. Rate and Loan Program Module, described below.
 ii. Automated Underwriting and Risk Based Pricing Module, described below.
 iii. uploaded files such as rate sheets (which includes any format for viewing rates and corresponding loan programs such as HTML, .pdf, XML, .gif, .tif, or text), guidelines, any other documents the Lender wishes to make available to its brokers.
 iv. contact information.
 v. a link to the Lender's own website that resides on the Lender's own server and which can be accessed by the Lender's approved brokers without having to type in login information such as user name and password for the Lender's website because the Interchange Party has allocated resources for the brokers to update a user name and password registry for all its Lenders using the IPCS and that have websites; said registry is managed by each broker loan agent on his or her interface to its allocated resources on the IPCS.
 vi. scrolling message to brokers, which can be updated by account executives, directors or the Lender Administrator, depending on the level of control granted to the LPU by the Lender Administrator.
 vii. Lender's approved appraiser list and contact information.
 viii. Link to Lender Mortgage Pool Module, described below.
 ix. Link to Forms Submission Module, described below.

FIG. 5.7 is an example of a Lender Page 15.7, showing some of the possible features of such a page.

Broker Set Up Module

Through Broker Set Up Module 18.3, a Lender Administrator can grant, edit, suspend, define access and/or remove the access that its brokers have to the Lender's allocated resources 2.3 on the IPCS. In addition, the Lender Administrator can view the Lender's approved and suspended broker lists. The function can be carried through user interfaces 15.8-15.12 shown in FIGS. 5-8-5.12. The Lender Administrator associates the brokers with a particular account executive, branch, or region, as the case might be, in order to dictate which rate sheet, other documents, contact information, and appraiser list that the broker can view on the Lender Page. The IPCS permits the Lender to reflect any change through either the IPCS, the Lender's own internal processing computer system e.g., computer system 3, or the Lender's own website database associated with computer system 3 so that the data can be ported to each of the computer systems to avoid multiple entry of the redundant data. The pages include means to create a broker profile and links to other pages of allocated resources 2.3 for managing brokers.

Appraiser Set Up Module

Through an Appraiser Set Up Module 18.4, the Lender Administrator can grant, edit, suspend, or remove appraisers from the approved appraiser lists that the Lender's approved brokers can view on a Lender Page 15.7. In addition, the Lender Administrator can view the Lender's approved and suspended appraiser lists. The IPCS permits the Lender to reflect any change through either the IPCS, the Lender's own internal processing computer system, or the Lender's own website database so that the data can be ported to each of the computer systems to avoid multiple entry of the redundant data.

Rate and Loan Program Module

The Rate and Loan Program Module 18.5, among other things, allows a lender to:

create a record for a loan program it offers
 edit records
 view records
 copy records
 remove records
 save records to a database
 associate records with other records in a database The Rate and Loan Program 18.5, among other things, allows another party:

to select criteria from a menu of criteria
 search for loan programs matching the selected criteria The Lender Administrator through user interfaces 15.13-15.14, 15.15(a)-(b), and 15.16-15.35 shown in FIGS. 5.13-5.14, 5.15(a)-5.15(b), 5.16-5.35 can input the Lender's loan program details, including interest rates, loan to values and corresponding pricing adjustments through the Rate and Program Module interface of the IPCS, which can then be viewed, edited and/or ported to the Rate and Loan Program Modules of the Lender's own internal processing computer system, the Lender's own wholesale website database, and the Lenders consumer direct website database, as long as said websites are connected to the IPCS. If the Lender's consumer direct website database is connected to the IPCS, then the data input the Rate and Program Module interface may be modified dynamically before being viewable on the Lender's consumer direct website by the Lender inputting certain data on the Lender's administrative interface for the consumer direct website that affects the data on the Rate and Program Module of the IPCS, such as interest rate margins that increase the interest rates viewed by the consumers.

The IPCS permits the Lender to update its rates and programs on either the Rate and Program Module 18.5, the Lender's own internal processing computer system, or the Lender's own websites database so that the data can be ported to each of the Rate and Loan Program Modules to avoid multiple entry of the redundant data. The data input in the Rate and Program Module can be accessed by the Lender's brokers and LPUs when the brokers and LPUs search for loans based on the required loan criteria. The output of the search results in a dynamically created rate sheet, which may be in the form of, for example, CFML, Microsoft ASP, HTML, XML, .pdf, or text. The Lender may choose not to input the interest rate that applies to a loan program so that the search based on loan criteria only results in the display of the available loan programs matching the search criteria, in which case the rate sheets can be uploaded by the Lender Administrator as described below in the Uploading Files Module. Brokers and LPUs can also link from this Module to the Mortgage Pools Module, as described below.

To input the loan program details, the Lender Administrator can choose from a drop-down menu list of inputting options on user interface 15.13. The Lender Administrator can select "Loan Programs", "Regions", "Templates", "Update". In the case of FIG. 5.13, "Loan Programs" is displayed in a drop-down menu.

If Loan Programs is selected on the menu, the Lender Administrator can add, edit or delete a loan program in the database. As seen in user interface 15.13, when adding a loan program, the Lender Administrator can indicate in which geographical region(s) a property can be located where the Lender offers that loan program. The region for each new loan program is the Default region that the Lender Administrator has created. See Regions, below. In creating a loan program, the Lender Administrator can indicate the loan program number/name, the program type (i.e., 3 month negative amortization loan), the loan type (i.e., jumbo, conforming, or jumbo/conforming), the amortization period (i.e., 360 months), interest rate adjustments (i.e., index and margin), the index (12 MAT (MTA)), the margin (i.e., if an adjustable rate mortgage, this would be the interest rate added to the index), the life cap (i.e., if an adjustable rate mortgage, this would be the highest the interest rate could reach), the trust deed/mortgage type (i.e., first trust deed or second trust deed), and the interest rate (see user interface 15.13). In addition to inputting the basic loan program details, the Lender Administrator can input all the line items associated with the loan program, including loan to values, pricing adjustments, and reference guides. If the Lender Administrator has already input the loan to values, pricing adjustments, and/or reference guides for another loan program or a template loan program, See Templates, that are identical to or similar to the loan program just created, the Lender Administrator can simultaneously save and associate the newly created loan program with another loan program's or a template program's loan to values, pricing adjustments, and/or reference guides (see user interface 15.14).

In the Loan Programs section, the Lender Administrator can indicate the loan to values associated with a particular loan program on a Full Doc, EZ Doc, Stated Doc, and/or No Doc basis. For example, the Lender Administrator can indicate what loan to values are associated on a Full Doc requirement basis. Such line items include occupancy status (i.e., owner occupied, second home, or non-owner occupied), property type (i.e., single family, condominium, PUD, 2 units, 3 units, or 4 units), geographic region, type of finance (i.e., purchase money loan, rate and term refinance, or cash-out refinance), other loan criteria (first trust deed loan to value, loan amount, combined loan to value, maximum cash out, FICO score required, pre-payment obligations, qualifying borrower, qualifying ratio, and mortgage insurance).

After setting the loan to value items, the Lender Administrator can save, save without resetting, save and exit, and assign templates (see user interfaces 15.15(a) and (b)).

In the Loan Programs section, the Lender Administrator can indicate the pricing adjustments associated with a particular loan program on a Full Doc, EZ Doc, Stated Doc, and/or No Doc basis. The Lender Administrator can indicate an indefinite number and type of pricing adjustments for an indefinite number of loan programs. For example, a given pricing adjustment might apply to a particular loan program's Full Doc requirements, or to all of the loan programs' Full Doc requirements. Examples of a pricing adjustment might be that 3 unit properties in a given geographical location that will have loan to values greater than 90% on loan amounts exceeding $500,000 will add 0.250% to the stated interest rate for the loan program (see user interfaces 15.16-15.17).

In the Loan Programs section, the Lender Administrator can upload reference guides to be viewed by parties having access to the Lender Administrator's allocated resources on the IPCS. The Lender Administrator can either upload various file format types such as HTML, Adobe Acrobat .pdf, Microsoft Word, Microsoft Excel, XML and text. An example of a reference guide for a given loan program might be that there is a minimum loan amount, minimum loan term, maturity, or assumability that relates to the loan program (see user interfaces 15.18-15.19).

If Regions is selected from the menu, the Lender Administrator can create, edit, and delete default and specific lending regions that the Lender Administrator will associate with various loan programs. The lending regions can be broken down by state, county, and city (see user interfaces 15.20-15.23).

If Templates is selected from the menu, the Lender Administrator can create, edit, and delete loan program templates that the Lender Administrator can use for a number of loan programs. The Lender Administrator can associate loan programs to templates it creates. In creating a template, the Lender Administrator can input all the criteria of a loan program, including loan program details, loan to values, pricing adjustments, and reference guides, which are input the same way that said criteria is input as stated in the Loan Programs section above. Using Templates reduces the amount of work for a Lender Administrator to input the data of two or more loan programs that share much of the redundant data such as loan to values, pricing adjustments, reference guides, or document type, which include Full Doc, EZ Doc, Stated Doc, and NO Doc. For example, a Lender can associate a loan program only to the pricing adjustments for a given template, but not associate the same loan program to the template's loan to values or reference guides. That is, a Lender Administrator can associate a loan program to one of four parts of a template, namely loan to values, pricing adjustments, reference guides, or document type, which include Full Doc, EZ Doc, Stated Doc, and NO Doc (see user interfaces 15.24-15.33).

If Update is selected from the menu, the Lender Administrator can modify one or more loan programs before effecting the change on the IPCS. In this way the Lender Administrator may make changes off-line, view and print the changes to make sure they are accurate, and then finally make the changes viewable to the participating parties having accessing to the Lender's allocated resource. The changes can go into effect automatically at some predefined time as determined by the Lender Administrator.

After loan programs have been inputted, the Lender Administrator can view and print loan program details, including all the details and line items of all the loan programs, individual loan programs, or loan programs that share identical line items and details (see user interfaces 15.34-15.35).

The foregoing features, and similar feature for LPUs and other participating parties, may be implemented through a DBMS 12 on the IPCS 2, as described above and linked to pages, such as CFML pages, ASP, XML, or other format, that are preconfigured by the Interchange party as allocated resources for use by a lender participating party and/or other participating parties.

FIG. 5.36 shows a screen shot showing an allocated resource in the form of a user interface 15.36, according to the present invention. The user interface is preconfigured for a Lender Administrator, LPU, or other party to select predefined search criteria for a Lender's or collection of different Lender's loan programs. The page includes a drop-down list menu for a number of loan program categories and search criteria options under each category. The default setting is "N/A" (not applicable) Under the "property type" category, the menu options may include SFR, condominium, multiple units, and PUD. Under the "occupancy" category, the menu options may include owner, second home, non-owner etc. Under the "finance type" category, the menu options may include purchase, rate and term, and cash-out. Under the "product type" category, the menu options may include products based on interests programs of 30 year fixed, 15 year fixed, various periods for fixed year balloon loans, and adjustable rate periods. Under the "amortization" category, the menu options may include amortization over 180 months, 360 months 480 months or 360 or 480 months. Under the "trust deed" category, the menu options may include first trust deed, second trust deed, equity line. Under the "documentation" category, the menu options may include full documentation, EZ documentation, stated documentation, and no documentation. Under the "qualifying borrower" category, the menu options may include occupant or non-occupant. Under the "loan amount" category, the menu options may include conforming and specific amounts in a range. Under the "LTV" (Loan To Value) category, the menu options may include specific amounts in a range. Under the "CLTV" (combined loan to value) category, the menu options may include specific amounts in a range. Under the "Max Cash Out" category, the menu options may include specific amounts in a range. Under the "Index" category, the menu options may include 6 month CD, 6 month LIBOR, 11th Dist COFI, and other such indices. Under the "margin" category, the menu options may include specific amounts in a range. Under the "life cap" category, the menu options may include specific amounts in a range. Under the "adjustment" category, the menu options may include specific amounts in a range and "index and margin". Under the "prepayment" category, the menu options may include "yes" and "no". Under the "mortgage insurance" category, the menu options may include "yes" and "no". Under the "credit score" category, the menu options may include specific amounts in a range. Under the "back end score" category, the menu options may include specific amounts in a range.

FIG. 5.37 is a screen shot of a user interface 15.37 with an upper table of selected search criteria input through the search table of FIG. 5.36 and the matching loan programs in the lower table. The page includes links to further details about displayed loan programs and potential "add-ons" for brokers. There is also an option to select and display the rate sheet for the Lender offering a displayed loan program.

Uploading Files Module

The Uploading Files Module 18.6 allows an administrator to upload files to allocated resources for viewing or retrieval by LPUs or participating parties, under conditions specified by the Lender Administrator, FIGS. 5.38-5.43 show user interfaces 15-0.8 15.43 for uploading files. For example, if the Lender chooses not to input the interest rate for a given loan program in the Rate and Loan Program Module, then the Lender Administrator can upload computer files of its rate sheets, as well as any of its most current Lender documents and forms, such as loan applications, matrices, broker demand form, registration form, submission form, rate lock form, Lender guidelines, and guidelines in formats such as HTML, Adobe Acrobat .pdf, Microsoft Word, Microsoft Excel, XML, or text that can be viewed by the Lender's brokers and the LPUs. The Lender Administrator can also upload a .jpeg or .gif file of its company logo that will appear on its Lender Pages, its own website if it the website is connected to the IPCS, and its own company section of the IPCS to be viewed when the LPU access the company section. The IPCS permits the Lender to upload its files through either the IPCS, the Lender's own internal processing computer system, or the Lender's own website database so that the data can be ported to each of the computer systems to avoid multiple entry of the redundant data. The uploaded files are stored in file directories in the Lender's allocated resources on the IPCS so that each of the Lender's brokers will only have access to the files that the Lender Administrator chooses for that broker to access, normally the broker's access is dictated by the branch, region, or account executive the Lender Administrator associates with the broker. See Broker Set Up Module, below. A broker's loan agent's access to a Lender's rate sheet is also control by the Broker Administrator, as described BPU Set Up Module in the Broker Parties section below.

FIGS. 5.38-5.43 are screen shots of allocated resources in the form of user interfaces 15.38-15.43 for uploading documents. These are just a few of many possible user interfaces for uploading content and managing content. User interfaces 15.38-15.41 show how to select and upload a Lender rate sheet relating to a selected region serviced by the Lender. The rate sheet would be viewable by LPUs and approved brokers for the selected region. FIG. 5.41 shows a user interface 15.41 that enables a Lender to select common forms from a list and create a customized list for its own needs. FIG. 5.42 shows a user interface 15.42 that may be included on allocated resources for allowing a Lender to add new forms not on the default list to its customized list.

Rate Change Notification Module

Figure 3:
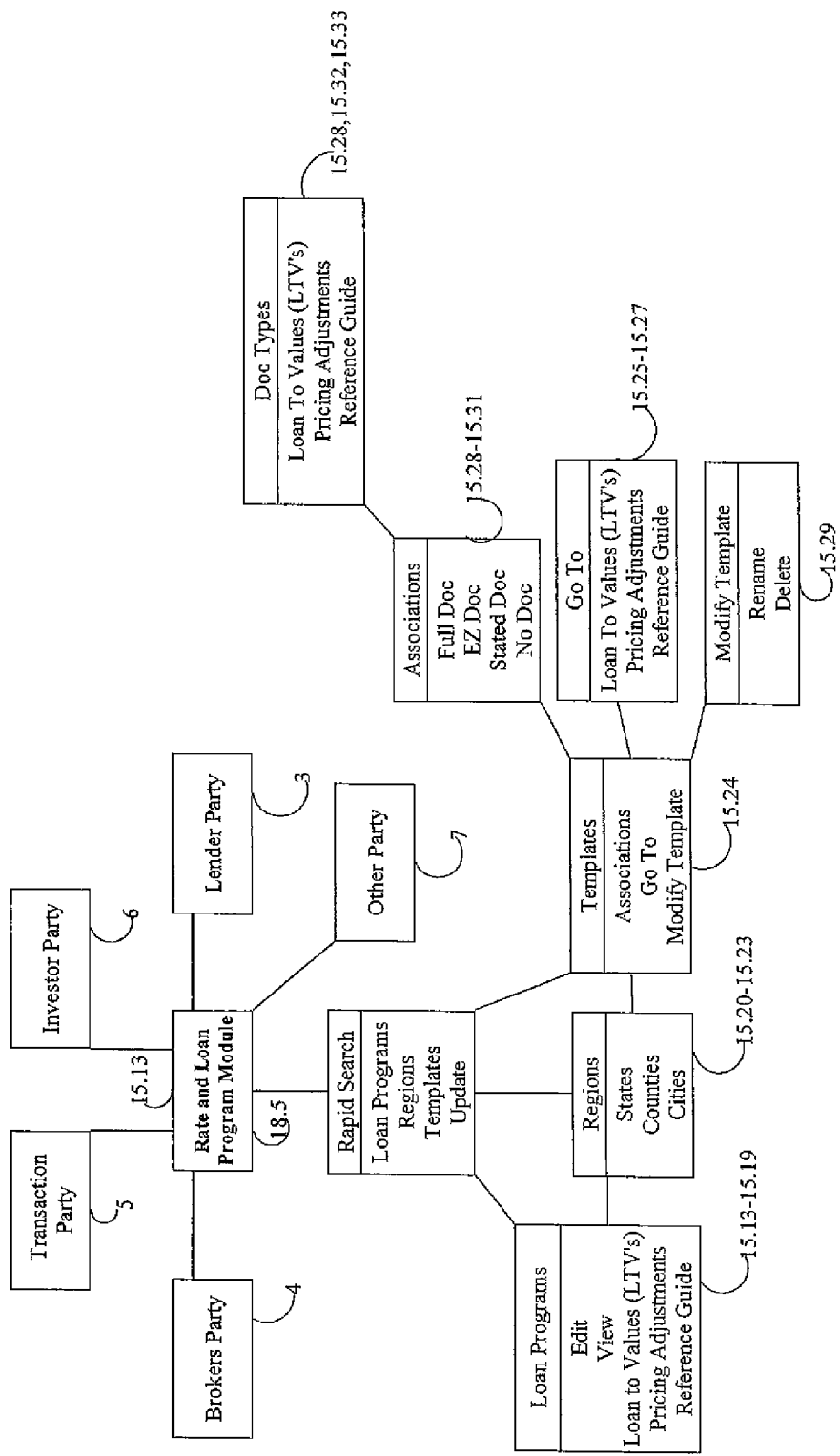
FIG. 3 is a schematic representation of one possible embodiment of a Rate and Loan Program Module according to the present invention.

If the interest rates for loan programs are changed in the Rate and Loan Program Module 18.5, or if a file for a rate sheet is uploaded in the Upload a File Module 18.6, the Lender Administrator can automatically send a broadcast rate change notification email, page, and/or voicemail to all or certain of the LPUs, the brokers, and their loan agents. The rate change notification is defaulted to be sent to all of the Lender's brokers that have access to a given rate sheet whose rates have changed. If interest rates have increased, then the text of the date/time next to the rate sheet link on the Lender Pages will appear red; if the rates have decreased, then the text of the date/time next to the rate sheet link on the Lender Pages will appear green. The Lender Administrator can also send a broadcast rate change email, page, and/or voicemail to all of the Lender's brokers and LPUs at anytime regarding any matter. The IPCS permits the Lender to reflect the interest rate change through either the IPCS, the Lender's own internal processing computer system, or the Lender's own website database so that the data can be ported to each of the computer systems to avoid multiple entry of the redundant data. FIG. 5.43 is an example user interface 15.43 provided with allocated resources for a Lender Administrator to upload a rate sheet relative to a rate increase or decrease. As can be seen in the FIG. 5.43, the interface includes means for the rate sheet to be posted for presentation on a regional basis. FIGS. 5.44-5.46 show user interfaces 15.44-15.46 provided with allocated resources to notify participating parties and their users of rate changes. The user interface 15.44 allows selection of either a rate increase or decrease. User interface 15.45 appears if "rate increase" is selected on user interface 15.44. The user interface 15.46 allows a user to designate all brokers in all regions or select regions. Also, as seen in the figures, the user interface includes a message field for a text message about the rate increase or any other desired subject. Some details of a possible embodiment of a Rates and Loan Program Module are schematically illustrated in FIG. 3.

Forms Submission Module

Using the Forms Submission Module 18.7, through an interface on its allocated resources of the IPCS, the Lender Administrator can indicate the type of electronic form such as a loan application, rate lock form, submission form, broker demand form, it wishes to make available to its brokers on the brokers' allocated resources of the IPCS, and to its brokers and borrowers on the Lender's wholesale website and borrower direct website, respectively. The brokers can upload a digitally formatted document that was created in the broker third party loan origination software (which said system can be adapted for such well known third party loan origination software as Calyx, Byte, Contour, and Genesis), or in a spreadsheet format, which when uploaded fills in the fields of the on-line document, or can fill out the document through an interface such as HTML or XML, and port said document back into its third party loan origination software (which said system can be adapted for such well known third party loan origination software as Calyx, Byte, Contour, and Genesis), store it on the IPCS, view, print, and send said documents to the Lender, who can then port said document into its internal processing system (which can be adapted for such third party internal processing systems such as Gallagher or Fiserv), store on the IPCS, view, and print, or broker can send said documents directly to Secondary Market Investor internal systems such as Fannie Mae and Freddie Mac. The stored documents on the IPCS shall be saved in directories on the IPCS, which can be accessed to by certain other Participating Parties, and placed in a sequence in relation to other documents (known in the industry as "stacking order") as part of the electronic loan application file. The data of a document can be shared by the Participating Parties by being saved in a format such as XML or text to be ported to each of the computer systems of the Participating Parties to avoid multiple entry of the redundant data.

Automated Underwriting and Risk Based Pricing Module

The present invention includes Automated Underwriting and Risk Based Pricing module 18.8. Through an interface on its allocated resources of the IPCS, which is tied to the database tables for the data and information submitted in the Rates and Loan Program Module 18.5, the Lender Administrator can establish the required data that must be accurately included in the loan application submitted by its brokers or borrowers. If the data included in the fields of the electronic loan application match the criteria established by the Lender Administrator through the Automated Underwriting Module 18.8, then the Lender Administrator, other LPUs as dictated by the Lender Administrator, and the broker are notified as to whether all or some of the submitted data match the criteria established by the Lender Administrator.

The Lender Administrator will also establish risk based pricing criteria when establishing the automated underwriting criteria. Risk based pricing refers to an increase or decrease of the interest rate applied to a loan depending on the certain risk factors inherent in a loan application, including the applicant's credit rating, the loan to value of the loan, and debt to income ratios. Concurrently with the automated underwriting, this module will evaluate the risk factors inherent in the loan application and will calculate the Lender's interest for the loan program. Depending upon the loan program selected from the Rate and Loan Program Module 18.5 and affected by the underwriting decision from the Automated Underwriting component Module 18.8, the Risk Based Pricing Component of Module 18.8 will automatically output an interest rate applicable for the submitted loan application.

Company Roster Module

The Company Roster Module 18.9 provides a company roster to participating parties. For example, the Lender Administrator, the LPUs, and the other Participating Parties accessing their allocated resources on the IPCS can view the Lender's on-line company roster, which may include email addresses, telephone and fax numbers, position titles and departments. The Lender Administrator can, change the company roster in the LPU Set Up Module 18 in the IPCS described above, or the Lender's own internal processing computer system, or the Lender's own website database so that the data can be ported to each of the computer systems to avoid multiple entry of the redundant data.

Messaging Module

Using the Messaging Module 18.10, the Lender Administrator can post office news to be viewed by its LPUs accessing the IPCS. In addition, using Messaging Module resources 18.10, the Lender Administrator can write a scrolling message viewed by the Lender's approved brokers, LPUs and/or other Participating party User accessing its allocated resources of the IPCS; the Lender Administrator controls the ability of its LPUs to update scrolling messages. See user interfaces 15.47-15.50 on FIGS. 5.47-5.50. The Lender Administrator can overwrite any scrolling messages that the Lender's account executives or regional directors have written for the brokers under their control. The Lender Administrator can view past and present office news that it has posted for its LPUs. The Lender Administrator can also view the past and present messages that its directors and branch administrators have posted for their account executives. All LPUs can view past and present office news posted by the Lender Administrator, and by their directors. The IPCS permits the Lender to reflect any change through either the IPCS, the Lender's own internal processing computer system, or the Lender's own website database so that the data can be ported to each of the computer systems to avoid multiple entry of the redundant data. FIG. 5.2 shows an example user interface that may be included in allocated resources for presenting company messages. The interface includes a means to retrieve archived messages and to retrieve messages posted by or to selected users, e.g., "directors".

Viewing Statistics Module

The IPCS includes a program module 18.11 that enables a Lender to obtain statistical information about the viewing of content it makes available to its LPUs and other participating parties. In one possible example, the statistics relate to rate sheets and rate changes. Statistics may be broken down on the basis of a company total, branch total, the directors' totals, account executives' totals, brokerage firm totals, and individual broker loan agent totals. The statistics may be kept as a running total, for example, beginning the first day of the month and ending on the last day of the month. The Lender Administrator and the LPUs can view the statistics for the previous month or other specified period. The Lender Administrator dictates the type of statistics to which LPUs may have access. Typically, the Lender Administrator and management would have full access to statistics; directors can view statistics of themselves, their account executives, their brokers, and their brokers' loan agents; account executives can view statistics of themselves, their brokers, and their brokers' loan agents. The statistics also show a comparison of the Lender to other lenders using the IPCS; the lenders are ranked by percentile. The statistics may be associated with other features enabled by allocated resources such as email links and telephone numbers of the party reflected. See user interface 15.51 in FIG. 5.51, which is an example of user interface for viewing Statistics Module 18.11.

Rate Sheets Viewed

There are statistics on how many minutes the Lender's approved brokers and loan agents view its rate sheets.

Rate Changes

There are statistics on how many rate increase and decrease email notifications were sent on a company-wide basis, branch basis, and for each regional rate sheet.

Broker Viewing Lender's Rate Sheets

There are statistics on how many of the Lender's approved brokers are not viewing its rate sheets but viewing other lenders' rate sheets.

Brokers' Use of Lender's Rates on Broker's Website

The Lender Administrator can view statistics on whether a given broker is posting the Lender's interest rates on the broker's website. The statistical break down includes figures related to loan programs selected. See Broker's Websites in the Broker Parties section, below.

Time of Day Rate Sheets Viewed (Graphical Display)

The Lender Administrator and the LPUs can view a graphical representation of the hour of the day that rate sheets are viewed by the Lender's approved brokers.

View Reports Module

The IPCS includes a Viewing Reports Module 18.12 for viewing reports on the amount and nature of usage of allocated resources 2.3, for example, by LPUs and participating parties. Reports may be broken down on the basis of a company total, branch total (if the allocated resources are broken down for branches), the directors' totals, account executives' totals, brokerage firm totals, and individual broker loan agent totals. The Lender Administrator dictates the type of reports that the LPUs have access to. Typically, the Lender Administrator and management have full access to reports; directors can view reports that relate to themselves, their account executives, their brokers, and their brokers' loan agents; account executives can view reports that relate to themselves, their brokers, and their brokers' loan agents. Next to the report are email links and telephone numbers of the party who is reflected.

Reports may show how many times each of the Lender's approved brokers and the brokers' loan agents have viewed its rate sheets on a Today's Total, Yesterday's Total, Last 7 Days' Total, and Last 30 Days' Total basis. The reports also show which brokers and broker loan agents have not viewed the Lender's rate sheets on a Today's Total, Yesterday's Total, Last 7 Days' Total, and Last 30 Days' Total basis, or any predefined time period, as specified by the Lender. See user interfaces 15.51-15.52.

Mortgage Pool Modules

Using Mortgage Pools Module 18.13, the Lender Administrator can create mortgage pools whereby brokers entering their loans into the pool during a prescribed time period will be entitled to better loan program pricing or other predefined incentives. The mortgage pools can be created by varying criteria, including loan volume, specific brokerage firms, and regional locations. The pricing will be granted to the brokers on a sliding scale so that if the total loan volume entered into the pool by all participating brokers increases to certain predetermined level, the pricing for all the loans in the pool will continue to improve for the brokers, thus giving brokers the incentive to submit loans to the Lender over other lenders. The Lender Administrator through an interface of the IPCS can manage database allocated resources and set the scale and view the information relating to the loans entered into the pool, including loan program details, broker details, and borrower details. Other LPUs will have access through an interface to view information related to the pool. The Lender Administrator can also view mortgage pools created by Secondary Market Investors so that the Lender Administrator can determine the type of mortgage pools it wishes to create for its brokers. See Secondary Market Investor Party, below.

File Status and Transaction Party Module

Using a File Status and Transaction Party Module 18.14, the Lender Administrator, and other LPUs as determined by the Lender Administrator, can manage, and report status, through an interface of the IPCS a list of the required documents for the approval of a loan application submitted by the broker on behalf the borrower, or if the Lender's consumer direct website is connected to the IPCS for applications submitted directly by the borrower. Such details include loan conditions that have or have not been satisfied by the borrower, including proof of income, appraisals of the property, proof of employment, title reports and insurance, escrow instructions. The IPCS permits the Lender to reflect the updated checklist through either the IPCS, the Lender's own internal processing computer system, or the Lender's own website database so that the data can be ported to each of the computer systems to avoid multiple entry of the redundant data. These details can be viewed by the brokers through the broker's interface of the IPCS, or by the borrower on the Lender's consumer direct website. Brokers or the broker's loan processor can then modify the checklist that is viewed by the borrower on the broker's website that is connected to the IPCS. See File Status in Broker Parties section, below.

Through this Module, the Lender Administrator, and LPUs as determined by the Lender Administrator, can also request, pay for (if necessary), and receive transaction party documents, such as loan applications, appraisals, credit reports, title insurance and reports, escrow instructions, loan documents, and any other documents required as a loan condition. The IPCS may include a program module that tracks the movement of documents between parties, and associates a fee with the movement of particular documents. The module could include an accounting system relative to such fees, including an account for each party that earns or incurs a fee. It may also include associated automatic payment systems. The details for implementing such a program module into the IPCS are well known in the art or well within the skill of persons in the art. See Transaction Parties, below.

The Transaction Party's digital documents, as well the loan application, rate lock form, and any other digital document submitted by a broker, is stored in a borrower's directory. The documents are ordered in a sequence defined by the Lender Administrator, referred to in the industry as "stacking order", so that when viewed and printed conform to the order that said documents are normally ordered in the Lender's hardcopy loan application file. This directory and its contents comprise an electronic/digital loan application file that can be accessed by the various participating parties through their allocated resources of the IPCS, including the Lender, broker, Secondary Market Investor, borrower, and the transaction parties. See File Status in Broker Party section, below. The details for implementing such an ordering system into the IPCS are well known in the art or well within the skill of persons in the art.

Pipeline Module

Using a Pipeline Module 18.15, the Lender Administrator and various LPUs as dictated by the Lender Administrator can, through the IPCS, view and print reports on the loans that have been submitted to the Lender through the IPCS and/or the customary loan application process that is monitored by the Lender's own internal computer system, and/or the Lender's wholesale website and consumer direct website (if said websites are connected to the IPCS). The content of said pipeline report includes, for example, loan amount per application, per Lender region, branch, director, account executive, brokerage firm, loan agent total loan volume, details of said loan applications, loan fall out, delinquencies. User interface 15.55 of FIG. 5.55 illustrates the foregoing.

Borrower Direct Websites

The Interchange Party may provide allocated resources in the form of websites for Lenders so that they can market directly to borrowers on the Internet. Borrowers can electronically submit forms to the Lender, including loan applications and rate lock forms. Said forms, including their data, would then reside on the IPCS and be made available to certain of the participating parties so that said participating parties would be able to share data to avoid multiple entry of data. For example, a loan application completed by a borrower on the borrower direct website could be reviewed on line by the Lender through its allocated resources on the IPCS; the Lender could manipulate the data, and either forward it directly to the Secondary Market Investor such as Fannie Mae through the IPCS and/or port the data into its third party loan processing software. Borrowers can also request, pay for (if necessary), and receive the transaction party documents required by a Lender, including appraisals, title reports, credit reports. The participating parties can through their allocated resources on the IPCS can view and print the documents and their data as well as port said data into their own internal processing computer systems. The borrower can also view the status of a loan application file that has been updated by the broker and/or Lender through their allocated resources of the IPCS. Many of the same features given to the Lenders through their allocated resources of the IPCS, including Rate and Loan Program Module and the automated underwriting and risk based pricing module, can be accessed by the borrower through its interface on the borrower direct website.

Broker Wholesale Website

The Interchange Party may provide website allocated resources for Lenders so that they can market directly to their brokers on the Internet. Brokers can access the wholesale website either by typing the web address of the wholesale website or can access the wholesale website through a link on the Lender Page. Many of the same features given to the lenders through their allocated resources of the IPCS, including Rate and Loan Program Module and the automated underwriting and risk based pricing module, can be accessed by the broker through its interface on the wholesale website. The Lender Administrator can make changes, including granting or removing broker access, to the wholesale website by making the changes through its interface of its allocated resources of the IPCS, through the Lender's own internal processing computer system, or directly through the wholesale website administrative section. In each case, the data can be ported to each of the computer systems to avoid multiple entry of the redundant data.

Broker Parties

Broker Administrator

Each Broker may designate a Broker Administrator that has control over the Broker's allocated resources 2.4 of the IPCS 2. User interfaces are included in the allocated resources for Brokers to administer their allocated resources.

Broker Party User

A Broker Party User ("BPU") includes loan agents and loan processors that can access the Broker's allocated resources of the IPCS, as dictated by the Broker Administrator.

BPU Set Up Module

Using the BPU Set Up Module 18.16, the Broker Administrator can grant, edit, or remove a BPU's access to the Broker's allocated resources as well as participating parties' access to the Broker's allocated resources. For example, while the Broker Administrator will have access to all information of its lenders who are participating in the IPCS, and their Lender Pages as described in Lender Parties section above, the Broker Administrator can limit the BPU's access to said lender information. Interfaces 15.56-15.57 of FIGS. 6.1-6.2 are examples for doing so. For example, BPUs may be given access to only certain lenders, and their Lender Pages, with whom the Broker is approved.

Company Message Module

Using Company Message Module 18.17, the Broker Administrator can upload either a generic text message or an HTML file as well as the company logo in a .jpeg or .gif file to be viewed by the BPUs accessing the Broker's allocated resources on the IPCS, or by other participating parties accessing their allocated resources on the IPCS.

Company Roster Module

Using a Company Roster Module 18.18, the Broker Administrator can manage the Broker company roster that lists the names, department, title, and email addresses of the BPUs and that is viewed by the BPUs accessing the Broker's allocated resources on the IPCS, or by other participating parties accessing their allocated resources on the IPCS. User interfaces 15.58-15.59 of FIGS. 6.3-6.4 are examples for doing the foregoing.

Email Module

Using a Company Email Module 18.19, the Broker Administrator and BPUs have access through the Broker's allocated resources on the IPCS their lenders' company rosters and other participating parties' company rosters, which includes names, telephone numbers, and the ability to send emails. For example, the access to the Lenders' company rosters is managed first by the Lender Administrator through the Lender's allocated resources of the IPCS, and then by the Broker Administrator through its allocated resources of the IPCS.

Upload Files Module

Using an Upload Files Module 18.20, the Broker Administrator can upload any document in any format including Adobe Acrobat .pdf, .tif, Microsoft Word, Microsoft Excel, HTML, or XML, to be viewed, downloaded, or printed by the BPUs. A BPU's access to these documents is controlled by the Broker Administrator. An example of a document is a rate sheet received by the Broker via a service like JFAX.COM or EFAX.COM in .tif format, or similar format, which can be posted on the IPCS, or can be converted into XML, .pdf, or .gif and then posted on the Broker's allocated resources of the IPCS to be accessed by the Broker Administrator and the BPUs; the Broker Administrator can upload the rate sheet and make it available to the BPUs if the lender whose rate sheet is being posted is not participating in the IPCS.

Rate and Loan Program Module

The Broker Administrator and the BPUs can access through user interfaces 15.60-15.65 of FIGS. 6.5-6.10 on their allocated resource of the IPCS the Rate and Loan Program Module 18.5 of their lenders participating in the IPCS. The results are in the form of icons/links for lenders having matching programs, and include the number of matching programs each lender has. FIG. 6.9 shows a user interface that is displayed when the "Bank of America" icon/link in FIG. 6.8 is selected. The left side of the user interface 15.64 shows the lenders the Broker is approved with, and which among those lenders have programs that matched the criteria entered through user interface 15.62, with links to the lenders and their programs. A window 15.64.1 is pulled up by selecting a program detail 15.64.2, for "potential add-ons". The user interface of 15.64 also includes details on "product type", "fees", and "more info", as well as links to such details. It further includes a box to select "RS's" (rate sheets) for each program that a user is interested in selecting and viewing.

Forms Submission Module

Using the Forms Submission Module 18.7, the Broker Administrator and the BPUs can access through an interface on their allocated resource of the IPCS the Forms Submission Module of their lenders participating in the IPCS, in a manner similar to that described for the Lender party above. Example Form Submission Module User interfaces 15.66-15.67 for participating parties are shown in FIGS. 6.11-6.12.

Automated Underwriting and Risk Based Pricing Module

The Broker Administrator and the BPUs can access through an interface on their allocated resource of the IPCS the Automated Underwriting and Risk Based Pricing Module of their lenders participating in the IPCS.

Mortgage Pools Module

The Broker Administrator and the BPUs can access through an interface on their allocated resource of the IPCS the Mortgage Pools Module of their lenders participating in the IPCS. The level of access granted to BPUs can be controlled by either the Lender Administrator or the Broker Administrator. Brokers may access Mortgage Pools Module 18.13 using user interfaces provided for that purpose.

File Status and Transaction Party Module

Using File Status and Transaction Party Module 18.14, the Broker Administrator, and BPUs as dictated by the Broker Administrator, can manage through an interface of the IPCS a checklist of the required documents for the approval of a loan application submitted by the BPU to a lender. The checklist can also be accessed by a consumer through the Broker's website, if said website is connected to the IPCS.

Through this Module 18.14, the Broker Administrator and the BPUs can access information, including loan application file information, contact information, pricing and messages regarding Transaction Parties. Representative user interfaces 15.68-15.74 for this Module are shown in FIGS. 6.13-6.19. The accessible information can either be updated by the Transaction Parties through their interface for their allocated resources on the IPCS or uploaded by the Interchange Party. Through this Module, the Broker Administrator and the BPUs can also request, pay for (if necessary), and receive transaction party documents, such as appraisals, credit reports, title insurance and reports, escrow instructions, loan documents, and any other documents required as a loan condition. See Transaction Parties, below.

The following steps may be used to expedite exchange of loan documentation, facilitate communications between parties, facilitate transfer of loan documentation, assign tasks, and otherwise to allow participating parties to determine file status and complete required loan conditions. The steps and features that enable the foregoing are as follows; they do not necessarily need to be presented in the order given.

- A loan application file record is created 24 in the IPCS database.
- The loan application is assigned 26 a record number for identifying the loan application file in the IPCS.
- The IPCS associates 26 an interface(s) 15.68-15.74 for the record that, among other things, is linked to the database for the file and a messaging system on the IPCS.
- Certain allocated resources, for the loan application file record, namely the aforementioned user interface, are assigned to the participating party responsible for overseeing the loan application—usually the broker party.
- The IPCS receives conditions for the approval of a loan application file from a participating party—usually the lender sets such conditions, and such conditions are in the form of required loan documentation, such as credit reports, escrow instructions, etc. The conditions could also be automatically generated and listed through an Automated Underwriting Module of a party.
- The conditions are associated with the pertinent record number of the loan application file in the database.
- The IPCS presents the conditions to participating parties that are designated by the broker through user interface allocated resources that were associated with the loan application file record, as described above.
- Through the user interface allocated resources, the broker may, under conditions set by the broker or lender, who have administrative control 20:
  - give its users and other participating parties access to and limited control 22 over the user interfaces for purposes of viewing and/or updating the status of a loan application file.
  - assign tasks to participating parties related to conditions, and notify parties of their assigned tasks.
  - allow transaction parties or other parties to upload to the IPCS, or otherwise transfer to the IPCS or directly to a participating party, required documentation. Form Submission Module 18.7 may be used.
- The user interface allocated to the broker through the associated messaging means allows parties assigned tasks by a broker to communicate with each other through such messaging means. The messaging means may be known email functions, or areas on a web page that are designated for receiving and storing text entries, or means for receiving uploaded files or links to files containing messages.
- The Module includes means, such as database 12, for storing required documentation. Preferably stored documents are presentable in a stacking order specified by a Lender Party.
- The status of a participating party's action or inaction on a task may be updated by that party and/or another party through the user interface allocated resources associated with a loan application file record.
- If new or supplemental tasks are to be assigned in view of a task completion, inaction, or update, allocated resources may include messaging means, as described above for a participating party to notify other parties of such new or supplemental task.
- The allocated resources may include means for automatically notifying participating parties when an assigned task is over due, or if further tasks are required by a party.

Additional Tools

Using an Additional Tools Module 18.21, the Broker Administrator and the BPUs also can view updated pricing on T-Bonds, T-Notes and other indices, can utilize financial calculators, stock quotes, an economic calendar of events, as well as updated market commentary. User interface 15.75 of FIG. 6.20 illustrates the menu list for BPS to access said tools.

Broker Websites

The Interchange Party provides websites for Brokers that the Brokers can market to borrowers on the Internet. Through the Brokers' allocated resources on the IPCS, the Broker Administrator can build its own brokerage firm website. The Interchange Party provides the Broker Administrator with a step by step "wizard" whereby the Broker Administrator can choose from a series of layout templates and color schemes for the websites, can upload its own content to the website, and can choose which lender's interest rates it wishes to automatically add to its desired margin to be seen by borrowers accessing the website. Borrowers can electronically submit forms to the Broker, including loan applications and rate lock forms. Said forms, including their data, would then reside on the IPCS and be made available to certain of the participating parties so that said participating parties would be able to share data to avoid multiple entry of data. For example, a loan application completed by a borrower on the broker's website could be reviewed on line by the Broker through its allocated resources on the IPCS; the Broker could manipulate the data, and either forward it directly to the lender or Secondary Market Investor such as Fannie Mae through the IPCS and/or port the data into its third party loan processing software. Borrowers can also request, pay for (if necessary), and receive the transaction party documents required by a lender, including appraisals, title reports, credit reports. The participating parties can through their allocated resources on the IPCS can view and print the documents and their data as well as port said data into their own internal processing computer systems. The borrower can also view the status of a loan application file that has been updated by the Broker and/or lender through their allocated resources of the IPCS.

Transaction Parties

Transaction Party

A Transaction Party includes appraisal companies, title companies, escrow companies, attorneys, real estate companies, credit reporting agencies, flood insurance companies, private mortgage insurance companies, mortgage insurance premium companies, and loan document companies.

Transaction Party Administrator

Each Transaction Party has a Transaction Party Administrator that has control over the Transaction Party's allocated resources of the IPCS.

Transaction Party User

A Transaction Party User ("TPU") includes any employee or agent of the Transaction Party that can access the Transaction Party's allocated resources of the IPCS as dictated by the Transaction Party Administrator.

TPU Set Up Module

Using a TPU Set Up Module 18.22, a Transaction Party Administrator can, for example, grant, edit or remove a TPU's access to the Transaction Party's allocated resources as well as access to other participating parties' allocated resources, including a Lender's or Broker's allocated resources on the IPCS.

Company Message Module

Through a Company Message Module 18.23, the Transaction Party Administrator can upload either a generic text message or an HTML file as well as the company logo in a .jpeg or .gif file to be viewed by the TPUs accessing the Transaction Party's allocated resources on the IPCS, or other participating party accessing its allocated resources on the IPCS. In said Module, Transaction Party Administrator can make available to other participating parties on their allocated resources on the IPCS the Transaction Parties fee schedules, contact information, scrolling messages, and forms.

Company Roster Module

Through a Company Roster Module 18.24, the Transaction Party Administrator can manage its company roster that lists the names, department, title, and email addresses of the TPUs and that is viewed the Transaction Party Administrator, TPUs, and by other participating parties.

Receive Document Request Module

Through the File Status and Transaction Party Module 18.14, the Participating Parties can request Transaction Party documents that are required by the lender as a condition for the loan application file. The Transaction Party Administrator and a TPU, as dictated by the Transaction Party Administrator, can through an interface of its allocated resources of the IPCS receive document requests.

Receive Payment Module

Through the File Status and Transaction Party Module 18.14, the participating parties can make credit card, or other ACH payment, if required by the Transaction Party, for the Transaction Party documents that are required by the lender as a condition for the loan application file. Through their respective interfaces of the allocated resources on the IPCS, the participating parties can review an accounting of all payments made or due on requested Transaction Party documents.

Transfer Document Module

Through the File Status and Transaction Party Module 18.14, the Transaction Party Administrator and a TPU, as dictated by the Transaction Party Administrator, can upload a digitally formatted document, or can fill out the document through an interface such as HTML or XML, and port said document into its internal processing system, store on the IPCS, view, print, and send said document to the requesting party, who can then port said document into its internal processing system, store on the IPCS, view, and print. The stored document on the IPCS shall be save in directories on the IPCS, which can be accessed to by certain other participating parties, and place in an order in relation to other transaction party documents as part of the electronic loan application file. The data of a Transaction Party document can be shared by the participating parties by being saved in a format such as XML or texts to be ported to each of the computer systems of the participating parties to avoid multiple entry of the redundant data. Said data, such as the property value stated in an appraisal and the credit reporting score stated in a credit report, can also be ported into other documents and modules of the IPCS such as the loan application and the Risk Based Pricing and Automated Underwriting Modules so that the participating parties avoid multiple entry of redundant data.

File Status Module

Through the File Status and Transaction Party Module 18.14, the Transaction Party Administrator and a TPU, as dictated by the broker party and the Transaction Party Administrator, can participate in the reviewing, updating, and completing tasks of the conditions list of a loan application file as set forth in the File Status and Transaction Party Module, described in the Broker Parties section, above.

Transaction Party Website

The Interchange Party provides websites for Transaction Parties that the Transaction Parties can market to consumers on the Internet. Through the Transaction Parties allocated resources on the IPCS, the Transaction Party Administrator can build its own website. The Interchange Party provides the Transaction Party Administrator with a step by step "wizard" whereby the Transaction Party Administrator can choose from a series of layout templates and color schemes for the websites, can upload its own content to the website. Consumers can also request, pay for (if necessary), and receive the Transaction Party documents required by a lender, including appraisals, title reports, credit reports. The participating parties can through their allocated resources on the IPCS can view and print the documents and their data as well as port said data into their own internal processing computer systems.

Secondary Market Investors

Secondary Market Investors can be provided with similar allocated resources as described for the participating parties discussed above. Through their allocated resources of the IPCS, secondary market investors can transfer and receive data and information, including loan applications and Transaction Party documents. They can also create and manage mortgage pools for lenders. A Secondary Market Investor can choose the criteria for its mortgage pools, including loan volume, lenders, and loan type. The pricing and/or other incentives will be granted to the lenders on a sliding scale so that if the total loan volume entered into the pool by all participating lenders increases to certain predetermined level, the pricing and/or other incentives for all the loans in the pool will continue to improve for the lenders.

Investors

Investors include Fannie Mae, Freddie Mac, Ginnie Mae, and any other investor, which may be active in a secondary or higher market for securitization of loans.

Rate and Loan Program Module

Through user interfaces 15.13-15.14, **15.15(*a*)-(*b*), and 15.16-15.35 of their allocated resources on the IPCS of the Rate and Loan Program Module 18.5 as shown in FIGS. 5.13-5.14, 5.15(*a*)-5.15(*b*), 5.16-5.35**, Investors may input rate and loan program details accessible by some or all of the participating parties, normally the lender parties. Said Rate and Loan Program Module operates in the same manner as the Rate and Loan Program Module for the lender parties as described above.

Automated Underwriting and Risk Based Pricing Module

The present invention includes Automated Underwriting and Risk Based Pricing Module 18.8. Through an interface on its allocated resources of the IPCS, which is tied to the database tables for the data and information submitted in the Rates and Loan Program Module 18.5, the Investor can establish the required data that must be accurately included in the loan application submitted by its sponsoring lenders. If the data included in the fields of the electronic loan application match the criteria established by the Investors through the Automated Underwriting Module 18.8, then the Investors, other LPUs as dictated by the Investors, and the broker are notified as to whether all or some of the submitted data match the criteria established by the Investors.

Mortgage Pools Module

Through an interface of its allocated resources on the IPCS module 18.13, an Investor can manage a mortgage pools module that can be accessed by lender parties through interfaces of their respective allocated resources on the IPCS. Investors choose the criteria for its mortgage pools, including loan volume, lenders, and loan type. The pricing and/or other incentives will be granted to the lenders on a sliding scale so that if the total loan volume entered into the pool by all participating lenders increases to certain predetermined level, the pricing and/or other incentives for all the loans in the pool will continue to improve for the lenders.

What is claimed:

1. A computer system comprising:
an interchange party computer system configured with a plurality of different units of resources for interchange of data and information between a plurality of categories of participating parties, each participating party having a selected role or service in a real estate transaction that comprises a real estate purchase or finance transaction, and the data and information being related to a transaction, the interchange party computer system being couplable over a computer network with a plurality of computer systems, each corresponding to a different category of the participating parties, the interchange party computer system being configured with executable code to control the interchange of the data and information via the networked computer systems;
a plurality of resource units stored on the computer system and comprising computer code and/or data in the nature of forms or templates related to the roles or services of a participating party; and
executable code stored on the computer system for selectively allocating units of the resources to participating parties, who are then authorized by the interchange party computer system to control their respective allocated forms or templates and modify them according to built-in parameters according to the roles or services of a participating party.

2. The system of claim 1 wherein the computer executable instructions are stored on the interchange party computer system.

3. The system of claim 1 wherein the units of resources further comprise interfaces for data exchanged between a first unit of resource configured to be selectively allocable to a first category of participating party and a second unit of resource configured to be selectively allocable to a second category of participating party.

4. The system of claim 3 wherein the interchange party computer system further comprises a data capture server and the data is exchangeable by the first and second categories of participating parties via the data capture server.

5. The system of claim 3 wherein the units of resources comprise units of resources modified by a participating party and the interchange party computer system stores the modified resources.

6. The system of claim 5 wherein the interfaces include graphical user interfaces configured for presenting information about the real estate transaction derived from data uploaded to the data capture server by a participating party.

7. The system of claim 1 wherein at least some resources comprise one or more predetermined forms for use in a real estate purchase and/or finance transaction.

8. The system of claim 7 wherein the forms include one or more of loan application forms, broker submission forms, broker lock forms, broker registration forms, title report forms, property appraisal forms, credit report forms, verification of deposits forms, verification of employment forms, escrow instruction forms, tax return forms, property disclosure forms.

9. The system of claim 1 wherein the at least some resources comprise one or more predetermined templates for use in a real estate purchase and/or finance transaction.

10. The system of claim 9 wherein the templates comprise websites customizable by participating parties.

11. The system of claim 10 wherein the interchange party computer system stores and presents websites customized from the templates.

12. The system of claim 10 wherein there are a plurality of templates, each preconfigured according to the role or services of a particular category of participating party.

13. The system of claim 10 wherein the computer system further comprises an administrators module configured to provide an administrator for a participating party a step-by-step set-up feature whereby the administrator can customize the layout and features of a website.

14. The system of claim 1 wherein the resources stored on the computer system further comprise user interfaces that allow a participating party, under conditions according to executable code stored on the interchange party computer system, to post content to the interchange party computer system that is presentable to other participating parties, to determine which participating parties have access to a selected participating party's resources, to define data channels between parties for interchange of the data and information, and/or to access program modules stored on the interchange party computer system.

15. The system of claim 1 further comprising executable code allowing for participating parties to fill-out forms and templates and to upload a digitally formatted form or template to a data capture server on the interchange party computer system, the interchange party computer system storing executable code selectively controlling how the form or template is usable by other participating parties.

16. The system of claim 15 wherein the computer code is based on instructions for use of the form or template uploaded to the interchange party computer system by the participating party uploading the form or template.

17. The system of claim 15 wherein the code includes controlling how the form or template may be ported to a resource allocated to another participating party.

18. The system of claim 15 wherein the code includes controlling how the form or template may be ported to, viewed, printed, or distributed to another participating party.

19. The system of claim 1 further comprising a directory of stored documents on the interchange party computer system, the directories being organized according to particular real estate purchase of finance transactions, at least some of documents in a directory for a particular transaction being derived from the forms or templates.

20. The system of claim 19 wherein the interchange party computer system includes executable code for controlling which participating parties can access a given directory.

21. The system of claim 19 wherein the interchange party computer system includes executable code for controlling the ordering of documents in a directory for presentation to a participating party.

22. The system of claim 19 wherein the interchange party computer system includes executable code for controlling tasks for participating parties based on and related to the status of a real estate purchase or finance transaction.

23. The system of claim 19 wherein the interchange party computer system includes executable code for automatically controlling and sending notifications, forms, templates and/or documents relating to the status of a particular real estate purchase or finance transaction.

24. The system of claim 1 wherein the interchange party computer system includes executable code for automatically controlling and sending notifications to selected participating parties related to the use of one of the forms or templates, the notification concerning a change in status or action needed related to a particular real estate purchase or finance transaction.

25. The system of claim 1 wherein the interchange party computer system includes executable code for controlling and sending the notifications, forms, templates and/or documents relating to the status of a particular transaction.

26. The system of claim 1 wherein the computer system includes executable code so that use of one of the forms or templates by a first category of participating party automatically ports the entered data or information to resources of one or more other categories of participating parties, thereby eliminating the double entry of the data or information by the one or more other participating parties in their roles or services related to a real estate.

27. The system of claim 1 further comprising executable code stored on the interchange party computer system enabling one or more selected participating parties to post fee schedules and receive payment for their services and for the data and information they provide.

28. The system of claim 1 further comprising executable code stored on the interchange party computer system enabling one or more selected participating parties to pay fees related to the data and information that it accesses or for services that it has requested.

29. The system of claim 1 further comprising executable code stored on the interchange party computer system enabling one or more selected participating parties to track or follow the movement of selected data and information between the parties related to tasks or documents that are part of a real estate purchase or finance transaction.

30. The system of claim 29 further comprising executable code for associating a fee with the movement of selected said data and information.

31. The system of claim 29 wherein the code enables generating reports renderable to a participating party related to the tracking or following of the selected data and information.

32. The system of claim 29 wherein the code enables the recording fees of earned and fees incurred by participating parties related to services provided by participating parties in a real estate purchase or finance transaction, said code automatically sending reports to selected participating parties related to the earned and incurred fees.

33. A method for facilitating collaboration in real estate transactions, comprising: providing an interchange party computer system configured with a plurality of different units of resources for interchange of data and information between a plurality of participating parties, each participating party having a selected role or service in a real estate transaction that comprises a real estate purchase or finance transaction, and the data and information being related to a transaction, the interchange party computer system being coupled over a computer network with a plurality of computer systems, each corresponding to a different category of the participating parties, the interchange party computer system being configured with executable code to control the interchange of the data and information via the networked computer systems; the interchange party computer system, according to the executable code, selecting from a plurality of resource units stored on the computer system and comprising computer code and/or data in the nature of forms or templates related to the roles or services of a participating party; and allocating the selected resources to selected participating parties, who are then authorized to control them.

34. The method of claim 33, wherein to enable control of allocated forms or templates, the resources include built-in control parameters according to the roles or services of a participating party.

35. The method of claim 23 wherein the computer executable instructions are stored on the interchange party computer system, the system executing the instructions following a log-in or request to the interchange party computer system by a participating party.

36. The method of claim 33 wherein the units of resources further comprise interfaces for data exchanged between a first unit of resource configured to be selectively allocable to a first category of participating party and a second unit of resource configured to be selectively allocable to a second category of participating party, and the interchange party computer system receives data related to real estate purchase or finance transaction from a participating party computer system via one of said interfaces.

37. The method of claim 36 wherein the unit of resource for the interface from which the data is received is stored on the computer system of a participating party to which the interchange party computer system allocated the unit of resource.

38. The method of claim 37 wherein the forms include one or more of loan application forms, broker submission forms, broker lock forms, broker registration forms, title report forms, property appraisal forms, credit report forms, verification of deposits forms, verification of employment forms, escrow instruction forms, tax return forms, property disclosure forms.

39. The method of claim 37 wherein at least some resources comprise one or more predetermined templates for use in a real estate purchase and/or finance transaction.

40. The method of claim 33 wherein a unit of resources comprises a template in the nature of a website customizable by a participating party.

41. The method of claim 33 wherein the resources stored on the computer system further comprise user interfaces that allow a participating party, under conditions according to executable code stored on the interchange party computer system, to post content to the interchange party computer system that is presentable to other participating parties, to determine which participating parties have access to a selected participating party's resources, to define data channels between parties for interchange of the data and information, and/or to access program modules stored on the interchange party computer system, and the interchange party executing one of said actions based on a network data communication made via a participating party's computer system.

42. The method of claim 33 further comprising storing one of said forms or templates modified by a participating party on a data capture server on the interchange party computer system, the interchange party computer system controlling how the form or template is usable by other participating parties via the executable code.

43. The method of claim 33 further comprising controlling how a form or a template may be ported to, viewed, printed, or distributed to another participating party based on the executable code.

44. The method of claim 33 further comprising a directory of stored documents on the interchange party computer system, the interchange party computer system organizing the directories according to a particular real estate purchase of finance transactions, at least some of documents in a directory for a particular transaction being derived from the forms or templates.

45. The method of claim 33 further comprising controlling which participating parties can access a given directory according to executable computer code.

46. The method of claim 33 further comprising the interchange party computer system controlling the assignment of tasks to participating parties based on and related to the status of a real estate purchase or finance transaction.

47. The method of claim 33 further comprising the interchange party computer system automatically controlling and sending notifications, forms, templates and/or documents relating to the status of a particular real estate purchase or finance transaction.

48. The method of claim 33 further comprising the interchange party computer system automatically controlling and sending notifications to selected participating parties related to the use of one of the forms or templates, the notification concerning a change in status or action needed related to a particular real estate purchase or finance transaction.

49. The method of claim 33 further comprising automatically porting data from a form or template of a first category of participating party automatically to resources of one or more other categories of participating parties, thereby eliminating the double entry of the data or information by the one or more other participating parties in their roles or services related to a real estate.

50. The method of claim 33 further comprising enabling one or more selected participating parties to post fee schedules and receive payment for their services and for the data and information they provide.

51. The method of claim 33 further comprising enabling one or more selected participating parties to pay fees related to the data and information that it accesses or for services that it has requested.

52. The method of claim 33 further comprising enabling one or more selected participating parties to track or follow the movement of selected data and information between the parties related to tasks or documents that are part of a real estate purchase or finance transaction.

53. The method of claim 52 further comprising storing on the interchange party computer system a fee associated with the movement of selected said data and information.

54. The method of claim 33 further comprising the interchange party computer system generating reports renderable to a participating party related to the tracking or following of the selected data and information.

55. The method of claim 33 further comprising the interchange party computer system recording fees earned and fees incurred by participating parties related to services provided by participating parties in a real estate purchase or finance transaction, the interchange party computer system automatically sending reports to selected participating parties related to the earned and incurred fees.

56. A method for facilitating collaboration in real estate transactions, comprising:
communicating data and information related to the status of a real estate purchase or finance transaction to an interchange party computer system configured with a plurality of different units of resources for interchange of data and information between a plurality of participating parties, each participating party having a selected role or service in a real estate transaction that comprises a real estate purchase or finance transaction, the interchange party computer system being coupled over a computer network with a plurality of computer systems, each corresponding to a different category of the participating parties, a first category of which controls the communication of the data and information, the interchange party computer system being configured with executable code to control the interchange of data and information via the networked computer systems;

the data or information enabling the interchange party computer system to control the interchange party computer system automatically controlling and communicating notifications, forms, templates and/or documents relating to the status of a particular real estate purchase or finance transaction, and the interchange party computer system automatically making said communication with a second category of participating party based on the data and communication; and via the executable code selectively allocating units of the resources to participating parties, who are then authorized by the interchange party computer system to control their respective allocated forms or templates and modify them according to built-in parameters according to the roles or services of a participating party.

* * * * *